(12) United States Patent
Mullet et al.

(10) Patent No.: US 10,577,858 B2
(45) Date of Patent: Mar. 3, 2020

(54) REMOTE CONTROLLED MOTORIZED WAND FOR CONTROLLING BLINDS

(71) Applicant: Current Products Corp., Pensacola, FL (US)

(72) Inventors: Willis Jay Mullet, Gulf Breeze, FL (US); Daniel T. Matthews, Pensacola, FL (US); Richard Scott Hand, Pace, FL (US)

(73) Assignee: CURRENT PRODUCTS CORP., Pensacola, FL (US)

( * ) Notice: Subject to any disclaimer, the term of this patent is extended or adjusted under 35 U.S.C. 154(b) by 0 days.

(21) Appl. No.: 16/105,088

(22) Filed: Aug. 20, 2018

(65) Prior Publication Data

US 2019/0040676 A1    Feb. 7, 2019

Related U.S. Application Data

(63) Continuation-in-part of application No. 15/458,501, filed on Mar. 14, 2017, now Pat. No. 10,072,458, which is a continuation-in-part of application No. 14/752,163, filed on Jun. 26, 2015, now Pat. No. 9,879,475.

(60) Provisional application No. 62/092,655, filed on Dec. 16, 2014.

(51) Int. Cl.
*H02P 1/00* (2006.01)
*E06B 9/322* (2006.01)
*E06B 9/28* (2006.01)

(52) U.S. Cl.
CPC ........ *E06B 9/322* (2013.01); *E06B 2009/285* (2013.01); *E06B 2009/3222* (2013.01)

(58) Field of Classification Search
CPC ............ G05B 2219/2614; B60J 1/2016; E06B 2009/285; E06B 2009/3222
See application file for complete search history.

(56) References Cited

U.S. PATENT DOCUMENTS

| | | | |
|---|---|---|---|
| 2003/0141025 A1* | 7/2003 | Schlecht | B60J 1/2016 160/370.22 |
| 2013/0085615 A1* | 4/2013 | Barker | A61G 10/00 700/277 |

* cited by examiner

*Primary Examiner* — Karen Masih
(74) *Attorney, Agent, or Firm* — Christopher A. Proskey; BrownWinick Law Firm

(57) ABSTRACT

A method of operating a motorized window covering is presented wherein in response to a standard movement command power is supplied to a motor in a continuous or generally continuous manner thereby moving the shade material from a start position to an end position in a generally continuous manner. However, in doing so, the motor rotates at a fast rate thereby causing elevated noise levels. In response to an automated movement command, power is supplied to the motor by cycling power to the motor between a powered state and an unpowered state thereby moving the shade material from a start position to an end position in an incremental manner. While moving the shade material in this incremental manner is slower, it is substantially quieter. The preferred mode of operation is selected based on whether the movement command is a standard movement command or an automated movement command.

41 Claims, 25 Drawing Sheets

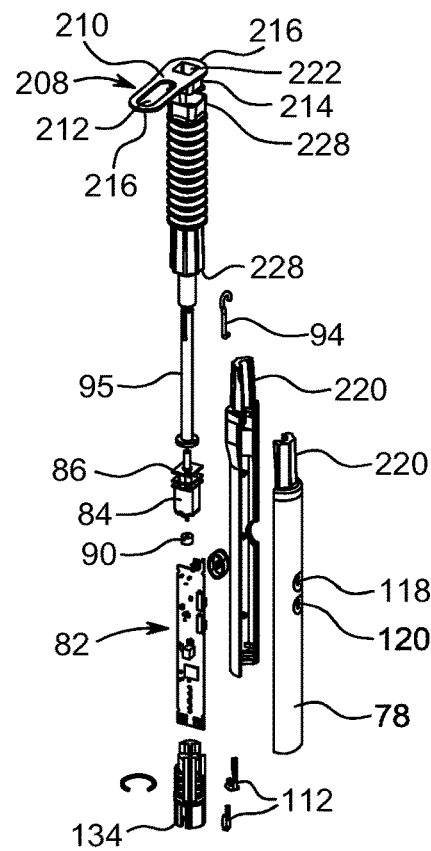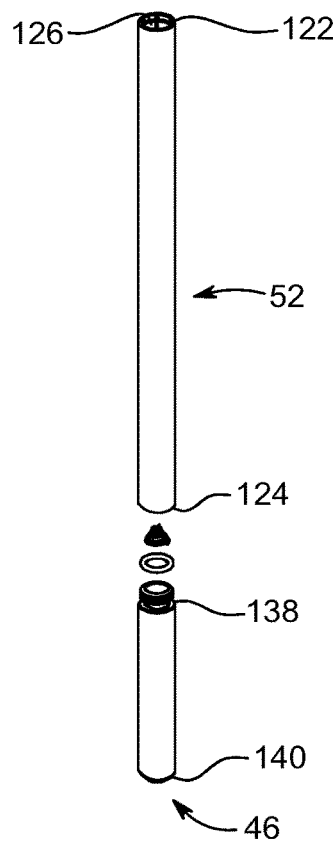
FIG. 13

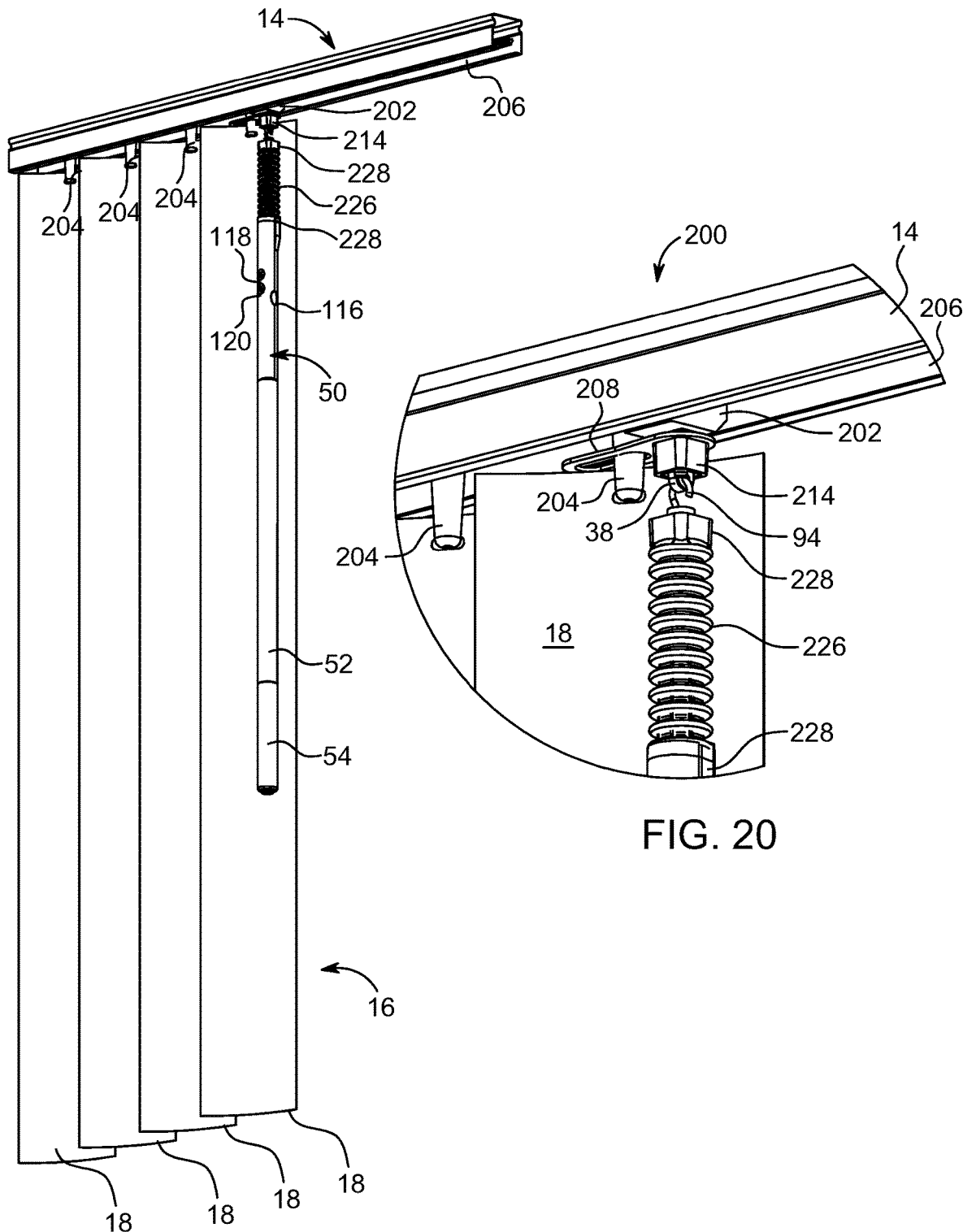

Solar Algorithm Explanation

Winter Solar Data. Partly cloudy. Start of algorithm.

Solar Algorithm Explanation

Summer Solar Data. First use of algorithm after 3 day averaging. One Morning Thunder Storm.

REMOTE CONTROLLED MOTORIZED WAND FOR CONTROLLING BLINDS

CROSS REFERENCE TO RELATED APPLICATION

This application is a continuation in part of U.S. patent application Ser. No. 15/458,501 filed on Mar. 14, 2017 which itself is a continuation in part of U.S. patent application Ser. No. 14/752,163 filed on Jun. 26, 2015, which claims the benefit of U.S. Provisional Application No. 62/092,655 filed Dec. 16, 2014, each of which are fully incorporated herein by reference.

FIELD OF THE INVENTION

This invention relates to window coverings. More specifically, and without limitation, this invention relates to a device for motorized control of new or existing window coverings.

BACKGROUND OF THE INVENTION

Window coverings are old and well known in the art. Window coverings come in countless sizes, shapes and designs. They are used for utilitarian purposes, such as limiting the amount of light that enters a room as well as controlling the amount of heat that enters through a window. Window coverings also serve aesthetic purposes, such as improving the ambiance or décor of a room.

One popular form of window coverings are known as, and referred to herein as "blinds". Blinds are generally formed of a header (or head rail) positioned at their top end that has shade material that hangs downward therefrom. This shade material is generally formed of a plurality of slats that hang from the header, either in a vertical orientation (known as vertical blinds) or in horizontal orientation (known as horizontal blinds, venetian blinds, mini blinds, plantation shades, shutter blinds, among countless other names).

Conventional horizontal blinds are manually operated in two ways. First, the amount of slats that are vertically deployed from the header is adjusted by adjusting the length of one or more suspension cords. Second, the angle of the slats is adjusted by rotating or twisting a tilt rod, wand or baton or other tilting mechanism.

Conventional vertical blinds are also manually operated in two ways. First, the amount slats that are vertically deployed from the header is adjusted by grasping a tilt rod, wand or baton or other mechanism and sliding the slats to the desired position. Second, the angle of the slats is adjusted by rotating or twisting the tilt rod, wand or baton or other tilting mechanism.

While these processes are effective at adjusting the blinds they are inefficient and time consuming as the user must take time away from other tasks and expend energy to manually adjust the blinds. This manual process is especially inconvenient and undesirable in locations that have a plurality of blinds.

In response to the deficiencies of manual window coverings, various manufacturers have developed motorized window coverings. While motorized window coverings eliminate the need to manually adjust the window coverings, they suffer from a great number of other deficiencies. That is, motorized window coverings tend to be extremely expensive and therefore are financially out of reach for most consumers. In addition, installing motorized window coverings can be a very complicated and time consuming task that requires removal of the existing window coverings and replacement with the new motorized window coverings, not to mention the need to use various tools like drills, screw drivers, levels and the like. This process can be further complicated and made much more expensive if hardwired electricity is needed to power the new motorized window coverings. In addition, replacing perfectly functioning manual window coverings is often undesirable for many consumers as it is seen as wasteful to replace perfectly functional window coverings.

To eliminate the need to replace existing window coverings various products have been developed to motorize manual window coverings. One such product is the subject of U.S. Pat. No. 5,603,371 entitled "Electronic Power Angling Rod For A Window Blind" filed on Jun. 5, 1995 by inventor Richard D. Gregg. The product of the '371 patent is an aftermarket add-on to existing horizontal blinds that attempts to provide a means of converting manual horizontal blinds to motorized horizontal blinds by replacing the manual tilt rod with a motorized tilt rod. While the product of the '371 patent may provide some advantages, it suffers from many apparent disadvantages. Namely, the product of the '371 patent is inconvenient and complicated to install on existing horizontal blinds. In addition, the product of the '371 patent is connected to the horizontal blind using a rigid clip or brace which does not provide the needed variability to install on the great variety of horizontal blinds available on the market. In addition, the product of the '371 patent does not provide programming and set-up procedures that take into account for the variability or slack in the tilting mechanisms commonly found in blinds today. Because the product in the '371 patent does not have a solution for the slack or backlash in tilting mechanisms in conventional blinds, this product cannot be programmed for discrete and repeatable tilt positions which is a feature that is important to the consumer particularly when multiple shades are installed in close proximity to each other. Nor does the product of the '371 patent provide the control features desired by today's consumer such as grouping and intermediate settings. As such, the product of the '371 patent is not an adequate solution.

Therefore, for the reasons stated above, and for other reasons stated below which will become apparent to those skilled in the art upon reading and understanding the specification, there is a need in the art for an improved device, manner and means of converting a manual window covering to a motorized window covering.

Thus, it is a primary object of the invention to provide a remote controlled motorized wand for controlling blinds that improves upon the state of the art.

Another object of the invention is to provide a remote controlled motorized wand for controlling blinds that eliminates the need to replace perfectly functioning manual window coverings.

Yet another object of the invention is to provide a remote controlled motorized wand for controlling blinds that eliminates the need to install new window coverings to have the advantages of motorized control.

Another object of the invention is to provide a remote controlled motorized wand for controlling blinds that includes a twist function or manual override.

Yet another object of the invention is to provide a remote controlled motorized wand for controlling blinds that is easy to install.

Another object of the invention is to provide a remote controlled motorized wand for controlling blinds that allows for programming of positions.

Yet another object of the invention is to provide a remote controlled motorized wand for controlling blinds that can be installed on both horizontal and vertical blinds.

Yet another object of the invention is to provide a remote controlled motorized wand for controlling blinds that can be used with a great variety of head rails of various blinds.

Another object of the invention is to provide a remote controlled motorized wand for controlling blinds that provides improved control and functionality.

Yet another object of the invention is to provide an aftermarket remote controlled motorized wand for controlling blinds that saves the user time when adjusting blinds.

Another object of the invention is to provide a remote controlled motorized wand for controlling blinds that is inexpensive and certainly less expensive than purchasing new motorized window coverings.

Yet another object of the invention is to provide a remote controlled motorized wand for controlling blinds that allows for control of a plurality of window coverings simultaneously.

Another object of the invention is to provide a remote controlled motorized wand for controlling blinds that can be controlled by a twist or a wireless signal.

Yet another object of the invention is to provide a remote controlled motorized wand for controlling blinds that allows for a plurality of window coverings to be grouped together such that they respond simultaneously to a single command.

Another object of the invention is to provide a remote controlled motorized wand for controlling blinds that automatically responds to light variance.

Yet another object of the invention is to provide a remote controlled motorized wand for controlling blinds that automatically responds to temperature variance.

Another object of the invention is to provide a remote controlled motorized wand for controlling blinds that has improved battery life.

Yet another object of the invention is to provide a remote controlled motorized wand for controlling blinds that accurately tracks and can respond in like fashion to other blinds the in the proximity of the wand.

Another object of the invention is to provide a remote controlled motorized wand for controlling blinds that is repeatable over time and between window coverings.

Yet another object of the invention is to provide a remote controlled motorized wand for controlling blinds that has a long useful life.

Another object of the invention is to provide a remote controlled motorized wand for controlling blinds that has a simple and elegant design.

Yet another object of the invention is to provide a remote controlled motorized wand for controlling blinds that is customizable.

Another object of the invention is to provide a remote controlled motorized wand for controlling blinds that utilizes standard batteries.

Yet another object of the invention is to provide a remote controlled motorized wand for controlling blinds that can be purchased as an off-the-shelf product.

Another object of the invention is to provide a remote controlled motorized wand for controlling blinds that allows for easy battery replacement.

Yet another object of the invention is to provide a remote controlled motorized wand for controlling blinds that is durable.

Another object of the invention is to provide a remote controlled motorized wand for controlling blinds that maintains the look and feel of a conventional tilt wand while providing additional features.

Yet another object of the invention is to provide a remote controlled motorized wand for controlling blinds that can be used for controlling horizontal and vertical blinds.

Another object of the invention is to provide a method of operating a motorized window covering that provides quiet operation.

These and other objects, features, or advantages of the invention will become apparent from the specification and claims.

SUMMARY OF THE INVENTION

A method of operating a motorized window covering is presented wherein in response to a standard movement command power is supplied to a motor in a continuous or generally continuous manner thereby moving the shade material from a start position to an end position in a generally continuous manner. However, in doing so, the motor rotates at a fast rate thereby causing excessive noise. In response to an automated movement command power is supplied to the motor by cycling power between a powered state and an unpowered state thereby moving the shade material from a start position to an end position in an incremental manner. While moving the shade material in this incremental manner by cycling power to the motor is slower, it is substantially quieter. The preferred mode of operation is selected based on whether the movement command is a standard movement command or an automated movement command.

BRIEF DESCRIPTION OF THE DRAWINGS

FIG. 13 is a perspective exploded view of a motorized wand system for use with a vertical blind, the view showing the housing, wand and extender, and a bellows and mounting member for connecting to the vertical blind;

FIG. 19 is a perspective view of a motorized wand system for use with a vertical blind, the view showing a housing, bellows and mounting member connected to the vertical blind with the first clip and tilt knob of the carrier of the vertical blind connected to the mounting member, and the view also showing the bellows in a compressed state so as to show and provide access to the tilt knob of the vertical blind and the collar of the mounting member;

FIG. 20 is a close-up perspective view of FIG. 19, the view showing the bellows and mounting member connected to the vertical blind with the first clip and tilt knob of the carrier of the vertical blind connected to the mounting member, and the view also showing the bellows in a compressed state so as to show and provide access to the tilt knob of the vertical blind and the collar of the mounting member;

DETAILED DESCRIPTION

Figure 1:
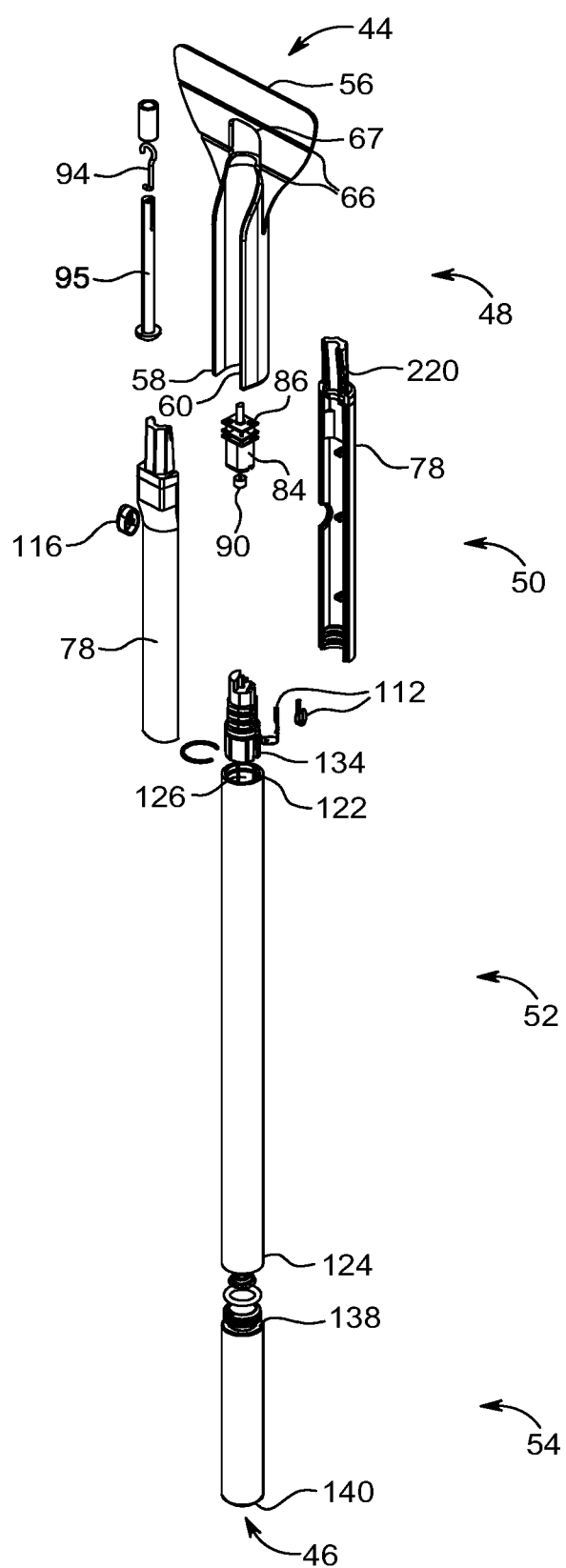
FIG. 1 is a rear perspective exploded view of a motorized wand system for use with a horizontal blind, the view showing the driver cover, housing, wand and extender.
Figure 2:
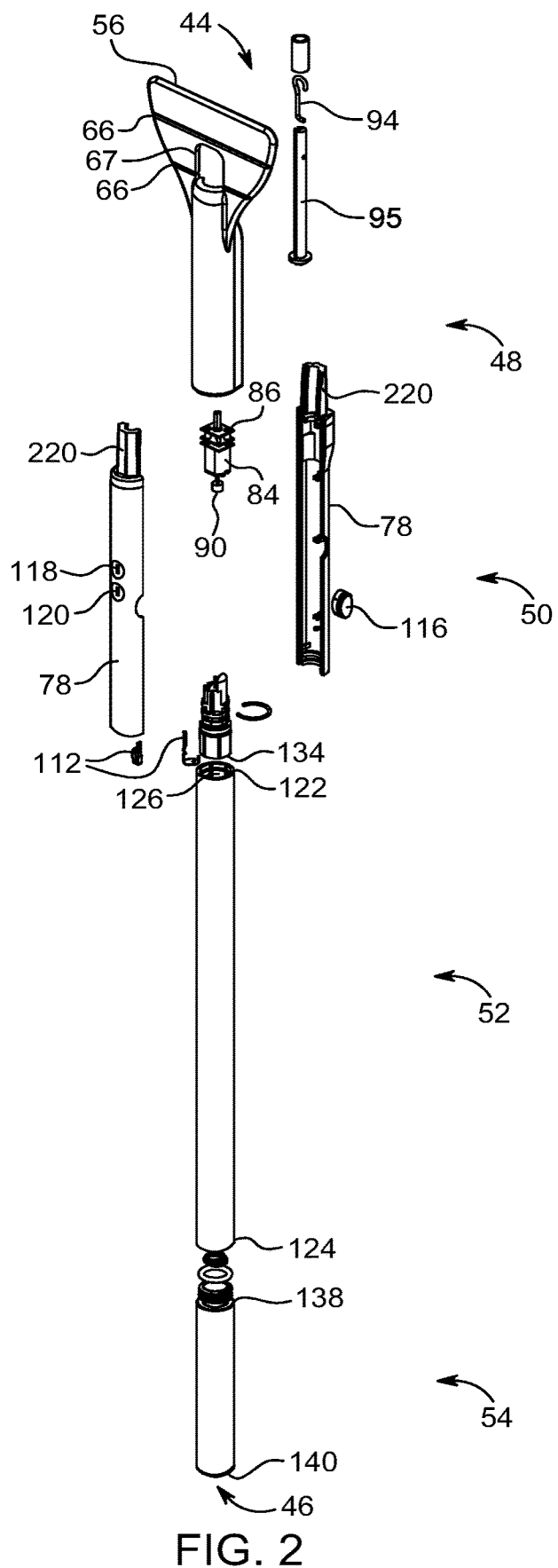
FIG. 2 is a front perspective exploded view of a motorized wand system for use with a horizontal blind, the view showing the driver cover, housing, wand and extender.
Figure 3:
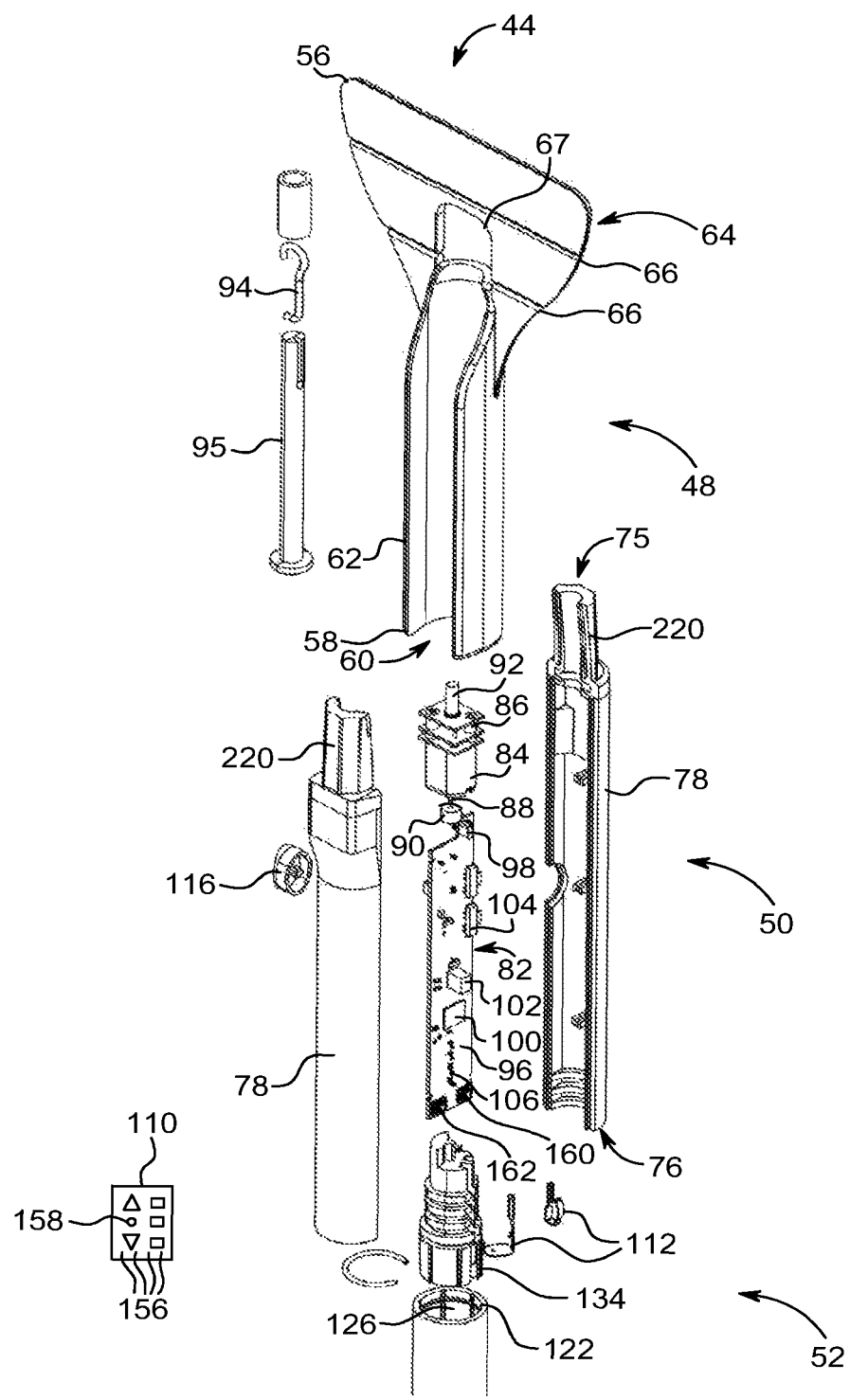
FIG. 3 is a close-up perspective view of FIG. 1.
Figure 4:
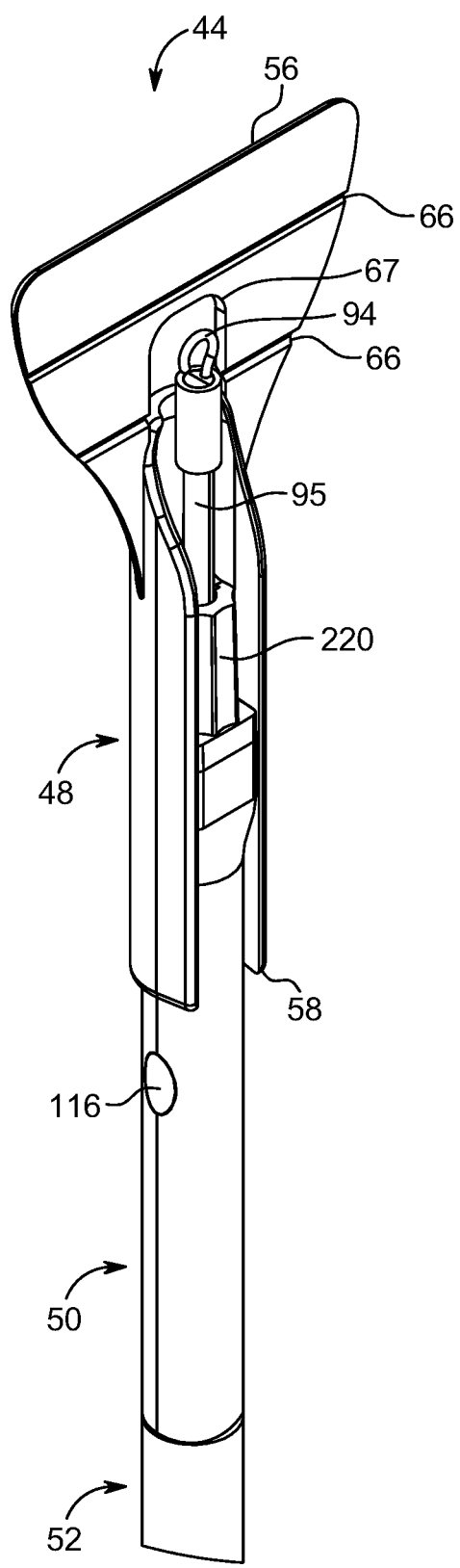
FIG. 4 is a close-up perspective view of motorized wand system having the driver cover installed on the housing.
Figure 5:
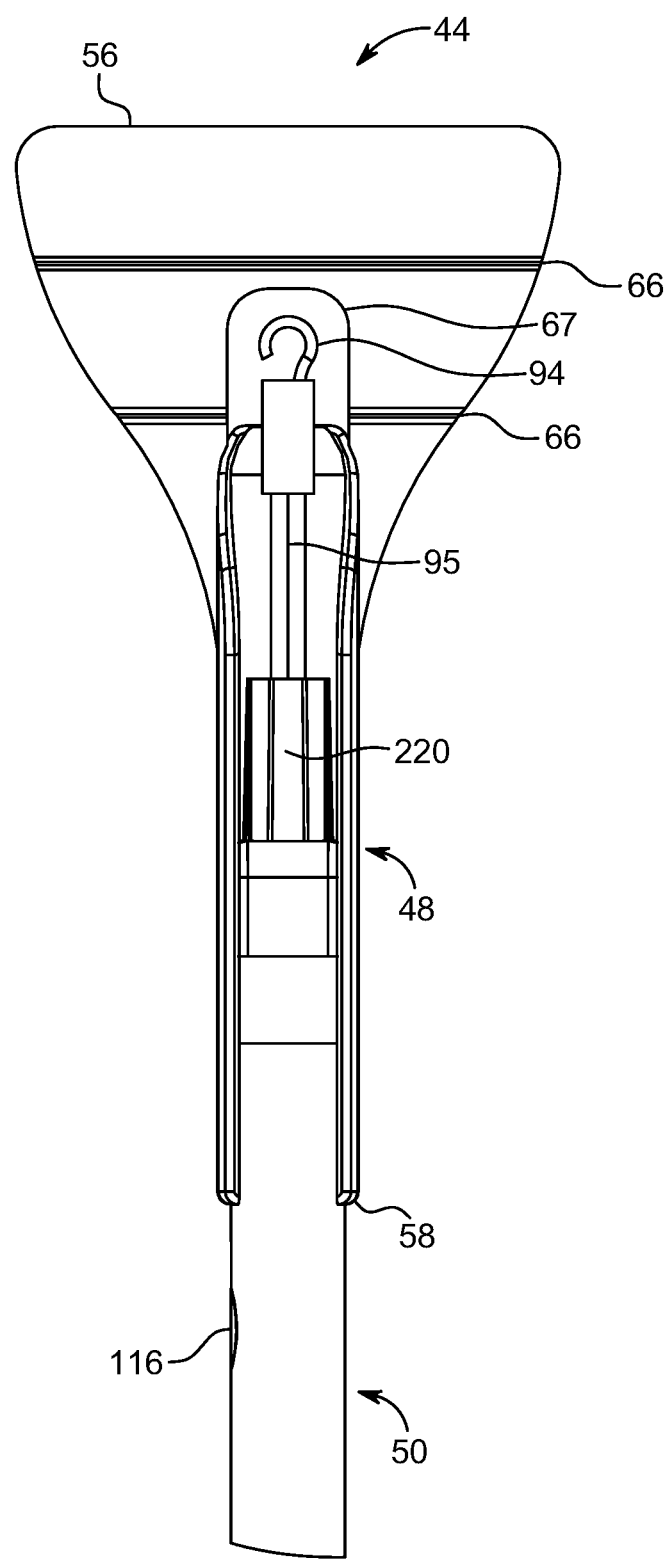
FIG. 5 is a close-up rear elevation view of motorized wand system having the driver cover installed on the housing.
Figure 6:
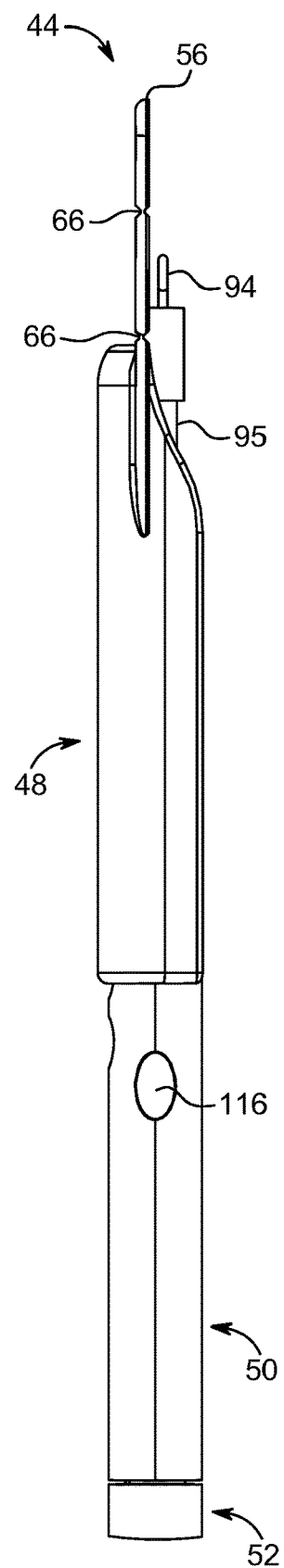
FIG. 6 is a close-up side perspective view of motorized wand system having the driver cover installed on the housing.
Figure 7:
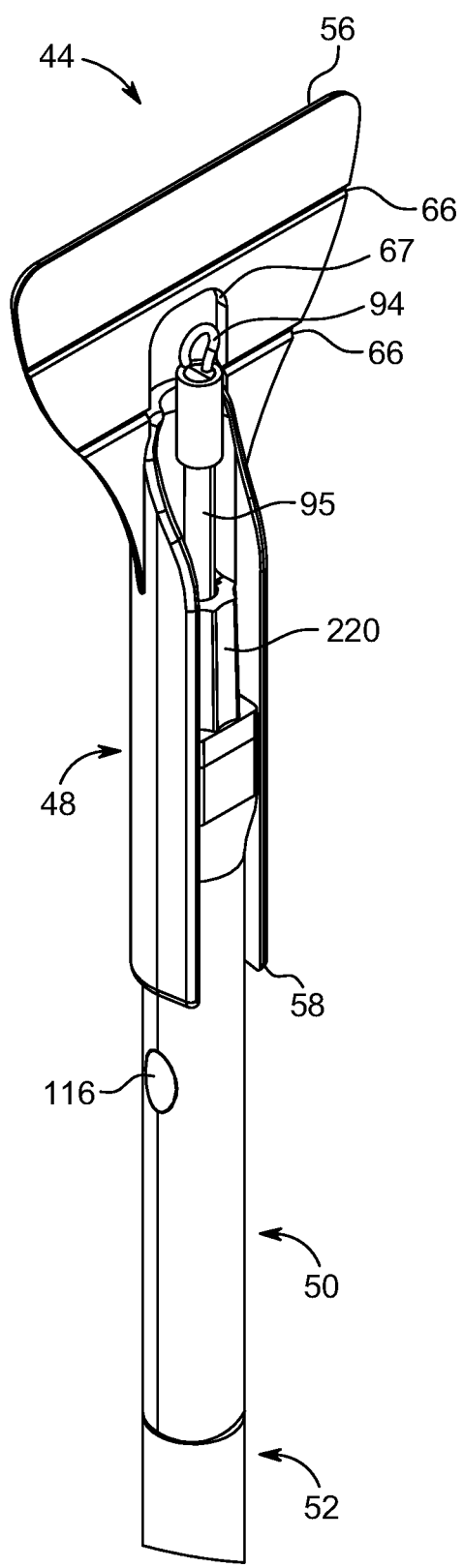
FIG. 7 is a close-up perspective view of motorized wand system having the driver cover installed on the housing.
Figure 8:
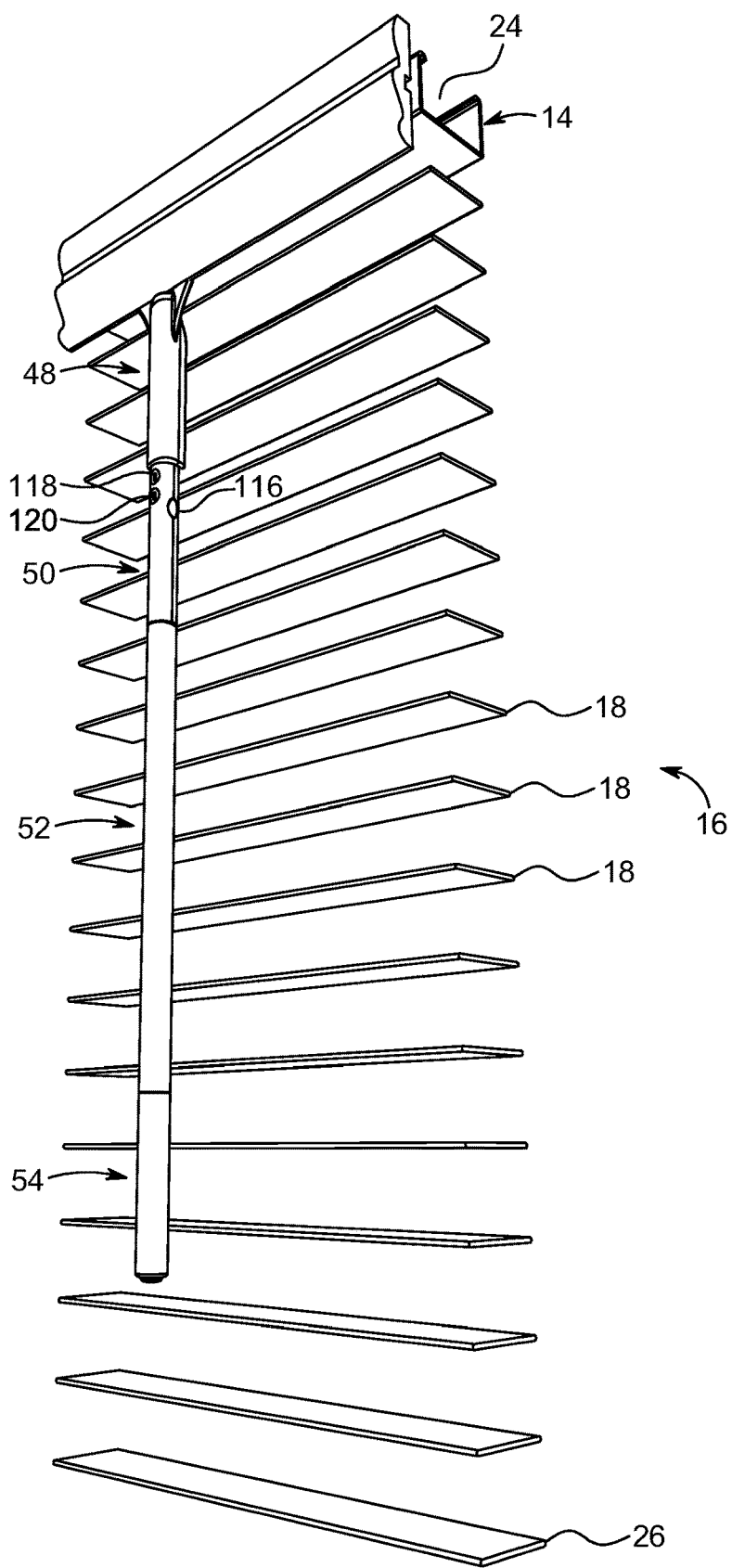
FIG. 8 is a perspective view of a motorized wand system having the driver cover installed on the housing, the motorized wand system installed on a horizontal blind.
Figure 9:
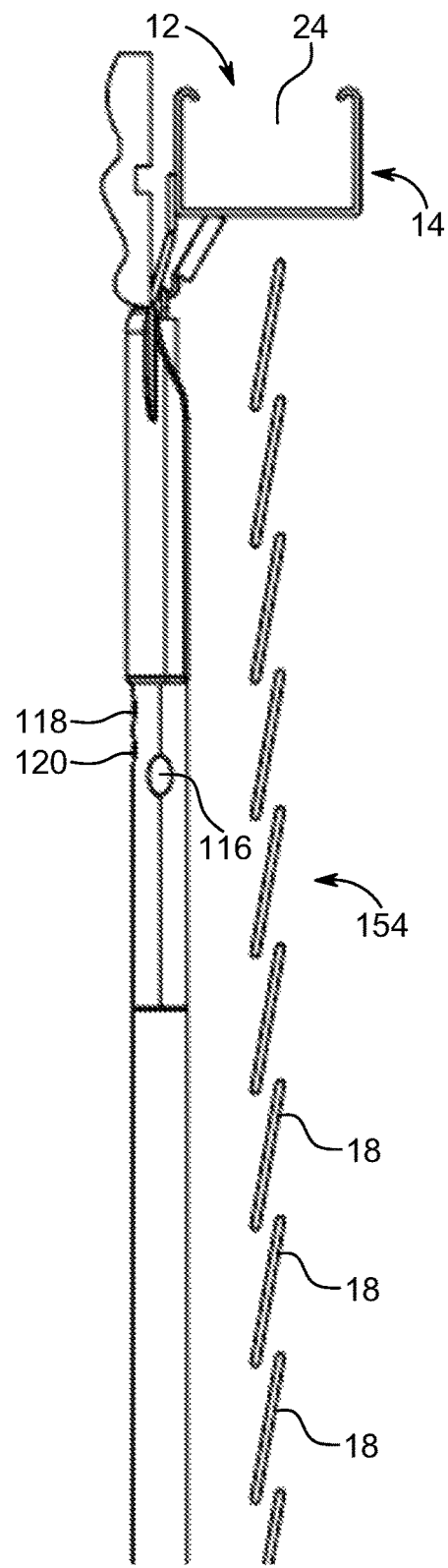
FIG. 9 is a side elevation view of a motorized wand system having the driver cover installed on the housing, the motorized wand system installed on a horizontal blind, the view showing the slats of the horizontal blind in a fully closed down position.
Figure 10:
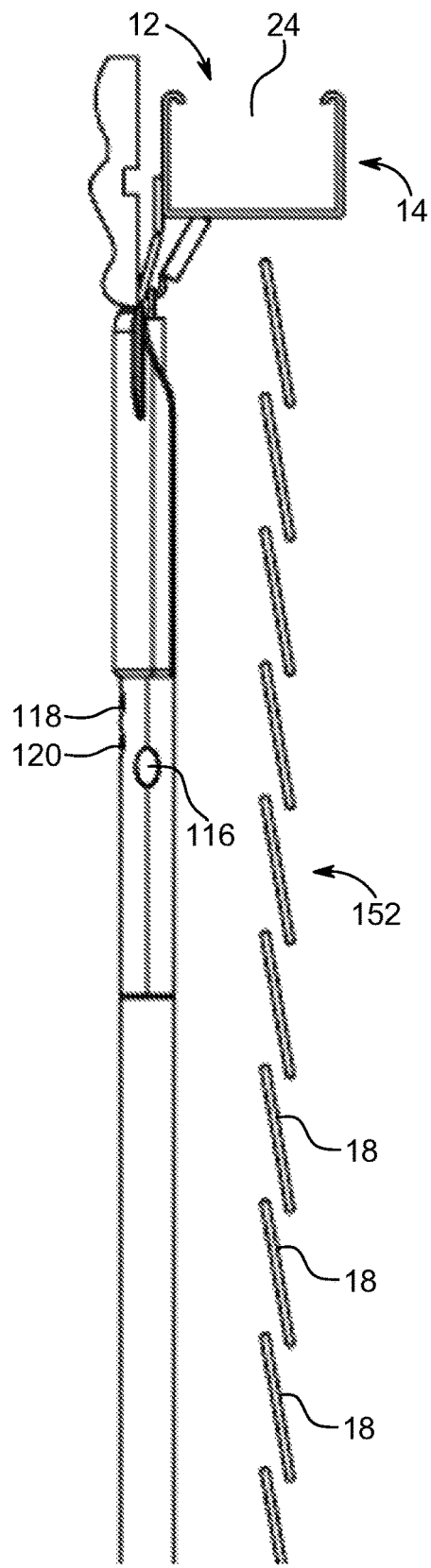
FIG. 10 is a side elevation view of a motorized wand system having the driver cover installed on the housing, the motorized wand system installed on a horizontal blind, the view showing the slats of the horizontal blind in a fully closed up position.
Figure 11:
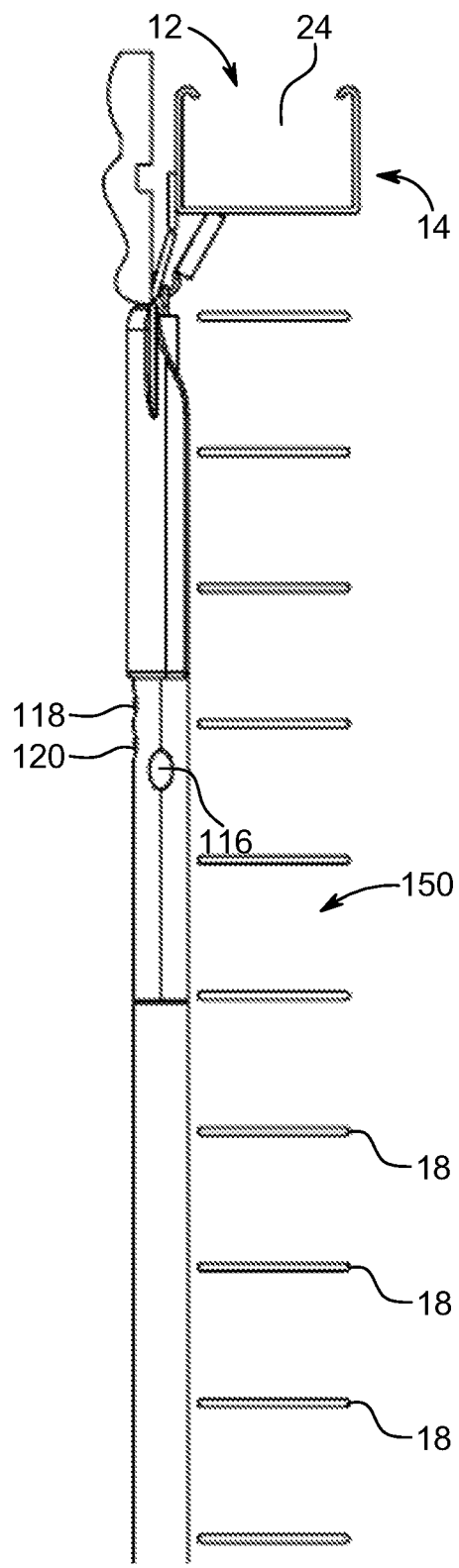
FIG. 11 is a side elevation view of a motorized wand system having the driver cover installed on the housing, the motorized wand system installed on a horizontal blind, the view showing the slats of the horizontal blind in a fully open or level position.
Figure 12:
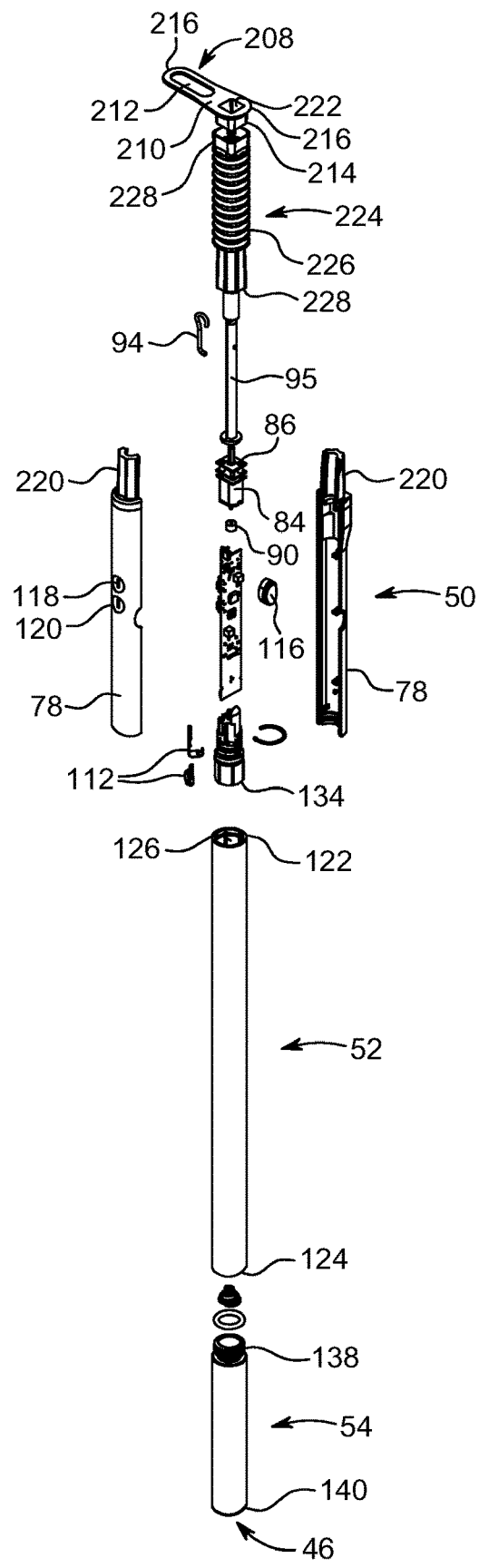
FIG. 12 is a perspective exploded view of a motorized wand system for use with a vertical blind, the view showing the housing, wand and extender, and a bellows and mounting member for connecting to the vertical blind.
Figure 14:
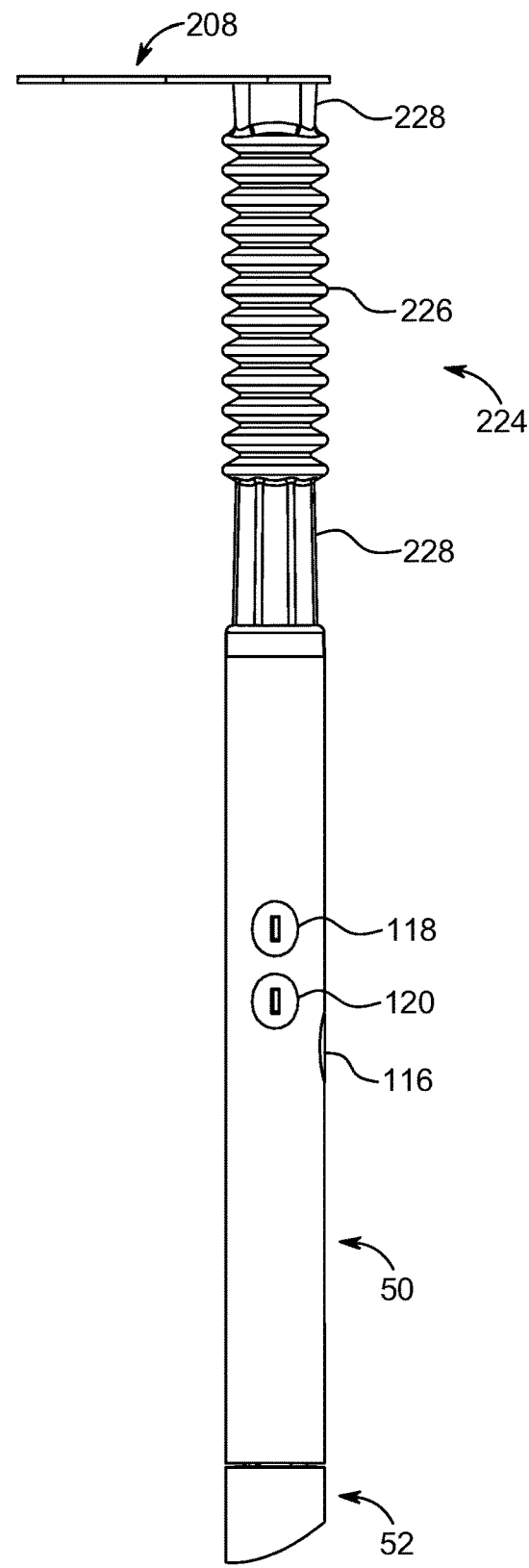
FIG. 14 is a side elevation view of a motorized wand system for use with a vertical blind, the view showing the housing, wand and extender, and a bellows and mounting member assembled together for connecting to the vertical blind.
Figure 15:
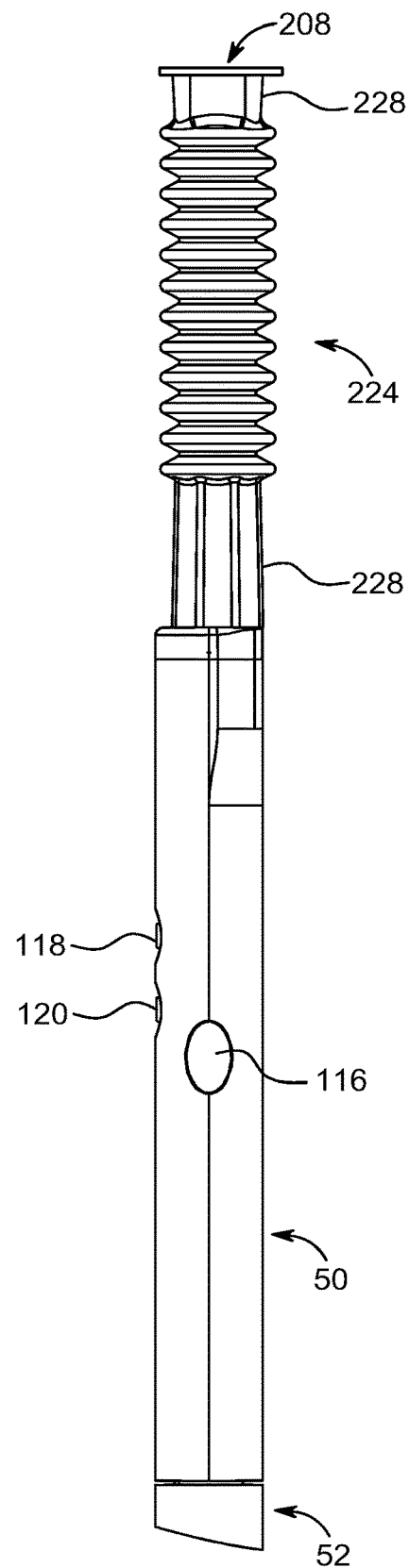
FIG. 15 is a side elevation view of a motorized wand system for use with a vertical blind, the view showing the housing, wand and extender, and a bellows and mounting member assembled together for connecting to the vertical blind.
Figure 16:
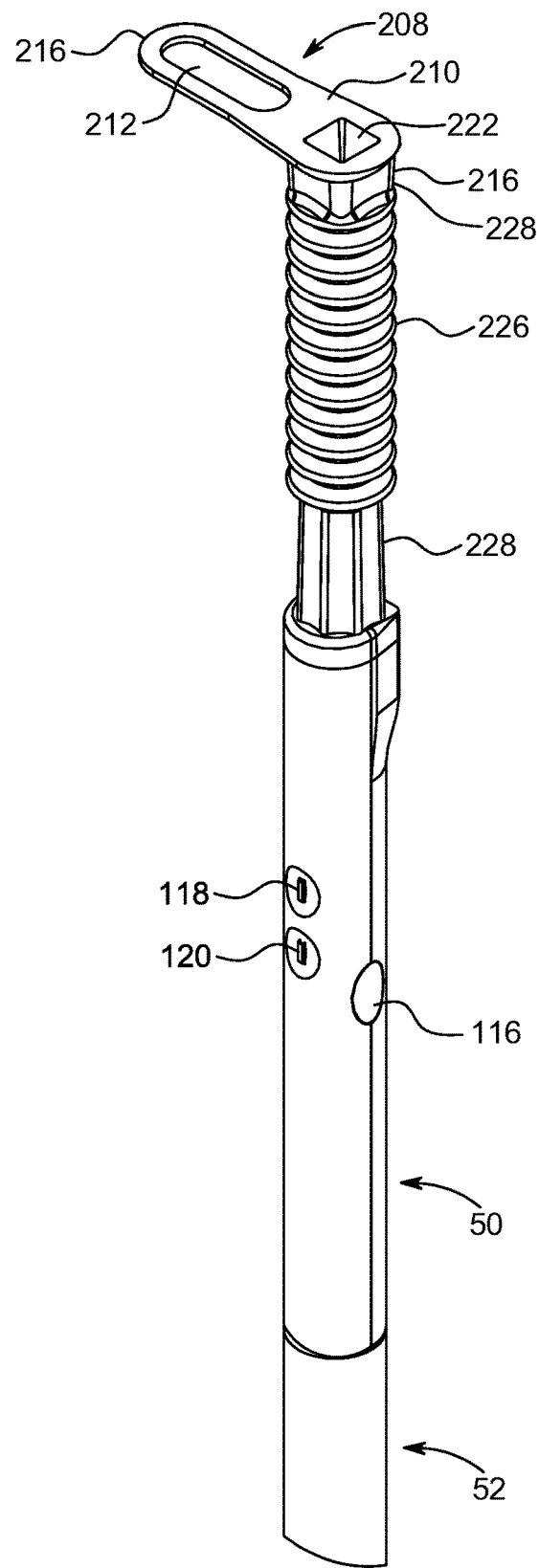
FIG. 16 is a perspective view of a motorized wand system for use with a vertical blind, the view showing the housing, wand and extender, and a bellows and mounting member assembled together for connecting to the vertical blind.
Figures 17, 18:
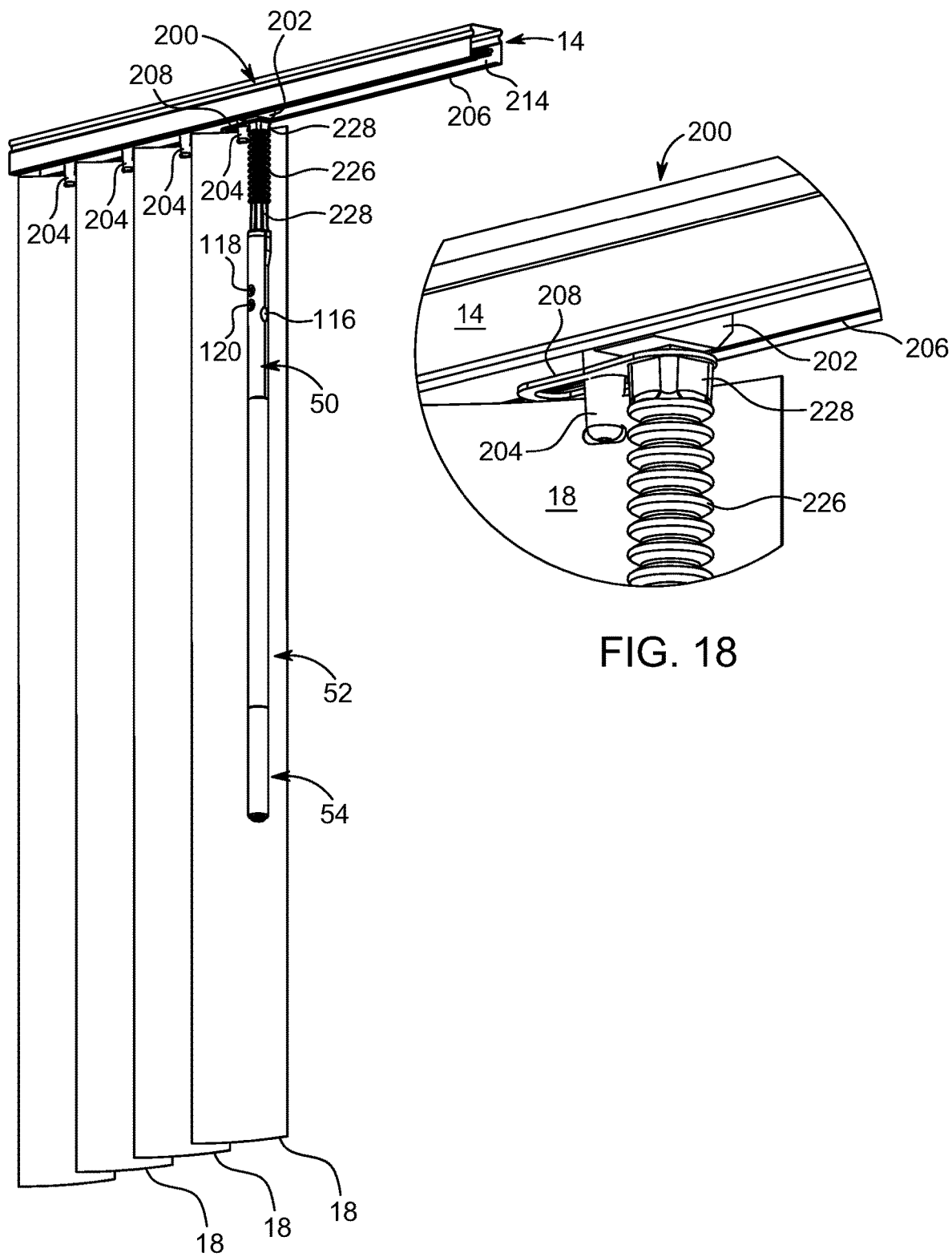
FIG. 17 is a perspective view of a motorized wand system for use with a vertical blind, the view showing the housing, wand and extender, and a bellows and mounting member assembled together and connected to the vertical blind with the first clip and tilt knob of the carrier of the vertical blind connected to the mounting member, and the bellows connecting the mounting member to the motorized wand system.
FIG. 18 is a close-up perspective view of FIG. 17, the view showing the bellows connected to the mounting member and the mounting member connected to the carrier, clip and tilt knob of the vertical blind.
Figure 21:
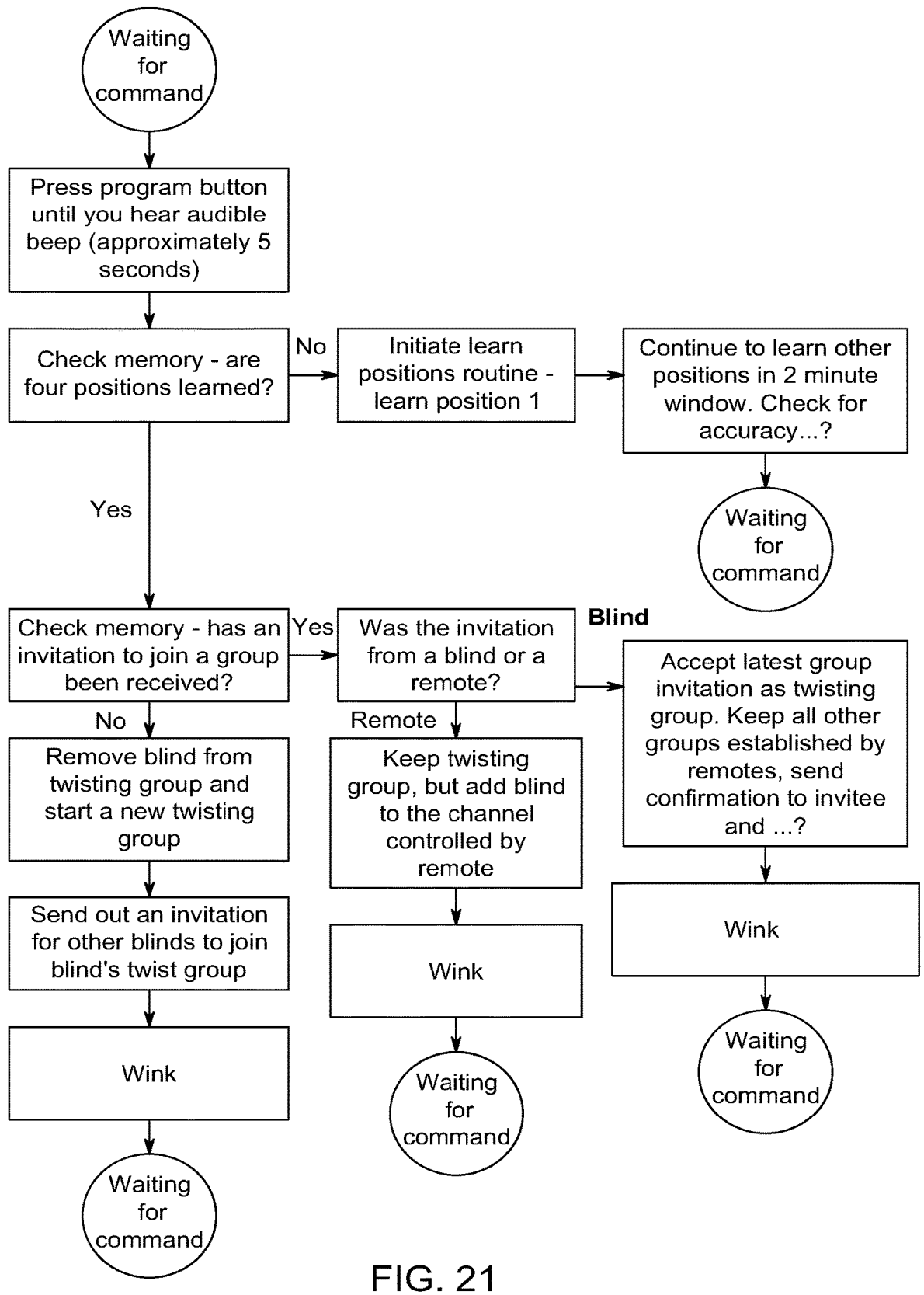
FIG. 21 is a plan view of a flow chart that describes the manner of programming a motorized wand system and grouping and un-grouping multiple motorized wand systems.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

While the figures show the invention used in association with a window covering that is a horizontal blind, the invention is not so limited. A horizontal blind is simply used as an example. It is hereby contemplated that the invention may also be used with vertical blinds, and beyond that with any other window covering, and for that matter any applicable mechanical device.

Horizontal Blind:

The motorized wand system 10 is applicable to any horizontal blind 12. In the arrangement shown, the horizontal blind 12 includes a header 14 having shade material 16 that hangs from the header 14. In the arrangement shown, shade material 16 is in the form of a plurality of horizontally extending slats 18 that are positioned in vertically stacked spaced alignment with respect to one another. The vertical spacing of the plurality of slats 18 is maintained by one or more suspension ladders 20 having rungs 22 spaced at equal intervals across their vertical length, with a slat 18 resting upon each rung 22. The upper end of suspension ladders 20 connect to and/or are held within the hollow interior 24 of header 14. The lower end of suspension ladders 20 connect to a bottom bar 26. The suspension ladders 20 maintain the spacing of the slats 18 as well as maintain the angular orientation or tilt angle of the slats 18 as is further described herein.

At least one suspension cord 28 extends through the plurality of slats 18. In one arrangement, suspension cords 28 extend through openings 30 in the slats 18. These openings 28, and therefore the suspension cords 26, are positioned approximately in the middle of the suspension ladders 20 to provide proper balance. Like the suspension ladders 20, the upper end of suspension cords 28 connect to and/or are held within the hollow interior 24 of header 14. Also like the suspension ladders 20, the lower end of suspension cords 28 connect to bottom bar 26. The suspension cords 28 are used to raise and lower the position of the bottom bar 26 and maintain the amount of shade material 16 that is vertically deployed.

The upper end of the suspension ladders 20 and suspension cords 28 connect to one or more actuating mechanisms 32 positioned within the hollow interior 24 of header 14. Actuating mechanism 32 is any device that adjusts the lengths or positions of the suspension ladders 20 and/or the suspension cords 28. In conventional horizontal blinds 12, the suspension cords 28 are connected to lift spools 34 which control the deployed length of the suspension cords 28. Similarly, the suspension ladders 20 connect to tilt spools 36 that adjust the angular position of the slats 18. These tilt spools 34 are connected to and controlled by a tilt knob 38 that extends outward from the header 14. The term "tilt knob" is to be broadly construed and means any device that is used to tilt the slats 18 of the blind 12, and is also known as a drive gear, a drive gear shaft, a control axis, a control axis mechanism, a twisting mechanism, among countless other names in the industry. This tilt knob 38 includes a knob hook 40 that a conventional tilt wand 42 connects to.

Motorized Wand System:

The motorized wand system 10 is formed of any suitable size, shape and design. In the arrangement shown, the motorized wand system 10 is designed to have a similar appearance to the conventional tilt wand 42 that it replaces. That is, the motorized wand system 10 has a slender elongated body that extends from an upper end 44 to a lower end 46 and has a generally rounded, oval or cylindrical elongated body. The motorized wand system 10 is formed of a plurality of parts, including a driver cover 48, a housing 50, a wand 52 and an extender 54.

Driver Cover:

Driver cover 48 is formed of any suitable size, shape and design. In the arrangement shown, driver cover 48 is generally rounded or partially cylindrical in shape and extends from an upper end 56 to a lower end 58. Driver cover 48 has an opening 60 that extends approximately through its center from its upper end 56 to its lower end 58. This opening 60 is sized and shaped to frictionally receive within close tolerances the upper end of housing 50 therein. This opening 60 is non-round or has at least one feature therein that prevents rotation of housing 50 when positioned within opening 60, as is further described herein. In one arrangement, opening 60 includes a rail, protrusion, groove, or other feature that is positioned within or connected to opening 60 that mates with a corresponding feature in the upper end of housing 50. In another arrangement, opening 60 is rectangular, D-shaped, square, or any other non-round and rotation preventing shape that mates with the upper end of housing 50. Opening 60 is shaped to allow housing 50 to slide vertically or be vertically adjusted within opening 60 while preventing rotation of housing 50 within opening 60.

The forward side 61 of driver cover is generally rounded in shape, whereas the rearward side of driver cover 48 includes an opening or slot 62 therein that extends its vertical length. Slot 62 provides access to the exterior surface of housing 50 when housing 50 is positioned within driver cover 48.

A mounting flange 64 is connected to the upper end 56 of driver cover 48. Mounting flange 64 is generally formed in a planar shape and angles outward or gets wider as it extends upward or away from the rounded body of driver cover 48 and in this way is partially triangular in shape when viewed from the side. Mounting flange 64 includes one or more grooves 66 or narrower section so of mounting flange 64 that extend side-to-side therein that serve as living hinges upon which the plane of mounting flange 64 can be flexed or angled. Mounting flange 64 also includes an opening 67 positioned above the open end of the body of driver cover. Opening 67 provides room for the tilt knob 38 and knob hook 40 so as to ensure that mounting flange 64 does not interfere with these components or operation of the system 10. The living hinges formed by grooves 66 allows mounting flange 64 to flex to essentially any angle so that it can accommodate horizontal blinds 12 of any size, shape and design. In addition, opening 67 provides the needed clearance to again allow for mounting flange 64 to be used with any horizontal blind 12.

The extended surface area of the interior surface of mounting flange 64 is covered with an adhesive material, such as glue, tape, double sided tape, or the like that is used to connect mounting flange 64 to the exterior surface of the header 14 of horizontal blind 12. In one arrangement the material of mounting flange 64 is a generally rigid material such as a plastic, composite, metal, rigid nylon or the like, whereas in another arrangement mounting flange 64 is a generally flexible material such as rubber, rubberized plastic, flexible nylon or the like. When mounting flange 64 is adhered to the side or bottom surface of header 14, the housing 50 is inserted within the opening 60 in driver cover 48 and is held thereon by tight but removable frictional engagement between the driver cover 48 and the housing 50.

Housing:

Housing 50 is formed of any suitable size, shape and design. In the arrangement shown, housing 50 is generally cylindrical in shape and extends from an upper end 75 to a lower end 76. In the arrangement shown, housing 50 includes a pair of halves 78 that connect together in clamshell-like arrangement along a seam line 80 there between. When connected together, these halves 78 form a hollow interior there between that house a motor controller 82, a motor 84 and a gearbox 86.

Motor 84 is any motor type device that converts electrical energy to movement, or more specifically to rotational energy. Motor 84 includes a driveshaft 88 that extends out of the upper end and lower end of motor 84. A magnetic wheel 90 is connected to the lower end of driveshaft 88. The upper end of drive shaft 88 is connected to gearbox 86. Gearbox 86 is any type of a gearing system that converts the number of rotations of drive shaft 88 to the desired number of rotations of output shaft 92. That is, the driveshaft 88 of motor 84 is the input into gearbox 86 at one speed, and the gears of gearbox 86 convert this rotational energy to a second speed at output shaft 92, which is generally a slower speed.

Output shaft 92 is connected to a hook member 94 (otherwise known as a rotatable member) by an extended shaft 95. Hook member 94 is any form of a hook or other device that operably connects motorized wand system 10 to the tilt knob 38 of blind 12. While the term "hook" is used in the name hook member 94, the name is not intended to be so limiting. Instead, the term hook member 94 is intended to mean any form of a device that connects one device to another such as a hook, a clasp, a shackle, a snap-fit device, a loop, a string, a zip-tie, or any other form of a connection member or the like. In the arrangement shown, hook member 94 is sized and shaped to slip over and hold onto the knob hook 40 of tilt knob 38. As the motor 84 rotates drive shaft 88, drive shaft 88 rotates the components of gearbox 86, the components of gear box 86 rotate output shaft 92, output shaft rotates extended shaft 95 which rotates hook member 94 which rotates tilt knob 38 thereby opening or closing the tilt angle of the slats 18 of the horizontal blind 12.

Motor controller 82 is connected to the lower end of motor 84. Motor controller 82 is formed of any suitable size, shape and design. Motor controller 84 controls the operation of motorized wand system 10. In one arrangement, as is shown, motor controller 82 is formed of a printed circuit board ("PCB") 96, or substrate, that provides support and electrical connection for the electrical components of the system 10. Motor controller 84 includes one or more rotation sensors 98 that sense rotation of drive shaft 88 of motor 84. In the arrangement shown, the lower end of drive shaft 88 extends into a recess, pocket or opening in the upper end of motor controller 82 and one rotation sensor 98 is positioned adjacent the magnetic wheel 90 such that the rotation sensors 98 sense the changing magnetic fields as magnetic wheel 90 rotates. Each sensed rotation is transmitted to microprocessor 100 which counts and tracks the rotations of drive shaft 88 thereby tracking the position of the slats 18 and controlling the shade material 16 as is described herein. In one arrangement, sensors 98 are Hall Effect sensors.

Microprocessor 100 is any computing device that receives and processes information and outputs commands according to instructions stored in memory 102. Memory 102 is any form of information storage such as flash memory, ram memory, a hard drive, or any other form of memory. Memory 102 may be included as a part of or operably connected to microprocessor 100. A receiver/transceiver 104 is connected to microprocessor 100. A receiver is used if one way communication is utilized, whereas a transceiver is used if two-way communication is utilized (hereinafter "transceiver"). Receiver/transceiver 104 is connected with an antenna 106, such as a monopole antenna, a loop antenna, a fractal antenna, or any other form of an antenna. Antenna 106 receives wireless signals from a remote 110, another motorized wand system 10 or any other device, transmits these signals to receiver/transceiver 104 which processes these signals and then transmits these processed signals to microprocessor 100 which processes these signals according to instructions stored in memory 102. In one arrangement, any motorized wand system 10 re-transmits operating commands signals the motorized wand system 10 receives through receiver/transceiver 104 so as to similarly control any other motorized wand systems 10 within over-the-air communication distance to the wand system 10. Remote 110 is any form of a remote control device that transmits wireless signals through the air such as a conventional remote control, a cell phone, a wireless device, an internet connected device, a hard-wired device, or any other device capable of transmitting remote control signals.

A twist sensor 112 is connected to motor controller 82. Twist sensor 112 is any device which senses a twist of the wand 52 and/or the extender 54 with respect to the housing 50 such as a strain gauge, a torque sensor, a switch, electrical contacts, or the like. In one arrangement, twist sensor 112 is connected to a shaft that extends outward from the lower end 76 of housing 50 (or first section) and connects to an upper end of wand 52 (or second section). In one arrangement, a biasing member, such as a spring, is connected to and/or positioned between housing 50 and wand 52 so as to maintain the original alignment between the two components 50, 52, to provide a level of resistance to a user when they attempt to twist the wand 52 or extender 54 out of alignment as feedback to the user, and to return the wand 52 or extender 54 back to the original alignment with housing 50 after the user-initiated twist. Twist sensor 112 is operably connected to motor controller 82 and microprocessor 100. When twist sensor 112 senses a twist a signal is transmitted to microprocessor 100 which responds to the signal according to instructions stored in memory 102.

Any other electrical components are positioned on or connected to PCB 96 that are necessary to control or operate system 10.

A plurality of controls are connected to housing 50 that are used to operate, program and control the system 10. In one arrangement, a program button 116, and a first switch 118 (either a temperature switch or light switch) and a second switch 120 (the other of a temperature switch or light switch) are positioned in one half 78 of housing 50 and connect to a related sensor or switch in or on PCB 96. While the term button or switch is used herein to describe the these components 116, 118, and 120, these terms are not meant to be limiting and instead any form of a device is hereby contemplated for use such as a switch, a sensor, a dial or any other electrically connecting or control device may be used. The program button 116 first switch 118 and second switch 120 operate in the manner(s) described herein. Any other number of buttons or switches are hereby contemplated for use.

Wand:

Wand 52 is connected to the lower end 76 of housing 50. Wand 52 is formed of any suitable size, shape and design. In the arrangement shown, wand 52 is generally cylindrical in shape and extends from an upper end 122 to a lower end 124. In the arrangement shown, wand 52 has a hollow interior 126 that receives batteries 130 therein. In one arrangement, batteries 130 are held within a battery holder 128 therein.

Battery holder 128 is any form of a device that holds conventional batteries 130. In the arrangement shown, wand 52 and/or battery holder 128 are generally cylindrical in shape and narrowly designed to hold conventional AA batteries or AAA batteries therein. AA or AAA batteries are desirable because they have a narrow appearance, a substantial capacity and they are readily available and inexpensive. With that said, any other type of battery is hereby contemplated for use.

Battery holder 128 holds batteries 130 in an end-to-end alignment so as to maintain the narrowest possible profile for the system 10. In one arrangement, all batteries 130 are stacked continuous end-to-end physical and electrical connection to one another. This arrangement is also known as being in "series". In this arrangement, no battery holder 128 is needed as the wand 52 serves as the battery holder. In another arrangement, batteries 130 are stacked in physical end-to-end alignment, however they are electrically connected in parallel, or in both series as well as in parallel. Connecting batteries 130 in both series as well as in parallel improves the battery life. That is, when batteries are stacked in series essentially their voltage doubles and their capacity stays the same; whereas when batteries are connected in parallel, their voltage stays the same but their capacity doubles. That is, in one arrangement, wherein nine batteries 130 are used, all nine batteries 130 are aligned in end-to-end physical alignment within battery holder 128 and wand 52, with three sets of three batteries 130 electrically connected in parallel to one another, with the three sets of batteries 130 being connected in series with one another. In yet another arrangement, wherein nine batteries 130 are used, all nine batteries 130 are aligned in end-to-end physical alignment within battery holder 128 and wand 52, with three sets of batteries 130 electrically connected in series to one another, with the three sets of batteries being connected in parallel with one another. This arrangement essentially triples the life of the batteries 130 by increasing both the voltage as well as the capacity.

Battery holder 128 slides within wand 52 and electrically connects to motor controller 82 and/or PCB 96 by an electrical lead thereby powering the electrical components of the system 10. Batteries 130 or battery holder 128 is held in place within wand 52 by a battery cap 134 which encloses opposing ends of wand 52. End cap(s) 134 connect to wand 52 by any manner such as by threaded engagement, snap fit, friction fit or the like.

Extender:

Extender 54 is connected to the lower end 124 of wand 52. Extender 54 is formed of any suitable size, shape and design. In the arrangement shown, extender 54 is generally cylindrical in shape and extends from an upper end 138 to a lower end 140. Extender 54 is used to extend the length of system 10 and is especially used for blinds 12 that are positioned high above the ground. In this way, extender 54 allows a user to reach a motorized wand system 10 connected to a blind 12 out of the user's reach and allows them to twist the motorized wand system 10. In the arrangement shown, extender 54 is generally cylindrical in shape and has an elongated body that is generally cylindrical in shape. The upper end 138 of extender 54 is sized and shaped to matingly engage the lower end 124 of wand 52.

In one arrangement the upper end 138 of extender 54 fits over the lower end 124 of wand 52, whereas in another arrangement the upper end 138 of extender 54 fits within the lower end 124 of wand 52. In yet another arrangement, the upper end 138 of extender 54 includes a metallic insert or magnet that magnetically connects with a metallic insert or magnet 136 in the lower end 124 of wand 52 when the two components are placed within magnetically attracting distance to one another. This arrangement allows the extender 54 to be connected to the battery holder 52, yet allows the extender 54 to separate or be released from the wand 52 in the event that excessive force is applied to the extender 54, such as a child or pet pulling on the extender 54. This break-away arrangement prevents the motorized wand 10 from being broken when extender 54 is pulled with excessive force. In another arrangement, wand 52 and extender 54 connect together in any other manner such as friction fit, threaded engagement, snap-fit features, or the like.

Assembly & Installation:

The motorized wand system 10 is shipped with the driver cover 48 positioned over the housing 50, with the housing 50 protruding above the upper end 56 of driver cover 48 thereby exposing the hook member 94.

The existing tilt wand 42 is removed from the knob hook 40 of the tilt knob 38 of blind 12. Next, the hook member 94 is hooked over the knob hook 40 of the tilt knob 38. Once the user is certain that the hook member 94 is securely engaged with the knob hook 40 of the tilt knob 38 the entirety of the weight of the motorized wand system 10 hangs from the hook member 94 attached to knob hook 40. In this position, the user removes the protective covering on the double sided tape, or other adhesive, on the inside surface of mounting flange 64 of driver cover 48. Next, the user slides the drive cover 48 upward on the housing 50 until the mounting flange 64 is in proper alignment and spacing with the header 14 of blind 12 and the mounting flange 64 is adhered to header 14.

Once adhered in this manner, the weight of the motorized wand system 10 advantageously continues to be supported by the hook member 94, while the adhesion of the mounting flange 64 prevents rotation of the motorized wand system 10 with respect to the blind 12 when actuated. This adhesion has a long and durable life because the weight of the system 10 is not supported by this adhesion. In addition, because the surface area of the mounting flange 64 is large and the plane of mounting flange 64 is approximately perpendicular to the rotational axis or torque generated by motor 84, this adhesion between mounting flange 64 and header 14 has a long and durable life.

In the arrangement where mounting flange 64 is partially flexible or malleable, or includes grooves 66 that form living hinges, this flexion allows the motorized wand system 10 to hang vertically regardless of the angle at which the tilt knob 38 extends outward from the header 14.

In addition, when the mounting flange 64 is generally planar in shape and is formed of a partially or somewhat flexible material, when the mounting flange 64 is attached to the header 14 of the blind 12 the mounting flange 64 is generally rigid with respect to the force of rotation of the motorized wand system 10. That is, when the motorized wand system 10 hangs from the tilt knob 38, the axis of rotation of the motorized wand system 10 is generally perpendicular to the plane of the mounting flange 64 and the mounting flange 64 resists the flexion or in the direction of rotation. Simultaneously, the mounting flange 64 is generally or somewhat flexible when the motorized tilt wand 10 is tilted out of its normal hanging perpendicular alignment, such as when a user grasps the motorized tilt wand 10 to operate it.

Learning Tilt Positions & Problems Caused By Not Having Hard Stops:

Conventionally, motorized window coverings have what are known as 'hard stops". Hard stops are a device, structure or mechanism that physically interrupts or prevents movement of the motor 84 or actuating mechanism 32 beyond a certain point and thereby establishes the limit positions, either, fully open or fully closed. As one example, a hard stop is formed when the bottom bar of a roller shade engages a bumper or other stop that prevents upward movement of the bottom bar. This establishes a firm, unmistakable and repeatable hard stop. When the bottom bar engages the hard stop, the electrical draw of the motor 84 spikes. A sensor can be used to detect this spike, which can then be used to turn off the motor 84 as well as reset a position counter to zero, or a fully open position. In this way, using a hard stop helps to ensure consistent and accurate control of the window covering. The use of hard stops also helps to prevent breaking the window covering by the motor 84 by preventing movement beyond the hard stop.

Manually operated window coverings on the other hand are intended to be operated by hand. Therefore, they often lack hard stops and instead rely upon user discretion to determine when and where to stop movement. This causes substantial issues when adding motorization to manual coverings because there is often no clear stopping point. Therefore, care must be taken to ensure that when adding motorization to an existing manual window covering the motor 84 does not attempt to move the window covering beyond a fully open and fully closed position as this is likely to break the actuating mechanism 32 or other components.

Another substantial challenge in motorizing existing window coverings is that there is often a substantial amount of variability from window covering-to-window covering which must be accounted for. This is, again, because manual window coverings rely upon user discretion to determine whether the window shades are fully opened or fully closed or in the desired position. As such, it is not necessary to have a high degree of precision in the manual actuating mechanism. Variability from window covering-to-window covering is acceptable because the user will use their perception to determine whether the window shades are in the proper position.

Adding to this lack of precision, the amount of rotations of conventional tilt wand 42 needed to move the slats 18 to a desired position often depends on not only where the slats 18 currently are but also upon where the slats 18 previously were. That is, most conventional horizontal blinds 12 have a lot of slack in their actuating mechanisms 32.

Therefore to move the slats 18 from a fully open position 150 (or open tilt position or horizontal position), to a fully closed up position 152 (or fully tilted up position, or closed up position) depends upon the last position of the slats 18. That is, whether the slats 18 got to the fully open position 150 from the fully closed up position 152, or the fully closed down position 154 (or fully tilted down position, or closed down position).

The same can be said for the opposite situation. That is, to move the slats 18 from a fully open position, to a fully closed down position depends upon whether the slats 18 got to the fully open position from the fully closed up position, or the fully closed down position.

As an example, in one exemplary manual horizontal blind 12:

When the slats 18 are currently in the fully open position 150, but were previously in the fully closed down position 154, it takes 12 rotations, or 1200 ticks of Hall Effect sensor 98, to move to a fully closed up position 152.

When the slats 18 are currently in the fully open position 150, but were previously in the fully closed up position 152, it takes 20 rotations, or 2000 ticks of Hall Effect sensor 98, to move to a fully closed up position 152. The additional eight rotations are necessary to take up the slack in the actuating mechanism 32 caused by changing directions.

When the slats 18 are currently in the fully open position 150, but were previously in the fully closed up position 152, it takes 15 rotations, or 1500 ticks of Hall Effect sensor 98, to move to a fully closed down position 154.

When the slats 18 are currently in the fully open position 150, but were previously in the fully closed down position 154, it takes 23 rotations, or 2300 ticks of Hall Effect sensor 98, to move to a fully closed down position 154.

Again, the additional rotations are necessary to take up the slack in the actuating mechanism 32 caused by changing directions.

This variability, slack, or "backlash" is accounted for by programming the motorized wand system 10 to track not just the current position of the slats 18, but also the prior position of the slats 18 and from this information calculating the needed number of rotations to achieve the desired position of the slats 18. To do this, various tilt positions must be learned, the prior position and current position must be stored and from this information the distances or number of rotations to various positions can be calculated.

Backlash in a manual blind 12 is a result of inexpensive and imprecise parts used to make the blind 12. However, backlash is not a problem because a user when tilting the slats of the blind 12 has instantaneous visual feedback of the angular position of the slats 18 as they are twisting the tilt knob 38 and the user stops twisting the tilt knob 38 when they have achieved the desired angular position of the slats 18. Most times, the user is not aware, nor do they care, how many times they must twist the tilt knob 38 to achieve their desired angular orientation of the slats 18

Backlash, however, becomes a substantial problem when motorizing these manual blinds 12. This is because the number of rotations of the tilt knob 38 varies depending upon both the current position of the slats 18 as well as the prior position of the slats 18. As such, to accurately tilt the slats 18, the motorized wand system 10 is made aware of the upper and lower limits of the slats and tracks both the current position of the slats 18, as well as the prior position of the slats 18 within this upper limit and lower limit. With this information, the motorized wand system 10 can account for the backlash in the blind 12 and accurately drive the slats 18 to the desired position. Without accounting for the backlash in the blind 12, the motorized wand system 10 has the potential to either over-drive the angular orientation of the slats 18 and damage the blind 12, or alternatively under-drive the angular orientation of the slats 18 and not achieve the desired result.

As one example, to accommodate this backlash in the blind 12 the following programing sequence is performed:

Step 1:

In one arrangement, the motorized wand system 10 is shipped with the batteries 130 inside the wand 52 with an insulator slip positioned between the batteries 130 and an electrical contact. In one arrangement, the blind 12 begins in a fully open position 150, and the motorized wand system 10 is installed onto the horizontal blind 12 by connecting the hook 94 to the tilt knob 38. To complete the circuit, the insulator slip is pulled thereby completing the circuit and powering the system 10. This initial powering of the system 10 causes the system 10 to automatically start in "learn mode". The learn mode will continue for a predetermined amount of time, such as two, five or ten minutes or the like. If all positions are not learned within that predetermined amount of time, the positions are not learned and the user must enter the learn mode manually or in another manner. The user must ensure that the first switch 118 and second switch 120 are in the off position. Alternatively, the learn mode can be entered/reentered by holding the program button 116 for a predetermined amount of time, such as five or ten seconds. Alternatively, the learn mode can be entered/reentered by doing a power cycle, that is removing a battery 130 and replacing it.

Step 2:

Once the learn mode is entered, the user jogs the blind 12 by twisting the wand 52 and/or extender 54 in a first direction (often a clockwise direction). This twist is sensed by the twist sensor 112 which activates the motor 84 to rotate the hook member 94 a predetermined incremental small amount. The user continues this twisting followed by an incremental movement until the slats 18 are moved to a fully closed up position 152. Once in the fully closed up position 152, the user presses and holds the program button 116 for a predetermined amount of time, such as 5 seconds, until a visual indication, such as a light flash, or an audible indication, such as a beep, is transmitted.

Step 3:

Once the slats are positioned in the fully closed up position 152, the user jogs the blind 12 by twisting the wand 52 and/or extender 54 in a second direction, opposite the first direction (often a counterclockwise direction). This twist is sensed by the twist sensor 112 which activates the motor 84 to rotate the hook member 94 a predetermined incremental small amount. The user continues this twisting followed by an incremental movement until the slats 18 are moved to a fully open position 150. Once in the fully open position 150, the user presses and holds the program button 116 for a predetermined amount of time, such as 5 seconds, until a visual indication, such as a light flash, or an audible indication, such as a beep, is transmitted.

Step 4:

Once the slats are positioned in the fully open position 150, the user continues to jog the blind 12 by twisting the wand 52 and/or extender 54 in the second direction. This twist is sensed by the twist sensor 112 which activates the motor 84 to rotate the hook member 94 a predetermined incremental small amount. The user continues this twisting followed by an incremental movement until the slats 18 are moved to a fully closed down position 154. Once in the fully closed down position 154, the user presses and holds the program button 116 for a predetermined amount of time, such as 5 seconds, until a visual indication, such as a light flash, or an audible indication, such as a beep, is transmitted.

Step 5:

Once the slats are positioned in the fully closed down position 154, the user jogs the blind 12 by twisting the wand 52 and/or extender 54 in the first direction. This twist is sensed by the twist sensor 112 which activates the motor 84 to rotate the hook member 94 a predetermined incremental small amount. The user continues this twisting followed by an incremental movement until the slats 18 are moved back to the fully open position 150. Once in the fully open position 154, the user presses and holds the program button 116 for a predetermined amount of time, such as 5 seconds, until a visual indication, such as a light flash, or an audible indication, such as a beep, is transmitted.

Once all four positions are learned, the motorized wand system 10 provides a visual or audible indication that the system 10 has been fully learned by issuing a double beep, a prolonged beep, or by "winking" the slats 18, which is moving the slats 18 to the fully closed up position 152, then to the fully closed down position 154 and then back to the fully open position 150, or some other combination thereof. This unmistakably informs the user that the system 10 has been fully programed.

In addition, once fully programmed, a prolonged twist of wand 52 and/or extender 54 cause a continuous movement of the slats 18 until they reach the fully closed up position 152 or the fully closed down position 154; whereas prior to programming the system 10 any twist of the wand 52 and/or the extender 54, either short or prolonged, only caused the motorized wand system 10 to make an incremental movement of the slats.

Note, any reference to a fully closed down position 154 can be replaced with a fully closed up position 152 and vice versa.

As another example, to accommodate backlash in the blind 12 the following programming sequence is performed to accurately program the limits:

Step 1:

Once the learn mode is entered, the user moves the slats 18 to either the fully closed up position 152 or fully closed down position 154 and the user saves or stores the position, such as by a button press or like operation. Care should be taken to ensure that the slats 18 are moved to the desired position without reversing the direction of movement because reversing the movement will take up some or all of the backlash thereby skewing the results.

Step 2:

Next, the user moves the slats 18 to the opposite position, either fully closed up position 152 or fully closed down position 154 and the user saves or stores the position, such as by a button press or like operation. Again, care should be taken to ensure that the slats 18 are moved to the desired position without reversing the direction of movement because reversing the movement will take up some or all of the backlash thereby skewing the results.

Step 3:

Next, the user moves the slats 18 back to the original position, either the fully closed up position 152 or fully closed down position 154, and the user saves or stores the position, such as by a button press or like operation. Again, care should be taken to ensure that the slats 18 are moved to the desired position without reversing the direction of movement because reversing the movement will take up some or all of the backlash thereby skewing the results.

Step 4:

Next, the user moves the slats 18 to the fully open position 150 and stores the position. Again, care should be taken to ensure that the slats 18 are moved to the desired position without reversing the direction of movement because reversing the movement will take up some or all of the backlash thereby skewing the results.

In this way, the distance or number of rotations between positions can be calculated as well as the distance or number of rotations taken up by backlash.

Note: additional iterations of moving the slats 18 to known positions, such as fully up, down or fully open, may be performed to provide more-accurate results by repeating the movements and averaging the results. By moving to the positions more than once and storing these repeated positions, this can improve the accuracy of control by providing more than one data point for each position and thereby providing an average. In one arrangement, the microprocessor 100 averages the distance or number of turns between positions as well as the number of turns to take up backlash.

Clearing Tilt Positions:

In the event that the tilt positions ever need to be cleared or reprogrammed, this can be done by moving the first switch 118 and the second switch 120 to the off position. Next, the program button 116 is held for a predetermined amount of time, such as five seconds or ten seconds. In one arrangement, after five seconds a first single beep is transmitted, and then after ten seconds two beeps are transmitted which indicates the tilt positions have been cleared from memory 102. The tilt positions then are relearned in the manner described herein.

Intermediary Positions:

Once the learn sequence is fully completed and the fully open position 150, fully closed up position 152 and fully closed down position 154 are learned, other intermediary positions are automatically calculated or programmed by microprocessor 100 and stored in memory 102. As one example, intermediate tilt positions are preprogrammed between the fully open position 150 and the fully closed up position 152, and intermediate tilt positions are preprogrammed between the fully open position 150 and the fully closed down position 154. In one arrangement, two preprogrammed positions are automatically calculated between the fully open position and the fully closed positions for a total of seven preprogrammed positions (from top to bottom: 1. Fully closed up, 2. One third of the way down toward the fully open position, 3. Two thirds of the way down from the fully closed up position toward the fully open position, 4. Fully open position, or level position, 5, One third of the way down from the fully open position toward the fully closed down position, 6. Two thirds of the way down from the fully open position toward the fully closed down position, 7. Fully closed down position). In one arrangement, these intermediate positions are positioned at approximately one-third and two thirds of the distance or angle between the fully open position 150 and fully closed up position 152 or the fully closed down position 154. However, these intermediary positions can be custom programmed to any angle.

In one arrangement, these intermediary positions are calculated by multiplying the total number of estimated or learned rotations between a fully closed up position and a fully closed down position by the percentage of openness desired. That is if it takes 100 rotations of the motor, motorized wand system 10 calculates that the fully open position is 50 rotations from the fully closed up position or fully closed down position. The same calculation is made when the direction of rotation is accounted for and the number of rotations is considered to take up the slack or backlash in the tilting mechanism. That is, when a change in direction occurs, the microprocessor 100 takes account of the number of rotations to take up the backlash or slack and then from there calculates the number of rotations to reach each intermediary position. This arrangement greatly eases the ability to establish intermediary positions, and it greatly improves the accuracy and repeatability of placing slats 18 at the intermediary positions. In one arrangement, a separate button or other sensor (such as a zone on a touch screen) is associated with each intermediary position allowing a user to press one button to move the slats 18 to the intermediary position.

The Term "Fully Closed":

The term "fully closed" is used herein to describe a position of the slats 18. As described herein, the slats 18 of blinds 12 tilt between a first fully closed position and a second fully closed position, which is the full range of tilting motion of the slats 18. Due to varying characteristics of various vertical and horizontal blinds 12 the slats 18 may not truly be "fully closed" when at their fully tilted positions, and instead, a small gap or small amount of light may extend through adjacent slats 18 at these "fully closed" positions. As such, the term "fully closed" in the terms the first fully closed position, the second fully closed position, the fully closed up position, the fully closed down position, the fully closed left position and the fully closed right position, among others does not require that she slats truly be fully closed. Instead, the term "fully closed" as used herein describes either the point or the approximate point at which the slates 18 will tilt no further, or the user-selected point of angular tilting in the direction described (which does not necessarily have to be at the point where the slats 18 will tilt no further). As such, the term "fully closed" used herein is broader than a strict construction of the term fully closed.

Furthermore, the terms "limit position" may be used in place of fully closed up or fully closed down positions. That is, the term limit position, as used herein, describes a user-set position, which may or may not be a fully closed up position or a fully closed down position.

Twisting Operations:

Manually twisting the motorized wand system 10 is one manner of operating the system 10 and activating the motor 84 to move slats 18 of blind 12 in the desired manner. To do so, the user grasps the wand 52 or extender 54 sections (or second section) of the system 10 and manually twists in the direction the user desires the slats 18 to be moved, either a first direction or an opposite second direction. Because the driver cover 48 is connected to the header 14 of blind 12 and the housing 50 is connected to the driver cover 48 (the first section) in a non-rotatable manner, this twist causes the second section to at least partially rotate with respect to the first section.

This twist is intended to emulate the manner in which users generally adjust the angular rotation of slats 18 of blind 12. That is, the user is accustomed to rotating the tilt wand 42 of blind 12 to adjust the angle of the slats 18. This twisting is therefore a very familiar and intuitive task for the user to perform. In addition, the flexibility of the mounting flange 64 allows the user to tilt the system 10 out of vertical alignment during this twisting motion without breaking the system 10.

This twist is sensed by twist sensor 112 and transmitted to the motor controller 82/microprocessor 100 which then activates the motor 84 to move in the direction of the twist.

There are two types of twists, a short twist and a long twist. A short twist is a twist which is less than a predetermined amount of time, whereas a long twist is a twist which is more than a predetermined amount of time. When the system 10 is not yet programmed, as is described herein, the both a short twist and a long twist will only move the motor 84 an incremental amount. This is because the system 10 is not programmed to know the upper and lower limits yet.

In contrast, when the system 10 has been programmed to the blind 12, a short twist and a long twist cause differing reactions. In one arrangement, in response to a short twist, the motor 84 is activated to drive either an incremental amount (such as 10 degrees or 10% of total amount of tilting or the like) or to the next predetermined position; whereas a long twist causes the motor 84 to drive to the next predetermined position, to the next upper or lower limit, or causes the motor 84 to continuously drive until either the twist is released and the second section is returned to its original alignment with the first section by the biasing member connected to or between the first section and the second section or until the upper or lower limit is reached (thereby preventing damage to the blind 12 by driving past the upper or lower limit).

Twisting Group:

Motorized wand system 10, can be operated by twisting the wand 52 and/or the extender 54 or pressing a button on remote control 110. In some applications, where a plurality of motorized wand systems 10 are used in a single area, it is desired to have a number of horizontal blinds 12 respond to a single command transmitted from either a remote control 110 or from another motorized wand system 10.

A "twisting group" is a group of blinds 12 that respond to a twisting tilt of any motorized wand system 10 in the group. That is, when one motorized wand system 10 is twisted, it generates and transmits a signal through receiver/transceiver 104 (otherwise known as a signal generator) that is received by all other motorized wand systems 10 in the group to respond in like fashion.

First, to be eligible to join a group, the motorized wand system 10 must be programmed in the manner described herein. Once the four tilt positions have been learned, the program button 116 is held for a predetermined amount of time until a beep or other signal is transmitted and the blind 12 winks or provides another confirmation. The wink signifies that the blind has all four tilt positions learned and that the motorized wand system 10 has checked to see if other motorized wands systems 10 have sent it an invitation to join a twisting group. If yes, the motorized wand system 10 joins the twisting group (accepts the invitation); if no, the motorized wand system 10 removes itself from any other twisting group and transmits an invitation for all other motorized wand systems 10 within over the air communication distance to join its new group.

Next, the user presses and holds down the program button 116 of the next motorized wand system 10 that is desired in the group until it beeps. When the second motorized wand system 10 beeps both the first and second motorized wand systems 10 wink, showing the user all the shades that are currently joined to the group.

The user continues to join motorized wand systems 10 to the group by pressing and holding the program button 116 of additional motorized wand systems 10 in this manner until all desired motorized wand systems 10 are joined to the twisting group.

To exit the join twisting group mode either a predetermined amount of time passes, or the wand 52 or extender 54 of any motorized wand system 10 in the group is twisted. This closes the twisting group. From that point on, all motorized wand systems 10 in the twisting group respond in like fashion whenever any of the motorized wand systems 10 in the group receive a twisting command.

In one arrangement, motorized wand systems 10 can only be part of a single twisting group. In one arrangement, each motorized wand system 10 acts as a repeater thereby enhancing range and reliability of the twisting group.

To remove a motorized wand system 10 from a twisting group, the user presses and holds the program button 116 on the motorized wands system 10 that is to be removed from the twisting group. When an audible beep is heard, the motorized wand system 10 is removed from the twisting group and a new learn twisting group mode is initiated. If the user stops at this point, the motorized wand system 10 is in a twisting group of only itself. No loss of custom programmed position settings or other parings with other remote controlled groups occurs during the removal of a motorized wand system 10 from a twisting group.

Remote Groups:

Like a twisting group, a plurality of motorized wand systems 10 can respond as a group to a single button press of a channel of a remote 110, otherwise known as a "remote group". Each motorized wand system 10 can be included in a plurality remote groups.

In one arrangement, a multichannel remote 110 is used having a plurality of channel indicators 156, which illuminate to indicate which channel the remote 110 is on, and a channel toggle button 158 that toggles the remote 110 between channels. This remote also includes a recessed program button (not shown) in its rear surface that can be activated by pressing a paperclip into the recessed button. First, to be eligible to join a group, the motorized wand system 10 must be programmed in the manner described herein. Once the four tilt positions are learned, to learn a remote 110 to a plurality of motorized wand systems 10, the channel toggle button 158 is pressed until the desired channel is selected as indicated by the desired channel indicator 156 being illuminated. Next, using a paper clip, the recessed button on the back of the remote 110 is pressed. Once pressed, the channel indicators 156 will begin to light up in scrolling or flashing fashion, or in another manner indicating the condition the remote 110 is in. Next, a button, such as a "tilt up button", is pressed on the face of remote 110 and a command is sent to all motorized wand systems 10 in communication distance to the remote 110 inviting the motorized wand systems 10 to join the remote group. All motorized wand systems 10 that receive this command will wink in response indicating the motorized wand system 10 is ready to join the remote group.

To join the motorized wand system 10 to the remote group, the user presses the program button 116 on the desired motorized wand systems 10 for a predetermined amount of time, such as five seconds, until an audible beep and the individual motorized wand system 10 winks.

Once all motorized wand systems are joined to the remote group, any button on the remote 110 is pressed and held for a predetermined amount of time, thereby exiting the group. In this way the remote group is formed.

Motorized wand systems 10 can be removed from a remote group by pressing the channel toggle button 158 until the desired channel indicator 156 is illuminated. Using a paper clip, the recessed button in the back of the remote 110 is pressed. The channel indicators 156 will begin to light up in scrolling fashion, or flashing fashion, or in another manner indicating the condition the remote 110 is in. Next, a button, such as a "tilt down button", is pressed on the face of remote 110 and a command is sent to all motorized wand systems 10 in communication distance to the remote 110 inviting the motorized wand systems 10 to be deleted or unpaired or un-joined from the remote group. All motorized wand systems 10 that receive this command will wink in response indicating the motorized wand system 10 is ready to be deleted or unpaired or un-joined from the remote group.

To be deleted or unpaired or un-joined from the remote group, the user presses the program button 116 on the desired motorized wand systems 10 for a predetermined amount of time, such as five seconds, until an audible beep and the individual motorized wand system 10 winks.

To improve reception and to ensure all motorized wand systems 10 in the remote group move in response to a remote signal being transmitted, when any one motorized wand system 10 receives the remote signal, that motorized wand system 10 retransmits that or a similar signal through receiver/transceiver 104 (otherwise known as a signal generator) that is then intended to be received by all other motorized wand systems 10 in the remote group to respond in like fashion unless they have already received the remote signal and moved accordingly.

Temperature Settings:

In one arrangement, one of the first switch 118 and second switch is a two-position or three-position switch that controls a temperature sensor 160 positioned within or connected motorized wand system 10.

In one arrangement, motorized wand system 10 comes preprogrammed with a temperature threshold and the switch 118, 120 that controls the temperature sensor 160 is a two-position switch having an on position and an off position. When in the on position and the temperature threshold is surpassed, as is sensed by a thermometer or other temperature sensor 160 connected to or positioned within the motorized wand system 10, the motorized wand system 10 moves the slats 18 to the fully closed up position 152 (or fully closed down position, or any other user set predetermined position) thereby limiting the amount of light that passes through the slats 18 and reflecting the maximum amount of heat and light back out through the window thereby increasing energy efficiency. Alternatively, when the temperature threshold is met or exceeded, the slats 18 are moved to a fully closed down position 154; or alternatively to a fully open position 150, or any other user selected predetermined position, or in the case of a vertical blind to a fully tilted left position or a fully tilted right position, or any other position.

The temperature setting can be custom set by the user by turning the switch 118, 120 that controls the temperature sensor 160 on and off and then on within a predetermined amount of time, such as ten seconds and then pressing and holding the program button 116 for a predetermined amount of time, such as ten seconds until two audible beeps are transmitted. When the two audible beeps are transmitted, the factory default setting for temperature activation is reset to the currently experienced temperature of the motorized wand system 10. A similar process can be performed to set the angular position of the slats 18.

In another arrangement, the switch 118, 120 that controls the temperature sensor 160 is a three-position switch having an off position, a first position and a second position. When in the first position and the temperature threshold is surpassed, as is sensed by a thermometer or other temperature sensor 160 connected to or positioned within the motorized wand system 10, the motorized wand system 10 moves the slats 18 to the fully closed up position 152 (or fully closed down position, or any other predetermined user selected position) thereby limiting the amount of light that passes through the slats 18 and reflecting the maximum amount of heat and light back out through the window thereby increasing energy efficiency. Alternatively, when the temperature threshold is met or exceeded, the slats 18 are moved to a fully closed down position 154, or any other user selected predetermined position, or in the case of a vertical blind to a fully tilted left position or a fully tilted right position, or any other position. When switch 118, 120 is in the first position, when the temperature again drops below the temperature threshold (such as the sun setting, or the sun rising), nothing happens. In this arrangement, the motorized wand system 10 must be twisted or a button pressed on remote 110 to move the slats 18 of the shade 12.

When the switch 118, 120 is in the second position, the motorized wand system 10 reacts by closing the blind 12 when the temperature threshold is exceeded (either by moving to the fully closed down position 154 or the fully closed up position) and then when the temperature drops below the temperature threshold (such as when the sun sets) the motorized wand system 10 moves the slats 18 back to their original position the slats 18 were in before the temperature threshold was first exceeded.

Light Settings:

In one arrangement, one of the first switch 118 and second switch 120 is a two-position or three-position switch that controls a light sensor 162 positioned within or connected motorized wand system 10.

In one arrangement, motorized wand system 10 come preprogrammed with a first light threshold that is intended to close the slats 18 at dusk for maximum privacy and the switch 118, 120 is a two-position switch having an on position and an off position. When the switch 118, 120 is in the on position and the first light threshold is surpassed (such as when the sun sets), as sensed by the light sensor 162, the motorized wand system 10 moves the slats to the fully closed up position 152 (or a fully closed down position 154, or any other user set predetermined position) thereby maximizing privacy at night, or any other position selected by the user.

The light setting can be custom set by the user by turning the switch 118, 120 that controls light sensor 162 on and then off and then on again within a predetermined amount of time, such as ten seconds and then pressing and holding the program button 116 for a predetermined amount of time, such as ten seconds until two audible beeps are transmitted. When the two audible beeps are transmitted, the factory default setting for light activation is reset to the current light amount experienced by the motorized wand system 10.

In another arrangement, the switch 118, 120 that controls the light sensor 162 is a three-position switch having an off position, a first position and a second position. When in the first position and the light threshold is surpassed (such as the sun sets, or sun rises), as is sensed by a light sensor 162 connected to or positioned within the motorized wand system 10, the motorized wand system 10 moves the slats 18 to the fully closed up position 152 (or fully closed down position 154, or any other user set predetermined position) thereby maximum privacy such as by preventing others outside the building from looking into the building. Then, when the light threshold is again exceeded, (such as the sun rises again, or the sun sets again) the motorized wand system 10 again returns the slats 18 back to their original position before the light threshold was first exceeded.

Vertical Blinds:

With reference to FIGS. 12-20 a motorized wand system 10 is shown for use with a vertical blind 200. Vertical blinds 200 are similar to horizontal blinds 12 in that vertical blinds include a head rail or header 14 that slidably holds shade material 16 in the form of a plurality of vertically extending slats 18. Slats 18 are slidable along the length of header 14 by a carrier 202 which is connected to an inward-most slat 18. Carrier 202 includes tilt knob 38 which is used to tilt the angular orientation of slats 18 between opposing fully closed positions and a fully open position. Each slat 18 is removably connected to header 14 by clips 204 that extend downward from the centrally positioned slot 206 in the bottom surface of header 14.

Motorized wand system 10 connects to carrier 202 of vertical blind 200 by a mounting member 208. Mounting member 208 is formed of any suitable size, shape and design. In the arrangement shown, mounting member 208 includes a tab 210 having an elongated slot 212 therein and a downwardly extending collar 214. Tab 210 is generally planar in shape and extends a lateral length from end 216 to end 216. Slot 212 is generally rounded or oval or elongated in shape and is positioned more toward one end 216 than the other. Collar 214 extends downward from tab 210 and is positioned more toward the opposite end 216 of tab 210 from slot 206. In the arrangement shown, collar 214 is generally square or rectangular in shape, however any non-round in shape is hereby contemplated for use. Collar 214 slightly narrows as it extends downward from tab 210. An opening 218 extends through tab 210 and collar 214 and is centrally aligned with collar 214.

Mounting member 208 connects to vertical blind 200 by the first clip 204 closest to carrier 202 being inserted within slot 212 of tab 210. In this position, mounting member 208 is positioned between the slot 206 in the bottom surface of header 14 and the upper end of the first slat 18. Next, the tilt knob 38 is positioned within the opening 218 that extends through collar 214 and tab 210. Opening 218 is sized and shaped to receive tilt knob 38 therein while allowing free rotation of tilt knob 38. In this arrangement, the insertion of clip 204 into slot 212 of tab 210, prevents rotation of mounting member 208 when torque is applied to tilt knob 38 positioned within collar 214.

The upper end 75 of motorized wand system 10 includes a collar 220 that is similar to collar 214 of mounting member 208. That is, collar 214 extends upward from the upper end of housing 50 and in the arrangement shown is octagonal or hexagonal in shape, however any non-round shape is hereby contemplated for use. Like collar 214, collar 220 tapers or narrows slightly as it extends upward from housing 50. Collar 220 includes an opening 222 therein that extends though collar 220 and connects to the hollow interior of housing 50. Shaft 95 extends through collar 220 and freely rotates within collar 220 and serves to transmit rotational movement from motor 84 to tilt knob 38 of vertical blind 200.

A bellows 224 is positioned between the motorized wand system 10 and the vertical blind 200. Bellows 224 is formed of any suitable size, shape and design and serves to prevent the motorized wand system 10 from rotating while still allowing the motorized wand system 10 to be tilted out of vertical alignment. In the arrangement shown, bellows 224 includes a generally cylindrical corrugated section 226. Corrugated section 226 is flexible, meaning that it can be easily tilted or bent. Corrugated section 226 is also compressible, meaning that the length of the bellows 224 can be temporarily shortened by applying pressure on both ends, however when the pressure is removed, the bellows 226 naturally returns to its standard length. Corrugated section 226 however resists angular rotation.

A socket 228 is positioned at both the upper and lower ends of corrugated section 226. The socket 228 positioned on the upper end of corrugated section 226 is sized and shaped to receive the downwardly extending collar 214 of mounting member 208. The socket 228 positioned on the lower end of corrugated section 226 is sized and shaped to receive the upwardly extending collar 214 of housing 50. These sockets 228 slightly narrow or taper inward as they extend towards corrugated section 266. This tapering, coupled with the tapering of collars 214, 220 serve to provide a tighter-and-tighter frictional fit between the two components as the collar 214, 220 is further inserted within the socket 228. This tapering also makes it easier to initially insert collar 214, 220 into socket 228.

To install the motorized wand system 10 on vertical blind 200, first mounting member 208 is installed on vertical blind 200 by inserting the first clip 204 closest to carrier 202 within slot 212 of tab 210 and slat 18 is installed on the clip 204 thereby holding the mounting member 208 onto clip 204. Next, the tilt knob 38 is inserted within the opening 218 that extends through collar 214 and tab 210.

Next bellows 224 is installed around shaft 95 and hook member 94. The lower socket 228 of bellows 224 is forced onto the collar 220 of housing 50. In this arrangement, collar 220 and bellows 224 are non-rotationally connected to one another as lower socket 228 and collar 220 are non-round and sized and shaped to receive one another in frictional mating engagement. Next, the installer applies pressure onto the upper end of bellows 224 thereby compressing the vertical length of bellows 224. This compression exposes hook member 94. Once hook member is exposed, hook member 94 is installed onto tilt knob 38 that protrudes through collar 214 of mounting member 208.

Once the hook member 94 is installed onto tilt knob 38 pressure is removed from bellows 224 thereby allowing bellows 224 to regain their original or static length. As the bellows 224 regain their original length, the upper socket 228 naturally fits over the collar 214 of mounting member 208 in mating frictional engagement.

This connection at the upper and lower ends of bellows 224 allows the motorized wand system 10 to be tilted out of vertical alignment, which naturally occurs when a user grasps the wand 10 to laterally open or close the vertical blind 200. However, this connection at the upper and lower ends of bellows 224 prevents motorized wand system 10 from rotating due to the non-round engagement between sockets 228 and collars 214, 220.

Once installed on vertical blind 200, motorized wand system 10 is the same or similar manner described herein with respect to horizontal blinds 12.

Calculating Backlash:

In one arrangement, microprocessor 100 of motorized wand system 10 tracks not only the current position of the slats 18 of the shade 16, but also tracks a backlash position. That is, storing the four positions of the programming sequence described herein, the microprocessor 100 calculates the total distance between fully closed up 152 and fully closed down 154. By going through the programming sequence, microprocessor 100 also calculates the amount of backlash, or a backlash number, or a number of ticks or rotations needed to begin moving the slats 18 when a change in direction of movement occurs. In this way, microprocessor 100 tracks two numbers, or accumulates two numbers, a total position number and a backlash number. When the motor 84 changes direction, the microprocessor 100 begins deducting counts from the backlash number, once the backlash number has been exceeded then the microprocessor 100 begins accumulating counts for the current position of the slats 18. In this way, the microprocessor 100 accurately tracks and controls the angular position of the slats 18.

Predictive Movements:

In one arrangement motorized wand system 10 includes a predictive movement button that activates and deactivates a predictive movement function. Many users of blinds 12 perform approximately the same processes at approximately the same time, day-in and day-out. That is, these users tend to open, close or adjust their blinds 12 in the same way at about the same time every day. Or, in geographic locations where the amount of daylight varies greatly from winter to summer, users tend to open, close or adjust their blinds 12 in the same way about the same times of the year as the position of the sun moves and as the time of sunrise and sunset change.

To save the user this effort, the motorized wand system 10 includes a timer or clock connected with the microprocessor 100 and the system 10 that tracks the timing and position of user initiated movements. The system 10, also tracks the amount of light that is present at the time of these user initiated movements through light sensor 162. The system 10, also tracks the temperature at the time of these user initiated movements through temperature sensor 160. With this information, over time, the system 10 tracks the user initiated movements and predicts movements in the future based on this information. That is, based on the combination of information of: time of movement, position moved from, position moved to, date, light amount, temperature, and any other information, the system predicts movements into the future.

This predicted schedule of movements is dynamic and ever-changing. That is, in the event that a motorized wand system 10 moves a blind 12 to a predicted position and the user manually changes the position of that shade (they essentially correct the predicted movement position), the system 10 takes that corrected position into account and changes the predicted schedule of movements accordingly. In this way, the motorized wand system 10 adapts to the user's preferences as they change over time and from season to season.

While predicted movements may begin after a short data collection period, such as a few days or few weeks, with a timer or clock as part of the system 10, the system 10 has the ability to track the changes over an entire year's period and apply the user's preferences according to the time of year. In this way, the predictive movement functionality provides the user with a better user experience, improved functionality, customization and convenience.

Incremental Movements

For the purposes of the following discussion the term window covering 230 or window shade or similar language is to mean any form of a window covering or window shade. This includes but is not limited to venetian shades, horizontal blinds, roller shades, roman shades, honeycomb shades, drapery tracks, rotating drapery rods window coverings (such as that presented in U.S. Pat. No. 9,095,908 entitled "Rotatable Drive Element For Moving A Window Covering" which is owned by Applicant, and which is incorporated fully herein by reference including any continuation, continuation-in-part, divisional, reissue, or other related applications), horizontally opening shades, vertically opening shades, or any other form of a window covering or window shade. Examples of window covering 230 are shown as horizontal blind 12 shown in FIGS. 8-11 and vertical blind 200 shown in FIGS. 17-20 herein.

For purposes of the following discussion, the term motorized window covering 230 or motorized window shade or similar language is to mean any form of a window covering or window shade that is moved by motorization. Motorized window coverings 230 or motorized window shades may be separated into two groups, those where the motor 84 is included as the original equipment from the factory, and those where the motor 84 is added to what was originally a manually operated window covering.

Conventionally, when motorized window coverings 230 are moved, power is supplied to the motor 84 in a generally continuous manner. That is, when the motorized window covering 230 starts with the shade material 16 in a start position 236 (such as fully opened or fully closed or anywhere in between) and power is supplied to the motor 230 in a generally continuous manner until the shade material 16 reaches an end position 238 (such as fully closed or fully opened or anywhere in between). This process is effective in that it moves the shade material 16 in a relatively time efficient manner.

Powering motor 84 in a generally continuous manner between the start position 236 and the end position 238 is desirable in that this causes rapid and timely movement of the shade material 16. This is desirable when a user is present in the location of the window covering 230 and they are waiting for the window covering 230 to move upon command (as examples, the user is waiting for the window covering 230 to open so that they can exit a sliding glass door, or the user is waiting for the window covering(s) to close so that they can start a movie or presentation).

However, powering motor 84 in a generally continuous manner between the start position 236 and the end position 238 is undesirable in that it causes excessive or unnecessary noise from motor 84 (which is often referred to as motor whine). That is, when power is applied to motor 84 the motor 84 quickly changes state from being stationary to rotating. When power is applied to motor 84 the motor 84 quickly accelerates until it reaches its maximum speed or maximum revolutions per minute based on the amount of power supplied to the motor 84. A benefit of operating motor 84 at its maximum speed is that the shade material 16 is moved in a rapid manner and the motor 84 generally operates in a relatively efficient manner. A drawback of operating motor 84 at its maximum speed in a continuous manner or for an elongated period of time is that the motor 84, and/or the entire window covering 230, tends to generate excessive noise, harmonics or motor whine.

It has been tested and observed that when motorized window coverings 230 are powered in a continuous manner motor 84 harmonics begin to develop in the motor 230, gearbox 86 and/or other components of the motorized window covering 230. It has also been observed that the faster a motor 84 (and/or gearbox 86 and/or other components of the motorized window covering 230) rotates, the higher pitched the noise, and the higher pitched the noise, the more undesirable the noise is to the user.

Figure 22:
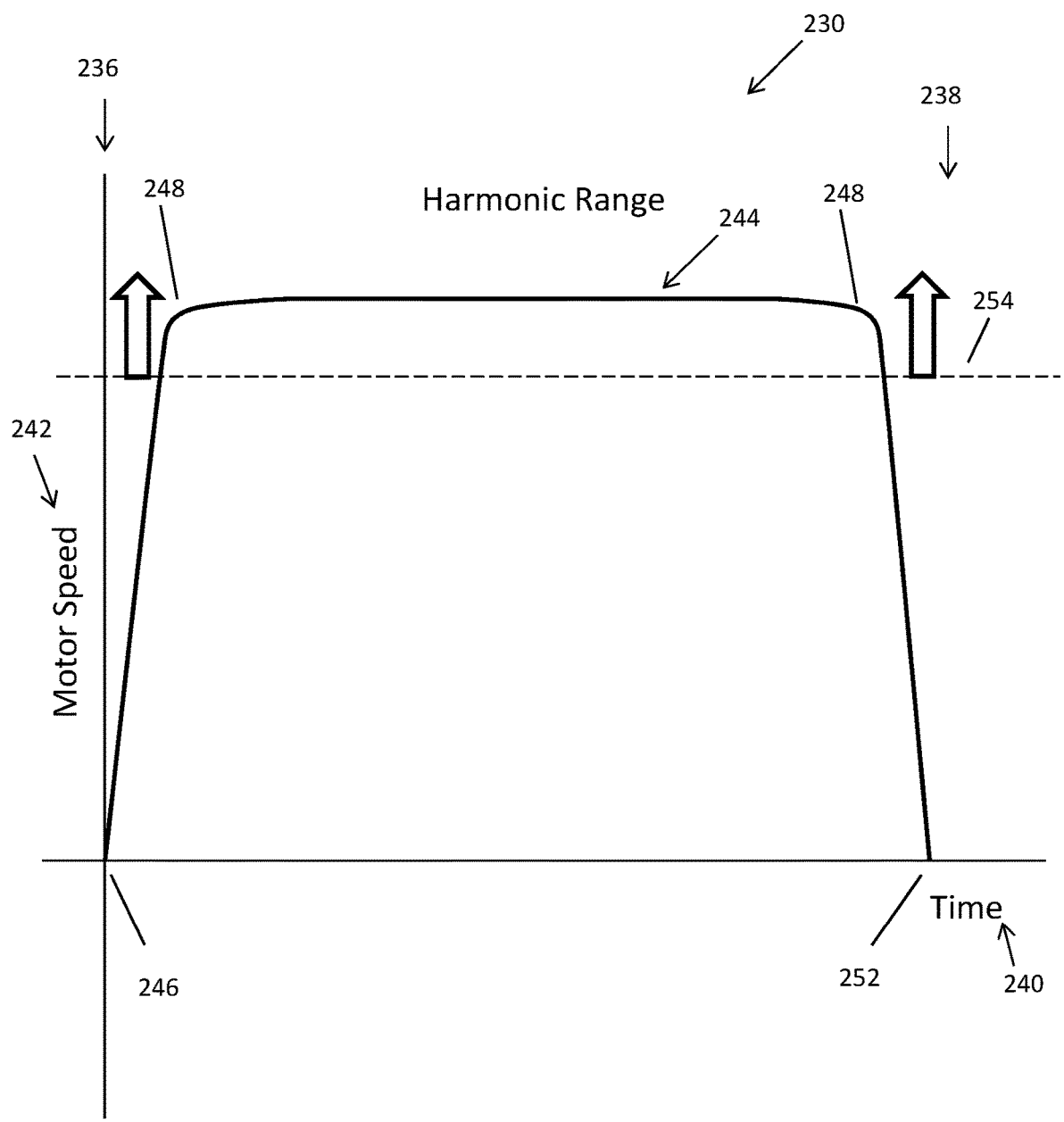
FIG. 22 is a plan view of a demonstrative chart showing operation of a motorized window covering in response to a standard movement command, the view showing the motor being powered in a generally continuous manner, the view showing the motor operating in the noisier harmonic range.

This is depicted in a demonstrative FIG. 22. In FIG. 22, an exemplary graph of the operation of motorized window covering 230 is shown. The horizontal axis is shown as "Time" 240. The vertical axis is shown as "Motor Speed" 242. Line 244 represents the speed of motor 84 over time. Prior to starting point 246, motor 84 is in an unpowered state. That is, motor 84 is in a non-moving condition and the shade material 16 is at start position 236 at or before the starting point 246. At starting point 246 power is applied to motor 84 and motor 84 immediately or shortly thereafter begins movement. Upon being powered, motor 84 begins accelerating. This acceleration continues in a relatively rapid fashion until motor 84 reaches its maximum speed or maximum revolutions per minute at or around point 248 where the acceleration of motor 84 tapers off and transitions into a relatively flat and continuous operation at the maximum speed or maximum revolutions per minute. This maximum speed or maximum revolutions per minute continues for so long as power is generally continuously applied to motor 84. At or around point 250 power is turned off to motor 84 and motor begins to decelerate due to the reduction or removal of power. This deceleration continues until the motor 84 stops movement at point 252.

As is discussed herein, as the motor 84 rotates with greater speed motor 84 and/or gearbox 86 and/or the other components of motorized window covering 230 generate additional noise. Dashed line 254 represents the start of what is herein called the "Harmonic Range". When motor 84 rotates at a speed above line 254 the noise generated by motorized window covering 230 increases or the harmonics of motor 84, gearbox 86 and/or motorized window covering 230 in general increase. Or, said another way, motorized window covering 230 operates in a quieter manner when motor 84 rotates at a speed less than line 254, whereas motorized window covering 230 operates in a louder manner when motor 84 rotates at a speed greater than line 254.

It is not fully known why motorized window covering 230 generates an increased amount of noise when the speed of motor 84 exceeds that of line 254. One theory is that the continued supply of power and the continued operation of motor 84 cause a resonance or harmonic characteristics to become apparent and audible within the motorized window covering 230. Regardless of the cause of this noise, it is undesirable.

Motorized window covering manufacturers have attempted to battle this undesirable noise in countless ways. However they have failed to fully solve the motor noise problem.

One attempted manner of solving this problem is to reduce the speed or revolutions per minute of motor 84 so that the speed of motor 84 does not exceed line 254. However, reducing the speed of the motor 84 may not be possible depending on the arrangement of the motor 84, gearbox 86, the power source (e.g. batteries 130) and other components of the motorized window covering 230. This may be because of countless variables, such as the efficiency of the motor 84 at certain speeds, the practical limitations of the power source and its ability to provide the requisite power, the torque limitations of the motor 84, the gear ratio of the gearbox 86, the weight of the shade material 16, the configuration of the motorized window covering 230, among countless other variables and factors. As such, the problem associated with excessive noise in many cases cannot be resolved simply by reducing the power supplied by the power source to the motor 84.

Figure 23:
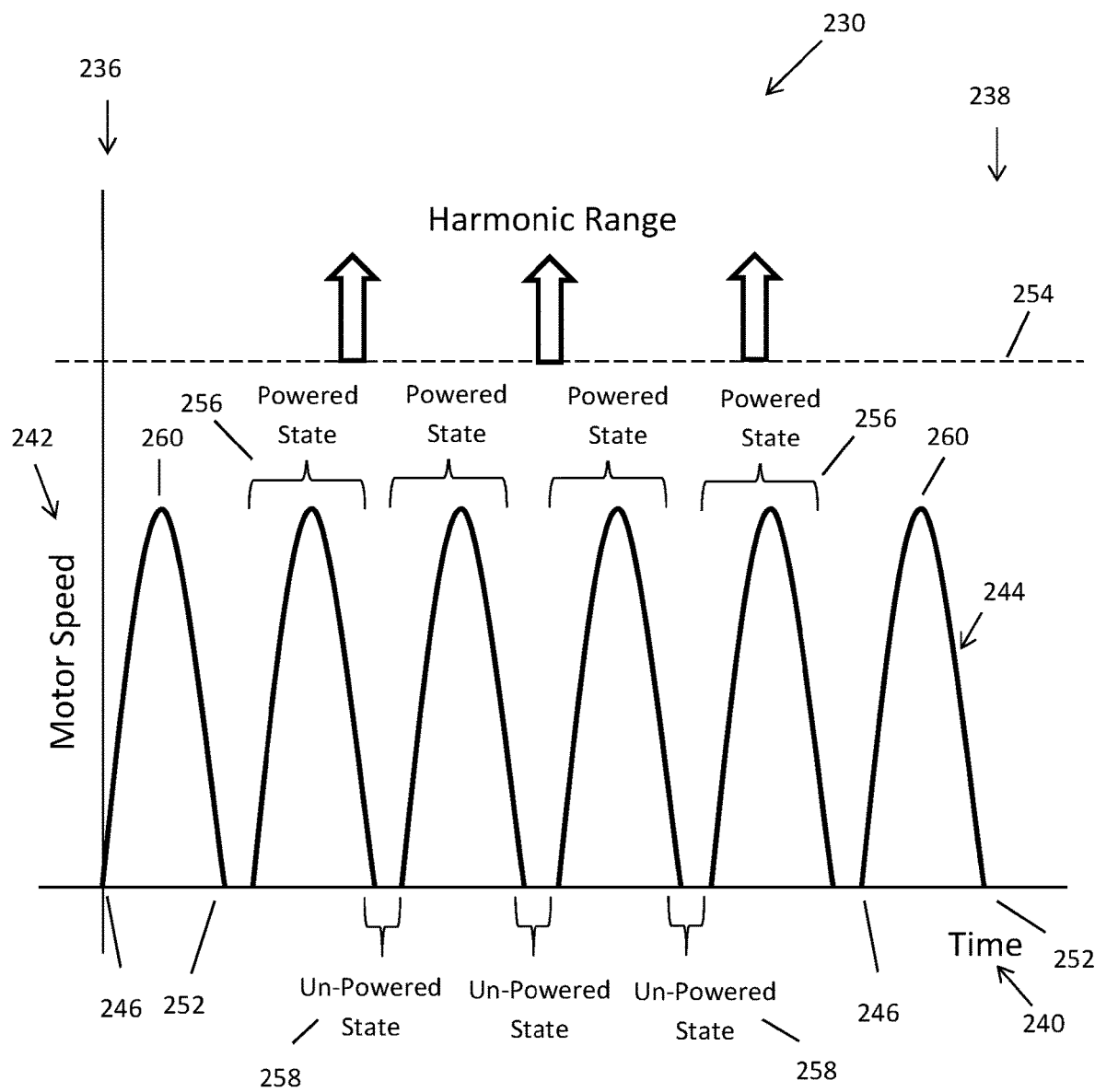
FIG. 23 is a plan view of a demonstrative chart showing operation of a motorized window covering in response to an automated movement command, the view showing the motor being powered in a generally iterative manner wherein power is cycled between a powered state and an unpowered state which causes the shade material to move in an incremental and iterative manner that is quieter, but slower, than a continuous movement.

With reference to FIG. 23, instead of supplying power in a generally continuous manner, an alternative mode of operation has been presented wherein motor 84 is repeatedly cycled between a powered state 256 and an unpowered state 258. This is shown in a demonstrative FIG. 23. In FIG. 23, an exemplary graph of the operation of motorized window covering 230 is shown as the motor 84 is cycled between a powered state 256 and an unpowered state 258 which causes the shade material 16 to move in an incremental manner that is quieter, but slower, than a continuous movement presented in FIG. 22.

Like FIG. 22, in FIG. 23, the horizontal axis is shown as "Time" 240. The vertical axis is shown as "Motor Speed" 242. Line 244 represents the speed of motor 84 over time. Prior to starting point 246, motor 84 is in an unpowered state. That is, motor 84 is in a non-moving condition and the shade material 16 is at start position 236.

At the initial starting point 246, which is at the intersection of the horizontal axis "Time" 240 and the vertical axis "Motor Speed" 242, power is initially applied to motor 84 and motor 84 immediately or shortly thereafter begins movement. Upon being powered, motor 84 begins accelerating. This acceleration continues in a relatively rapid fashion until motor 84 reaches its apex 260, or tangent point, which represents the maximum speed or maximum revolutions per minute of motor 84 for that power cycle. At or around apex 260, power is turned off, tapered off or reduced to motor 84 and motor 84 begins to decelerate due to the reduction or removal of power. This deceleration continues until the motor 84 stops movement at point 252. The powering and unpowering of motor 84 and the associated acceleration and deceleration of motor 84 represents the powered state 256. During the powered state 256 the shade material 16 is incrementally moved from the start position 236 toward the end position 238.

Note, in some arrangements, there is a slight lag or delay between when power is applied or power is cut to motor 84 and when the motor 84 starts or stops rotating, respectively. This is due to various physical attributes and principles of physics such as resistance, delay, momentum and inertia, among others. This is visible in FIGS. 23 and 24 where the powered state 256 and the unpowered state 258 are slightly shifted to the left and the resulting movements lag slightly to the left.

As is shown in FIG. 23, apex 260 is positioned below line 254 which represents the "Harmonic Range". By keeping the speed of motor 84 below the harmonic range, below line 254, operation of motor 84, and/or gearbox 86 and/or motorized window covering 230 in general remains quieter as compared to when the speed of motor 84 is allowed to exceed line 254 and enter the harmonic range. That is, by keeping the speed of motor 84 below line 254, motorized window covering 230 operates in the quieter manner below the harmonic range above line 256.

Not only is the operation of motorized window covering 230 quieter below the harmonic range above line 256, cycling the power in the manner shown in FIG. 23 eliminates the elongated amount of time that the motorized window covering 230 operates in the harmonic range. That is, the longer motor 84 operates at a speed above line 254 the more-noticeable the noise is that motor 84 generates, which may be due in-part to the cumulative effect of being exposed to the noise.

The powered state 256 may last for any period or may be measured by any manner, method or means. In one arrangement, the powered state 256 lasts for a predetermined amount of time. In another arrangement, the powered state 256 last for a predetermined number of rotations of motor 84. In another arrangement, the powered state 256 lasts for a predetermined number of ticks of a sensor that tracks the movement of motor 84 (e.g. sensor 98). In another arrangement, the powered state 256 may last until the motor 84 exceeds a speed threshold. In another arrangement, the powered state 256 may last until the motor 84 exceeds a sound or vibration threshold. Any other method or setting or variable may be used to set the period of the powered state 256.

In one arrangement, full power or the maximum available power is supplied by the power source (e.g. batteries 130) to the motor 84 during the powered state 256 in a generally constant or continuous manner. In doing so, motor 84 accelerates at its maximum potential and the motor 84 operates at its maximum efficiency while power is applied. In an alternative arrangement, power applied to motor 84 is metered to a level below the maximum amount of power that can be applied by the power source (e.g. batteries 130). In an alternative arrangement, power applied to motor 84 is not applied in a continuous manner. That is, the amount of powered applied by power source (e.g. batteries 130) varies between the starting point 246 of the powered state 256 to the ending point 252 of the powered state 256. Examples include smoothly increasing power from zero to maximum over a predetermined period of time, which may cause smoother and/or quieter operation of motor 84. Any other manner of applying power is hereby contemplated for use.

At the commencement of a powered state 256 an unpowered state 258 follows. The unpowered state 258 represents a period where motor 84 is unpowered or underpowered. In one arrangement, during the unpowered state 256 motor 84 is non-moving, or achieves a non-moving state after the momentum of motor 84 stops after power is cut. This pause in the movement of motor 84 allows for a slight pause in any noise generated by motor 84 and/or motorized window covering 230 which can help reduce the noticeability of operation of the motorized window covering 230. While operating motorized window covering 230 by cycling power between a powered state 256 and an unpowered state 258 causes quieter and/or less noticeable operation, this comes at the cost of slowing the operation of motorized window covering 230.

Figure 24:
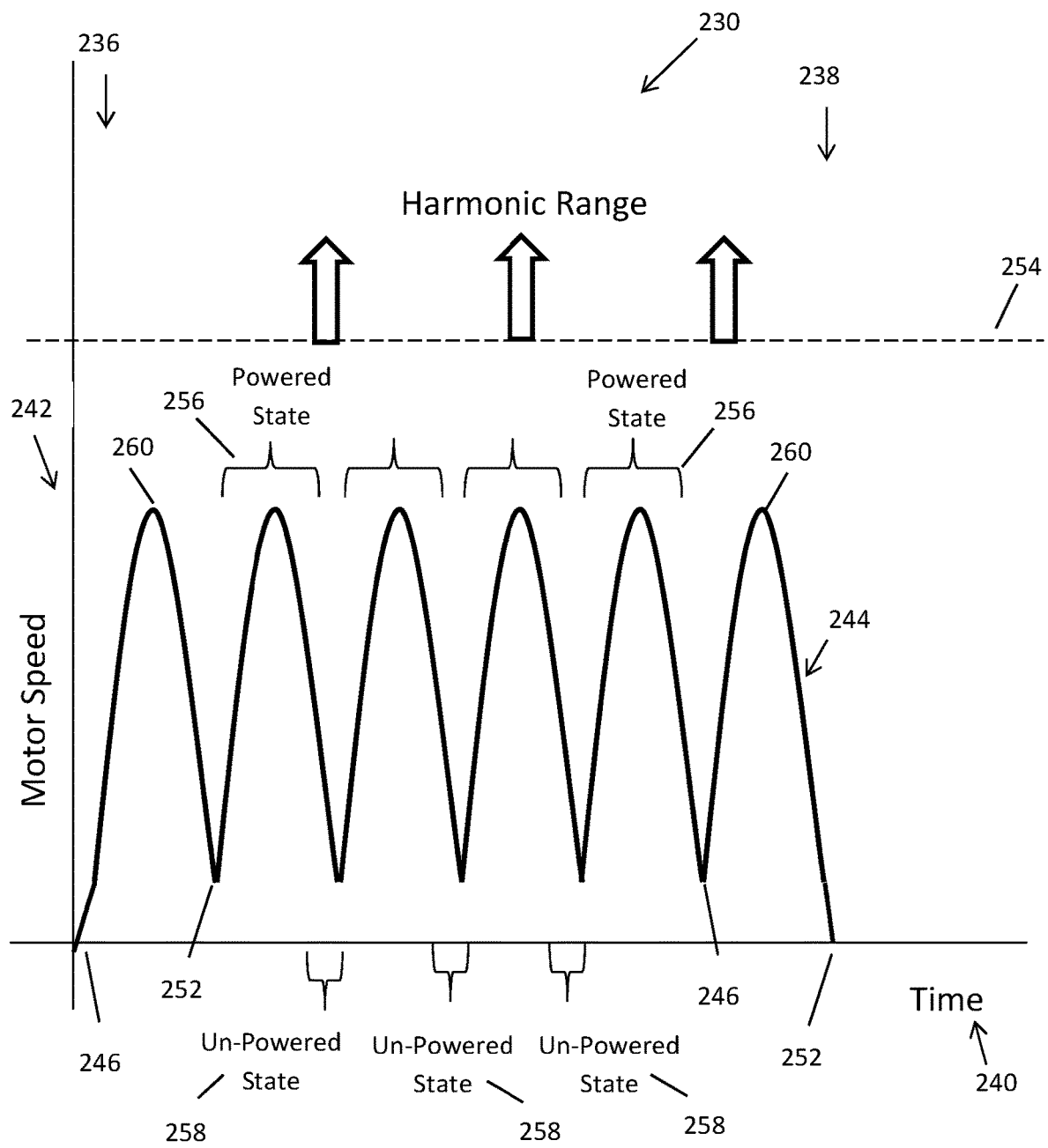
FIG. 24 is a plan view of a demonstrative chart showing operation of a motorized window covering similar to that shown in FIG. 23 with a difference being that the motor does not fully stop rotating before power is again supplied to the motor, that is, the unpowered states are shorter in duration, if not nonexistent altogether, this arrangement provides slightly faster operation than the arrangement presented in FIG. 23.

In another arrangement, with reference to FIG. 24, while power is terminated to motor 84 at the end of the powered state 256, and no power is supplied to motor 84 during the unpowered state 258, another powered state 256 begins before motor 84 stops rotating. That is, in the arrangement shown in FIG. 24, the unpowered state 258 is so short that the next powered state 256 begins before the motor 84 stops movement. This arrangement provides the benefit of slightly faster operation over the arrangement shown in FIG. 23 with a substantial reduction in noise over continuous operation (as is shown in FIG. 22). This arrangement, however, comes at the cost of increased noise or a longer amount of noise over the arrangement shown in FIG. 23.

Figure 25:
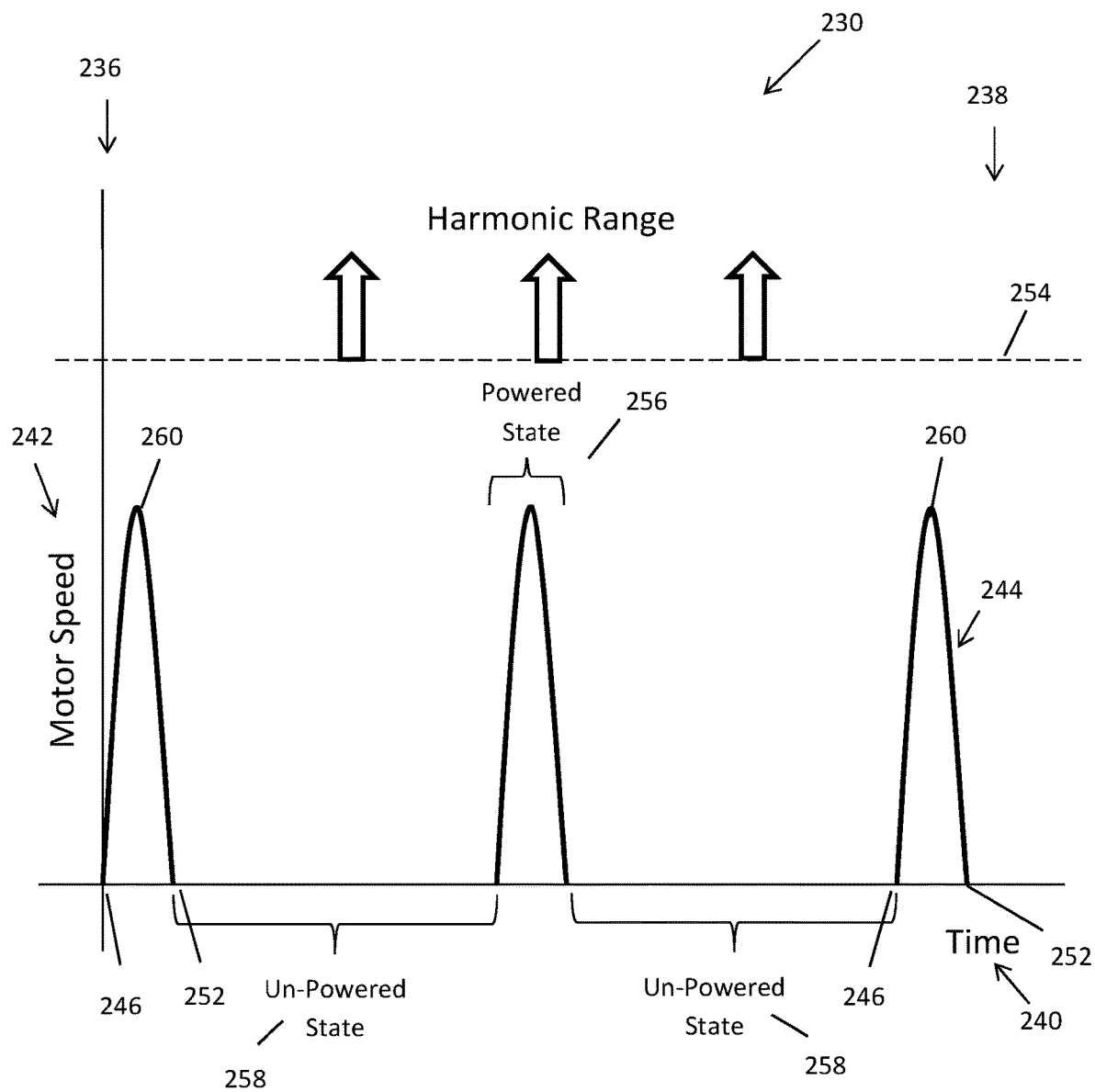
FIG. 25 is a plan view of a demonstrative chart showing operation of a motorized window covering similar to that shown in FIG. 23 and FIG. 24 with a difference being that the powered state is much shorter than that shown in FIG. 23 and FIG. 24 and the unpowered state is much longer than that shown in FIG. 23 and FIG. 24, with the unpowered state being several times longer than the powered state, which reduces the noise generated and/or spreads the noise generated out over a greater amount of time and/or reduces the noticeability of the noise generated by moving the motorized window covering.

With reference to FIG. 25, a chart is presented that shows operation of a motorized window covering 230 in a manner similar to that shown in FIG. 23 and FIG. 24 with a difference being that the powered state is much shorter than that shown in FIG. 23 and FIG. 24 and the unpowered state is much longer than that shown in FIG. 23 and FIG. 24, with the unpowered state 258 being several times longer than the powered state 256. This manner of control reduces the noise generated during operation of the motorized window covering 230 and/or spreads the noise generated during operation of the motorized window covering 230 out over a greater amount of time and/or reduces the noticeability of the noise generated during operation of the motorized window covering 230.

In an alternative arrangement, the arrangement presented in FIG. 24 power is not fully cut to motor 84 before the next power cycle begins. In this arrangement, power is reduced or tapers off at or around the time motor 84 reaches apex 260. This reduction continues until power again ramps up at the beginning of the next power cycle.

The unpowered state 258 may last for any period or may be measured by any manner, method or means. In one arrangement, the unpowered state 258 lasts for a predetermined amount of time. In another arrangement, the unpowered state 258 lasts until motor 84 stops movement or drops below a predetermined speed. In another arrangement, the unpowered state 258 lasts until the motor 84 exceeds a sound or vibration threshold. Any other method or setting or variable may be used to set the period of the unpowered state 258.

One arrangement, that has been tested with success, is that the powered state 256 lasts for a predetermined number of rotations or ticks whereas the unpowered state 258 lasts for a predetermined amount of time. Any number of revolutions or range of revolutions is hereby contemplated for use for the powered state 256 from one revolution to a thousand or several thousand revolutions. This includes one, two, three, four, five, six, seven, eight, nine, ten, eleven, twelve, thirteen, fourteen, fifteen, sixteen, seventeen, eighteen, nineteen, twenty or more revolutions or any range within these numbers of revolutions. Any amount of time is hereby contemplated for use for the unpowered state from one microsecond to tens of thousands of microseconds. This includes one microsecond, ten microseconds, one hundred microseconds, a thousand microseconds, ten thousand microseconds, or from one millisecond to tens of milliseconds, hundreds of milliseconds or thousands of milliseconds or more or any range within this amount of time. As one example, the powered state 256 continues for approximately six revolutions of motor 84 (however any range from one to ten revolutions or one to a hundred revolutions or one to a thousand revolutions or more is hereby contemplated for use) and the unpowered state 258 lasts for a predetermined amount of time that equates to about one three to fifteen times of the amount of time required to make the desired number of revolutions, under normal operating conditions, which may equate to an unpowered state 258 lasting one microsecond, ten microseconds, one hundred microseconds, one thousand microseconds or more or from one millisecond to tens of milliseconds, hundreds of milliseconds or thousands of milliseconds or more, or any amount of time there between or any range of time there between. Depending upon the arrangement, power may be cycled between a powered state 256 and an unpowered state 258 several times per second, to up to several thousand times per second.

As one example of operation, when using batteries 130 that are fresh and have a full charge and therefore provide maximum voltage, without a load, motor 84 operates at approximately 15,000 rpms. When powered state 256 is programmed to last for six revolutions, the powered state 256 lasts for approximately 24 milliseconds (when a load is applied or the voltage applied by batteries 130 drops to normal operating conditions, motor 84 operates at approximately 12,000 rpms which causes six revolutions to take approximately 30 milliseconds). In this arrangement, the unpowered state 258 lasts for anywhere from 100 milliseconds to 400 milliseconds (or approximately three times to fifteen times longer than the powered state 256). In this arrangement, where the powered state 256 is much shorter than the unpowered state 258, much of the quietness is due to the motor 84 being in an unpowered state 258 much longer than being in a powered state 256.

In one arrangement, immediately after or shortly after the powered state 256 a brake is applied in the motor 84. In one arrangement the break is applied by connecting a positive lead of the motor 84 to a negative lead of the motor 84. Doing so, generates a resistive force that helps to slow the motor 84 in a more-rapid manner as opposed to when no brake is applied. Applying the brake helps to maintain accurate movements of the motorized window covering 230 and helps to reduce drift. It has been tested that when a magnetic wheel is used having six poles, after power is terminated at the end of a powered state 256, the motor 84 continues to rotate approximately twelve to fifteen ticks which equates to approximately two revolutions to three revolutions. The break is turned off shortly after it is turned on. Using the break increases the accuracy and repeatability of the incremental movement system.

Cycling power to motor 84 between a powered state 256 and an unpowered state 258 causes substantially slower operation of motorized window covering 230. Depending on the size and configuration of the motorized window covering 230 a standard movement, where power is supplied to motor 84 in a generally continuous manner, can take anywhere from a few seconds to ten, twenty, thirty, forty, fifty seconds to even a minute or more. In contrast, when cycling power to motor 84 between a powered state 256 and an unpowered state 258, the same movement can take up to two to ten times longer or even more. However, the movement may be so quiet that a user cannot hear the operation of the motor 84 and/or the motorized window covering 230. In addition, the movement may be so slow that the user does not perceive the motion.

Due to the slow manner of operation of motorized window covering 230 caused by cycling power to motor 84 between a powered state 256 and an unpowered state 258, cycling power in this manner may not be acceptable in many applications or situations. As examples, this may include when a user is waiting for the window covering 230 to open so that they can exit a sliding glass door, or the user is waiting for the window covering(s) to close so that they can start a movie or presentation, or when a user presses a button on a remote 110 to close the motorized window covering because the glare through the window just became unbearable, among countless other examples. In these particular examples, the user is likely to be more willing to accept the greater noise of continuous operation rather than they are to accept the elongated amount of time it takes to move the shade while cycling power between a powered state 256 and an unpowered state 258. Or, said another way, in these situations faster operation may be more important than quieter operation.

However, one of the greatest benefits of motorized window coverings 230 is that they enable remotely controlled operation of the shade material 16. This allows for situations where motorized window coverings 230 are commanded to operate, however there is no immediate or urgent need for motorized window covering 230 to move from its start position 236 to the desired end position 238. As examples, this may include when a programmed remote 110 transmits a signal to open or close the shade material 16 in response to a timer or scheduled event (such as sunrise or sunset), or when a building control system or home automation system opens or closes the shade material in an attempt to manage the heat gain of a building so as to minimize energy consumption, or when a user controls the motorized window coverings 230 from a distant location to open or close the shade material (such as through the internet when they are on vacation), among countless other examples. In these particular examples, the user is likely to be more willing to accept the elongated amount of time it takes to move the shade while cycling power between a powered state 256 and an unpowered state 258 than they are to accept greater noise of continuous operation. Or, said another way, in these situations quieter or less-perceptible operation may be more important than faster operation.

One of the benefits of the system 10 presented herein is that motorized window covering 230 may operate under standard operating conditions, wherein motor 84 is powered in a generally continuous manner that provides faster but nosier operation, as well as operating under automated operating conditions, wherein motor 84 is powered by cycling power to motor 84 between a powered state 256 and an unpowered state 258 without changing any hardware. Instead the motor controller 82 merely changes the mode of operation from powering motor 84 in a generally continuous manner to powering motor 84 by cycling power between a powered state 256 and an unpowered state 258.

To facilitate this operation, operating command signals are separated into two categories, standard movement commands 232 and automated movement commands 234. When a an operating command is received, motor controller 82 or another component of the system 10 is configured to determine whether the movement command is a standard movement command 232 or an automated movement command 234. Upon determining whether the movement command is a standard movement command 232 or an automated movement command 234 motor 84 is controlled in an appropriate manner. That is, in response to receiving a standard movement command 232, power is supplied to motor 84 in a generally continuous manner causing the shade material to move from the start position 236 to the end position 238 in a relatively fast but noisier manner. In contrast, in response to receiving an automated movement command 234, power is supplied to motor 84 by cycling power between a powered state 256 and an unpowered state 258 causing the shade material to move from the start position 236 to the end position 238 in a slower but quieter manner.

Standard movement commands 232 may include: when a user presses a button on remote control 110; when a user presses a button or engages a switch of on the motorized window covering 230 itself (e.g. 116, 118 and/or 120); when a user tugs or pulls on the motorized window covering 230 itself; when a user twists a twist sensor 112 of the motorized window covering 230 (e.g. motorized wand system 10); when a user engages a control on software or an application that is run on a cell phone, a tablet, a laptop or another computing device; or any other situation where it is desired to have contemporaneous movement of the motorized window covering 230. Based on the conditions of the transmission of the standard movement command 232, it is assumed that rapid movement of the shade material 16 is desired over quieter but slower movement of the shade material. That is, in general, a standard movement command is a user-generated command wherein it is desired that the motorized window covering 230 move in a timely fashion at the time the standard movement command 232 is transmitted.

Automated movement commands 234 may include: a movement command in response to a timed event, such as scheduled opening of the shade material 16 every morning shortly before sunrise, or closing of the shade material every evening shortly after sunset; a movement command in response to a stored event or scheduled event stored within the motorized window covering itself; a movement command in response to a temperature setting; a movement command in response to a light setting; a movement command in response to another environmental condition setting; a movement command in response to a signal transmitted by a building control system; a movement command in response to a signal transmitted by a home automation system; a movement command in response to a predictive movement function; a movement command transmitted through the internet from a remote location; a movement command transmitted by a user in a remote location or out of sight of the motorized window covering; or any other situation where it is anticipated that it is not necessary to move the motorized window covering 230 in a rapid manner, and instead quieter operation may be more important than faster operation. Based on the conditions of the transmission of the automated movement command 234, it is assumed that rapid movement of the shade material 16 is not needed under the circumstances and therefor quieter but slower movement of the shade material 16 may be preferable. That is, in general, an automated movement command 234 is an auto-generated or remotely generated movement command. Due to the physical distance between the user that generated the movement command and the motorized window covering 230 or because the movement command is in response to a timed event, a scheduled event or a sensor setting, it is not needed to move the shade material 16 in a timely fashion.

Accordingly, the system presented herein can determine or distinguish between standard movement commands 232 and automated movement commands 234 and in response to a standard movement command 232 the motorized window covering 230 moves the shade material 16 by powering motor 84 in a generally continuous manner while in response to an automated movement command 234 the motorized widow covering 230 moves the shade material 16 by cycling power to the motor 84 between a powered state 256 and an unpowered state 258. In one arrangement, the transmitting device, such as remote 110, a building control system or home automation system, makes the decision whether a movement command is a standard movement command 232 or an automated movement command 234 and transmits a corresponding control signal, whereas in another arrangement, the motorized window covering 230 makes the decision whether a movement command is a standard movement command 232 or an automated movement command 234 and operates in an according manner.

In one arrangement, moving the shade material 16 by cycling power to the motor 84 between a powered state 256 and an unpowered state 258 is particularly well suited for tilting the angle of the slats 18 of a venetian shade (or horizontal blind) or a vertical blind 200 because tilting the slats 18 only requires movement over a short distance requiring only a limited number of revolutions of the motor 84. As such, the incremental move system presented herein is particularly well suited for use with the motorized wand device 10 presented herein. However, the incremental move system presented herein is also suitable for other forms of motorized window shades, such as roller shades, or honeycomb shades or roman shades or the like. However, because these forms of window coverings 230 require larger movements to open or close the shade material 16 (e.g. raising or lowering the shade material 16 between an open position and a closed position) as compared to opening or closing the slats 18 of horizontal blind 12, implementing the incremental move or power cycling methodology does cause substantial delay, which may be acceptable under certain circumstances.

First Example

As a first example of the operation of the incremental movement system presented herein, a motorized window covering 230 that is a Venetian shade or horizontal blind 12 is presented. A user presses a button on remote 110 to move the slats 18 from a fully closed position (the start position 236) to a fully opened position or level position (the end position 238). Upon pressing the button on remote 110 a wireless movement command is transmitted which is received by antenna 106. This signal is received by motor controller 82 and motor controller 82 interprets the command signal as a standard movement command 232 (because the user likely pressed the button to open the slats 18 because they want to see outside or let the light into the building). In response, motor controller 82 supplies power to motor 84 in a continuous manner or a generally continuous manner causing the shade material 16 to move from the start position 236 to the end position 238 in a relatively rapid fashion. In powering the motor 82 in this way, operation of motor 84 resembles that presented in FIG. 22. That is, the speed of motor 84 exceeds line 254 and therefore enters the harmonic range. When operating in the harmonic range, the motor 84 produces increased noise and harmonics. However, the desire for timely movement of the shade material 16 outweighs the desire for quiet operation.

The same motorized window covering 230 that is a Venetian shade or horizontal blind 12 is also controlled by a building control system or home automation system that is programmed to automatically open or close the slats 18 at scheduled events (such opening the slats 18 at sunrise and closing the slats 18 at sunset, as examples). When the time comes, a movement command is transmitted which is received, via wired communication or wireless communication, by the motorized window covering 230. This signal is received by motor controller 82 and motor controller 82 interprets the command signal as an automated movement command 232 (because it was generated in response to a scheduled event or timed event and therefor there is no urgency for the movement). In response, motor controller 82 cycles power to the motor 84 between a powered state 256 and an unpowered state 258 until the shade material 16 moves from the start position 236 to the end position 238. In powering the motor 82 in this way, operation of motor 84 resembles that presented in FIG. 23 or FIG. 24. That is, the speed of motor 84 ramps up and ramps down as power is iteratively supplied and the withdrawn from motor 84 before crossing line 254 and therefore the motor 84 does not enter the harmonic range. When operating below the harmonic range, the motor 84 produces reduced noise and harmonics but takes longer to complete a movement.

The building control system or home automation system that is also programmed to automatically open or close or move the slats 18 in response to sensed events or predicted events, such as in response to an increase in sensed temperature, or in response to a predicted increase in temperature. When the time comes, a movement command is transmitted which is received, via wired communication or wireless communication, by the motorized window covering 230. This signal is received by motor controller 82 and motor controller 82 interprets the command signal as an automated movement command 232 (because it was generated in response to a sensed condition or predicted event and there is no urgency for the movement). In response, motor controller 82 cycles power to the motor 84 between a powered state 256 and an unpowered state 258 until the shade material 16 moves from the start position 236 to the end position 238. In powering the motor 82 in this way, operation of motor 84 resembles that presented in FIG. 23 or FIG. 24. That is, the speed of motor 84 ramps up and ramps down as power is iteratively supplied and the withdrawn from motor 84 before crossing line 254 and therefore the motor 84 does not enter the harmonic range. When operating below the harmonic range, the motor 84 produces reduced noise and harmonics but takes longer to complete a movement.

Second Example

As a second example of the operation of the incremental movement system presented herein, a motorized window covering 230 that is a roller shade or honeycomb shade is presented. A user presses a button on remote 110 to move the shade material 16 from a fully closed position (the start position 236) to a fully opened position or level position (the end position 238). Upon pressing the button on remote 110 a wireless movement command is transmitted which is received by antenna 106. This signal is received by motor controller 82 and motor controller 82 interprets the command signal as a standard movement command 232 (because the user likely pressed the button to open the shade material 16 because they want to see outside or let the light into the building). In response, motor controller 82 supplies power to motor 84 in a continuous manner or a generally continuous manner causing the shade material 16 to move from the start position 236 to the end position 238 in a relatively rapid fashion. In powering the motor 82 in this way, operation of motor 84 resembles that presented in FIG. 22. That is, the speed of motor 84 exceeds line 254 and therefore enters the harmonic range. When operating in the harmonic range, the motor 84 produces increased noise and harmonics. However, the desire for timely movement of the shade material 16 outweighs the desire for quiet operation.

The same motorized window covering 230 is also controlled by a building control system or home automation system that is programmed to automatically open or close the shade material 16 at scheduled events (such opening the slats 18 at sunrise and closing the slats 18 at sunset, as examples). When the time comes, a movement command is transmitted which is received, via wired communication or wireless communication, by the motorized window covering 230. This signal is received by motor controller 82 and motor controller 82 interprets the command signal as an automated movement command 232 (because it was generated in response to a scheduled event or timed event and therefore there is no urgency for the movement). In response, motor controller 82 cycles power to the motor 84 between a powered state 256 and an unpowered state 258 until the shade material 16 moves from the start position 236 to the end position 238. In powering the motor 82 in this way, operation of motor 84 resembles that presented in FIG. 23 or FIG. 24. That is, the speed of motor 84 ramps up and ramps down as power is iteratively supplied and the withdrawn from motor 84 before crossing line 254 and therefore the motor 84 does not enter the harmonic range. When operating below the harmonic range, the motor 84 produces reduced noise and harmonics but takes longer to complete a movement.

The building control system or home automation system that is also programmed to automatically open or close or move the shade material 16 in response to sensed events or predicted events, such as in response to an increase in sensed temperature, or in response to a predicted increase in temperature. When the time comes, a movement command is transmitted which is received, via wired communication or wireless communication, by the motorized window covering 230. This signal is received by motor controller 82 and motor controller 82 interprets the command signal as an automated movement command 232 (because it was generated in response to a sensed condition or predicted event and there is no urgency for the movement). In response, motor controller 82 cycles power to the motor 84 between a powered state 256 and an unpowered state 258 until the shade material 16 moves from the start position 236 to the end position 238. In powering the motor 82 in this way, operation of motor 84 resembles that presented in FIG. 23 or FIG. 24. That is, the speed of motor 84 ramps up and ramps down as power is iteratively supplied and the withdrawn from motor 84 before crossing line 254 and therefore the motor 84 does not enter the harmonic range. When operating below the harmonic range, the motor 84 produces reduced noise and harmonics but takes longer to complete a movement.

The combined effect of implementing this iterative process of opening the window covering 230 by iteratively cycling the power to the motor 84 between a powered state 256 and an unpowered state 258 causes the shade material 16 to move in a large movement from the start position 236 to the end position 238 by moving the shade material 16 in a plurality of small movements (which represents the movement that occurs during the iterative powered states 256), wherein the plurality of small movements are generated by repeatedly powering and unpowering the motor.

Individual Movement of Blinds that are Part of a Twisting Group:

For the reasons stated herein, in many situations it is desirable to have a plurality of horizontal blinds 12, or any other form of a window covering, move in unison when any one of the plurality of blinds or window coverings are manually engaged. This is described herein as "grouping". In one arrangement, as is described herein, a plurality of window coverings are grouped in what is called a "twisting group" where all of window shades in the group move when any one of the motorized wands 10 are twisted. This allows a user to simply grasp any of the motorized wands 10 and twist them, and all of the motorized wands 10 in the group will respond accordingly. This allows a user to open or close or move a plurality of window shades with only a single physical motion.

While moving a plurality of window shades in unison with a single twist of a motorized wand 10 is convenient and provides advantages, there may be some instances wherein the user only wants to open or close a single window shade. As an example, perhaps a user wants to close only a single window covering to keep the direct sun out of their eyes. As another example, perhaps a user wants to open a window covering in one room, while leaving all the other grouped window shades in another room closed. When a plurality of window shades are grouped in a twisting group this is impossible as all of the grouped window shades will respond accordingly when any one of the motorized wands 10 in the group are twisted.

To correct this problem, in one arrangement, the motorized wand system 10 allows for the individual movement of a twisting group shade. In one arrangement, as one example, to control a single window shade having a motorized wand 10 attached thereto, the user presses program button 116, or any other button or input on the motorized wand 10 for a predetermined amount of time. In doing so, the motorized wand 10 is temporarily allowed to be moved without transmitting a signal to the other motorized wands 10 in the twisting group. In this way, the motorized wand 10 that is part of a twisting group may be individually moved by twisting.

In one arrangement, as one example, the program button 116 or other button or input that allows for individual movement of a window shade that is part of a twisting group is pressed for a predetermined amount of time to facilitate individual movement. In one arrangement, as one example, this predetermined amount of time is from zero to a predetermined amount of time thereafter. In one arrangement, when the program button 116 or other button or input that allows for individual movement of a window shade that is part of a twisting group is pressed for the predetermined amount of time, a beep is not present. That is, the user presses the button or input for such a short period of time that no perceptible response (such as a beep, a blink of a light, an illumination of a light, a vibration, a wink, or the like) is provided. In contrast, when a user presses the button or input for longer than the predetermined amount of time the motorized wand 10 provides a perceptible response (such as a beep, a blink of a light, an illumination of a light, a vibration, a wink, or the like) which indicates to the user that another mode has been entered (such as the programming mode). If a beep is accidently triggered, which puts the motorized wand 10 in a programming mode, the programming mode is the user simply twists the motorized wand 10 which exits the programming mode and the user begins again.

Selection of Master Motorized Wand which Acts as a Repeater:

For the reasons stated herein, in many situations it is desirable to have a plurality of window coverings move in unison when any one of the plurality of blinds or window coverings are manually engaged (by twisting) or by a remote 110. This is described herein as "grouping". To facilitate simultaneous or near simultaneous movement of all of the window coverings in a group some or all of the motorized wand systems 10 in a group act as repeaters.

Each Motorized Wand System Acts as a Repeater:

In one arrangement, each motorized wand system 10 in a group acts as a repeater. In this arrangement, when a signal is received by any of the motorized wand systems 10 in a group, that motorized wand system 10 repeats the signal in hopes that it is received by all the other motorized wand systems 10 in the group. This may be for signals transmitted by remote 110, twist signals, automated movement signals from temperature sensor 160 or light sensor 162 or any other signal or combination thereof. This arrangement is effective and provides a layer of protection as a single signal is repeated multiple times by multiple motorized wand systems 10. However, this arrangement has its drawbacks in that it can lead to reduced battery life, causes increased RF (radio frequency) noise, among other disadvantages. In this arrangement, for example, when any one of the motorized wand systems 10 are twisted, and/or a remote control signal is received by any of the motorized wand systems 10, each of the motorized wand systems 10 repeat the signal once received. Also, in this arrangement, when any of the motorized wand systems 10 with temperature sensors 160 or light sensors 162 that are activated cause an automated movement because a temperature threshold or light threshold has been exceeded the motorized wand system 10 that experiences the automated move broadcasts this automated move to all of the other motorized wand systems 10 in its group, which may be a twisting group, a remote group or any other grouping (e.g. an automated movement group). When this automated movement signal is transmitted by one of the motorized wand systems 10 within the group, all of the other motorized wand systems 10 within the group that receive the automated movement signal move accordingly. When the motorized wand systems 10 receive the automated movement command from any other motorized wand system 10 in its group, the motorized wand systems 10 repeat this command signal. As such, each of the motorized wand systems 10 in the group should receive the automated movement command from the motorized wand system 10 that originally transmitted the automated movement command as well as by the all the other motorized wand systems 10 in the group. This arrangement provides the highest level of confidence that a signal will be received by all motorized wand systems 10 in a group by repeating the signal.

Master Arrangement:

In another arrangement, only a single motorized wand system 10 in a group acts as a repeater. In this arrangement, this provides the advantage of not over-repeating a signal, reduced battery draw, and less RF noise, among other advantages. In one arrangement, to ensure that a signal is received and repeated, the user is able to identify which motorized wand system 10 will act as a repeater. In one arrangement, the user selects a generally centrally-located motorized wand system 10 in the group such that a signal that is likely to be received by the master motorized wand system 10 due to the generally centrally located nature of the master motorized wand system 10 and when repeated is likely to be received by all the grouped motorized wand systems 10 due to the generally centrally located nature of the master motorized wand system 10.

In this arrangement, as one example, to select the master motorized wand system 10 all of the motorized wand systems 10 that are to be grouped together in a twisting group are entered into the pairing mode or grouping mode by pressing the programming button 116, or any other button or input until a single beep is heard. Once the beep is heard the programming button 116 is released. This enters that particular motorized wand system 10 into pairing mode or grouping mode. This process is repeated for all motorized wand systems 10 that are to be part of the group. Once all motorized wand systems 10 that are to be part of the group have been entered into the pairing mode, the pairing mode is closed by selecting a generally centrally located motorized wand system 10 in the group and pressing the programming button 116 or any other button on input on that generally centrally positioned motorized wand system 10 for a predetermined amount of time until a beep is heard. This indicates that the pairing mode has been closed and that particular motorized wand system 10 has been indicated as the repeater or master. This establishes all the motorized wand systems 10 in that group as well as establishes which motorized wand system 10 is the master.

In one arrangement, the motorized wand system 10 that has been identified as the master repeats all signals received, including remote control signals received from remote 110 or another remote signal transmitting device, twist signals from other motorized wand systems 10, automated movement signals from other motorized wand systems 10 from temperature sensor 160 or light sensor 162, or any other signal received. In another arrangement, the motorized wand system 10 that has been identified as the master only repeats remote control signals received from remote 110 or another remote signal transmitting device. In another arrangement, the motorized wand system 10 that has been identified as the master only repeats twist signals from other motorized wand systems 10. In another arrangement, the motorized wand system 10 that has been identified as the master only repeats automated movement signals from other motorized wand systems 10 from temperature sensor 160 or light sensor 162 when a temperature threshold has been exceeded or when a light threshold has been exceeded. Any other arrangement is hereby contemplated for use. This arrangement allows a user to optimize the arrangement for their application, room configuration, the number of motorized wand systems 10 in the group, and any other factor.

In this arrangement, when any of the motorized wand systems 10 with temperature sensors 160 or light sensors 162 that are activated cause an automated movement because a temperature threshold or light threshold has been exceeded the motorized wand system 10 that experiences the automated move broadcasts this automated move to all of the other motorized wand systems 10 in its group, which may be a twisting group, a remote group or any other grouping (e.g. an automated movement group). When this automated movement signal is transmitted by one of the motorized wand systems 10 within the group, all of the other motorized wand systems 10 within the group that receive the automated movement signal move accordingly. When the master motorized wand system 10 receives the automated movement command from any other motorized wand system 10 in its group, the master motorized wand system 10 repeats this command signal. As such, each of the motorized wand systems 10 in the group should receive the automated movement command from the motorized wand system 10 that originally transmitted the automated movement command as well as by the master motorized wand systems 10 in the group. By choosing a geographically centered motorized wand system 10 this ensures that all of the motorized wand systems 10 in the group at least receive the signal from the master motorized wand system 10. This arrangement provides a high level of confidence that a signal will be received by all motorized wand systems 10 in a group by repeating the signal.

In another arrangement, any of motorized wand systems 10 may be configured to repeat signals. That is, in this arrangement, each of the motorized wand systems 10 has a repeater mode that may be turned on and off. This repeater mode may be turned on for automated movements, twist movements, remote control transmitted movements, or any other movement or combination thereof. This arrangement allows the establishment of custom repeater arrangements where the optimum balance is struck between not overly repeating a signal while ensuring that command signals are consistently received by all motorized wand systems 10 in a group.

Two & Three Position Switch, Activated/Deactivated, Semiautomatic, Fully Automatic:

Two Position Switch:

In the arrangement shown, as one example, motorized wand system 10 includes a switch 118, 120 for each of the temperature sensor 160 and the light sensor 162. In one arrangement, these switches 118, 120 are simply on or off switches, otherwise known as two position switches. Notably, when terms like button or switch are used herein this is to simply indicate an input the provides the ability to provide control. The terms button and switch or the like do not impart any structural limitations unless specifically stated. That is, the term button does not imply a limitation of a push button. Similarly, the term switch does not imply a limitation of a toggle switch. Instead, these terms are to be construed broadly, unless specifically limited.

In this arrangement, when the switches 118, 120 are in the off position, or disengaged, the associated temperature sensor 160 and light sensor 162 is deactivated and as such regardless of the temperature or light the motorized wand system 10 does not automatically open or close based on temperature or light. In this arrangement, when the switches 118, 120 are in the on position the associated temperature sensor 160 and light sensor 162 is activated and as such when a temperature threshold is exceeded or when a light threshold is exceeded, and the other requirements and conditions of the software are met, the motorized wand opens or closes the window covering automatically based on the temperature or light readings. In one arrangement, when the switches 118, 120 are in the on position the associated temperature sensor 160 and light sensor 162 is activated and when a temperature threshold is exceeded (e.g. a high temperature threshold, such as 82 degrees F., or any other temperature) the motorized wand system 10 only serves to close the window covering. Similarly, in one arrangement, when the switches 118, 120 are in the on position the associated temperature sensor 160 and light sensor 162 is activated and when a light threshold is exceeded (e.g. a low light threshold that correlates with sunset) the motorized wand system 10 only serves to close the window covering. Any other arrangement is hereby contemplated for use. In one arrangement, switches 118, 120 are push buttons. In another arrangement, switches 118, 120 are toggle switches or sliding switches with two positions indicated by the physical position of the switch. Any other form of an input or switch is hereby contemplated for use for switches 118, 120.

Three Position Switch: In another arrangement, switches 118, 120 are three position switches, with an off position, a semiautomatic mode position and a fully automatic mode position. In this arrangement, when the switches 118, 120 are in the off position the associated temperature sensor 160 and light sensor 162 is deactivated and as such regardless of the temperature or light the motorized wand system 10 does not automatically open or close based on temperature or light.

In this arrangement, when the switches 118, 120 are in the semiautomatic mode position the associated temperature sensor 160 and light sensor 162 is activated and as such when a temperature threshold is exceeded or when a light threshold is exceeded, and the other requirements of the software are met, the motorized wand system 10 opens or closes the window covering automatically based on the temperature or light readings. In one arrangement, when the switches 118, 120 are in the semiautomatic mode position the associated temperature sensor 160 and light sensor 162 is activated and when a temperature threshold is exceeded (e.g. a high temperature threshold, such as 82 degrees F., or any other temperature) the motorized wand system 10 only serves to close the window covering.

Similarly, in one arrangement, when the switches 118, 120 are in the fully semiautomatic mode position the associated temperature sensor 160 and light sensor 162 is activated and when a high temperature threshold is exceeded (e.g. such as 82 degrees F., or any other temperature) the motorized wand system 10 serves to close the window covering to prevent heat from entering the room; and when a low temperature threshold is exceeded (e.g. such as 69 degrees Fahrenheit, or any other temperature) the motorized wand system 10 serves to open the window covering to allow entry of heat and light into the room. Similarly, in one arrangement, when the switches 118, 120 are in the on position the associated temperature sensor 160 and light sensor 162 is activated and when a high light threshold, or a sunrise threshold, is exceeded (e.g. a high light threshold that correlates with sunrise) the motorized wand system 10 serves to open the window covering. And when a low light threshold, or a sunset threshold, is exceeded (e.g. a low light threshold that correlates with sunset) the motorized wand system 10 serves to close the window covering. Any other arrangement is hereby contemplated for use as is any temperature for the thresholds and any light level for the light thresholds. In one arrangement, switches 118, 120 are push buttons. In another arrangement, switches 118, 120 are toggle switches or sliding switches with three positions indicated by the physical position of the switch. Any other form of an input or switch is hereby contemplated for use for switches 118, 120.

When the motorized wand systems 10 have a switches 118, 120 and a plurality of motorized wand systems 10 are used in a group, the presence of the switches 118, 120 for each of the temperature sensor 160 and the light sensor 162 allows a user to choose which of the motorized wand systems 10 will have an activated temperature sensor 160 and/or light sensor 162. This allows a great level of flexibility and allows the user to select the temperature sensor 160 and the light sensor 162 of the motorized wand systems 10 that the user wants the group to respond to. This provides unprecedented flexibility and control over the group. For instance, if one of the motorized wand systems 10 is in a sunnier spot than the other motorized wand systems 10, which will cause the sensors 160, 162 of this motorized wand 10 to react faster than the other motorized wand systems 10. In this example, the user can deactivate the temperature sensor 160 and the light sensor 162 of this motorized wand system 10.

It is important to note that when a plurality of motorized wand systems 10 have activated temperature sensors 160 and/or light sensors 162, the group of motorized wand systems 10 will respond when any of the motorized wand systems 10 with an activated temperature sensor 160 or light sensor 162 sense that a temperature threshold or light threshold is exceeded. In a way, the group of motorized wand systems 10 responds to the lowest common denominator, or most sensitive or most active motorized wand system 10. As such, associating a switch 118, 120 with each of the temperature sensor 160 and light sensor 162 allows a user to deactivate the temperature sensor 160 and light sensor 162 of an overly sensitive or overly active motorized wand system 10. This arrangement with switches 118, 120 allows for customization and elimination of outlier motorized wand systems 10. In this way, the use of temperature sensor 160 and light sensor 162, when activated with switch 118, 120, respectively, allow for the generation of automated movements. Eliminating overly active or overly sensitive or outlier motorized wand systems 10 is important as once an automated movement occurs by any of the motorized wand systems 10, a delay period is entered preventing additional automated moves for a predetermined amount of time, as is further described herein.

In addition, by providing a plurality of motorized wand systems 10 that sense two different factors, temperature and light, steps are taken to ensure proper control of the motorized wand system 10 and the group of motorized wand systems 10 based on various signals from both sensed parameters, temperature and light, of multiple motorized wand systems 10. These control parameters are addressed in the programming of the motor controller 82, microprocessor 100 and/or memory 102 or other device or component through software, code or other instructions, as is further described herein.

Button and Light:

While a switch is shown herein for use with the temperature sensor 160 and the light sensor 162, a button an LED or other light arrangement is contemplated as an alternative. That is, in this arrangement, for each of the temperature sensor 160 and the light sensor a button is presented with two LEDs or lights (for a two-position arrangement) and three LEDs or lights (for a three-position arrangement). In this arrangement, when the button is pressed a first time, the LED or light illuminates indicating the present state (such as on or off, or off, semiautomatic, or fully automatic, or the like). Thereafter, each button press, within a predetermined amount of time, causes illumination of the next option. In this way, a user may toggle through the various modes by pressing the button iteratively. In an alternative arrangement, instead of illuminating different LEDs or lights, the LED or light associated with the button illuminates a different color or illuminates in a different manner, such as a solid illumination, a fast flashing, or a slow flashing, or the like each indicating a different mode of operation.

Light Sensor Trumps Temperature Sensor:

In the arrangement described herein, motorized wand system 10 is configured to sense multiple conditions, both temperature and light, and automatically control opening and closing of the motorized wand system 10 based thereon. However, conflicting signals can cause undesirable results or operation unless controlled appropriately. That is, as an example, temperature sensor 160 is intended to open the window covering when the sensed temperature goes below a predetermined threshold. Most of the time, the temperature goes down at night. As such, it is likely, without more, that the low temperature threshold, would be exceeded at night. The purpose of the low temperature threshold and temperature sensor 160 opening the window shade when the low temperature threshold is exceeded is to allow warming light to enter the room. However, this purpose is frustrated if the window covering were to be opened at night as there is no light to let in. What's worse is that this is undesirable as others can see into the property at night which may cause safety issues as others can see into the property. For these reasons, control parameters are addressed in the programming of the motor controller 82, microprocessor 100 and/or memory 102 or other device or component through software, code or other instructions.

In one arrangement, motorized wand system 10 is programmed so that the light sensor 162 trumps the temperature sensor 160 when the low temperature threshold is exceeded. That is, the motor controller 82 and/or microprocessor 100 prevent the window covering from being opened at night when a low temperature threshold is exceeded. That is, in one arrangement, when temperature sensor 160 indicates that a low temperature threshold is exceeded the motor controller 82 and/or microprocessor 100 checks to determine whether it is day light or night time, and if the light sensor indicates that it is night time, meaning that the low light threshold has been exceeded, the motor controller 82 does not open the window covering. In another arrangement, motor controller 82 and/or microprocessor 100 deactivate temperature sensor 160 until light sensor 162 indicates that a light threshold has been exceeded, indicating that the sun is up, and only when the sun is up are readings from the temperature sensor 160 considered and/or received and/or processed to determine whether the temperature sensor 160 indicates that a low temperature threshold is exceeded and therefore the motorized wand system 10 should open the window shade.

Similarly, the opposite is true regarding the high temperature threshold. That is, in one arrangement, when temperature sensor 160 indicates that a high temperature threshold is exceeded, the motor controller 82 and/or microprocessor 100 checks to determine whether it is day light or night time, and if the light sensor indicates that it is night time, meaning that the low light threshold has been exceeded, the motor controller 82 does not close the window covering (as it is already closed). In another arrangement, motor controller 82 and/or microprocessor 100 deactivate temperature sensor 160 until light sensor 162 indicates that a light threshold has been exceeded, indicating that the sun is up, and only when the sun is up are readings from the temperature sensor 160 considered and/or received and/or processed to determine whether the temperature sensor 160 indicates that a high temperature threshold is exceeded and therefore the motorized wand system 10 should close the window shade.

In this way, the light sensor 162 trumps the temperature sensor 160. Any other manner of using the temperature sensor 160 and light sensor 162 in concert with one another is hereby contemplated for use to provide optimum operation and performance.

Delay After Manual Movement:

Motorized wand systems 10 are configured to open and close and move window shades through a plurality of manners of operation. In one arrangement, motorized wand systems 10 are configured to open and close and move window shades through the manual transmission of a wireless signal from remote 110, through the manual twisting the motorized wand system 10, and through an automated movement from a sensed condition of an activated temperature sensor 160 and/or light sensor 162.

To provide optimum performance and operation, motor controller 82 and/or microprocessor 100 or another component of the motorized wand systems 10 takes account of manual movements (e.g. manually pressing a button on remote 110 causing the motorized wand systems 10 to move, or manually twisting one of the motorized wand systems 10 causing the motorized wand systems 10 to move) through software, code or other instructions to influence whether an automated movement (e.g. automatically opening or closing based on exceeding a temperature threshold as sensed by a temperature sensor 160 or a light threshold as sensed by a light sensor 162) should occur.

As an example, if in the middle of the day a user desires to close the window shades to watch a movie they grasp one of the motorized wand systems 10 and twist it to close all of the grouped motorized wand systems 10. Shortly thereafter, if a low temperature threshold is sensed or exceeded indicating that the motorized wand systems 10 should open, it would be undesirable if in the middle of the movie all of the motorized wand systems 10 open automatically.

As another example, if in the middle of the day a user desires to look out their windows when all of the motorized wand systems 10 are closed they grasp the remote 110 and press a button which causes the transmission of a wireless control signal that is received by the motorized wand systems 10. When the motorized wand systems 10 receive this manually transmitted wireless control signal they move accordingly. Shortly thereafter, if a high temperature threshold is sensed or exceeded indicating that the motorized wand systems 10 should close, it would be undesirable for all of the motorized wand systems 10 to close on the user who simply wants to look out their windows.

For these reasons, in one arrangement, motorized wand systems 10 include a delay timer after a manual movement. In this arrangement, a manual movement is any movement of a window shade by manual interaction by a user and may include manually moving a shade that is sensed by a motorized wand system 10, manually pressing a button on remote 110 causing the motorized wand systems 10 to move, or manually twisting one of the motorized wand systems 10 causing the motorized wand systems 10 to move, or any other manual interaction. When this occurs, parameters are addressed in the programming of the motor controller 82, microprocessor 100 and/or memory 102 or other device or component of motorized wand system 10 through software, code or other instructions that initiate a delay timer after a manual movement is sensed. This delay timer prevents an automated movement from occurring for a predetermined amount of time after the manual movement. In one arrangement, during the delay timer the temperature sensor 160 and/or light sensor 162 are turned off. In another arrangement, during the delay timer signals from the temperature sensor 160 and/or light sensor 162 (e.g. exceeding a light or temperature threshold) are not acted upon and/or are ignored.

In this way, the implementation of a delay timer after a manual movement prevents the automated movement of a motorized wand system 10 when it is implied that the user does not want the motorized wand system 10 to automatically move. In one arrangement, the delay timer for a manual movement is approximately three hours, however any other amount of time is hereby contemplated for use. After the delay timer expires, the motorized wand system is free to resume automated movements as is described herein.

Delay After Automated Movement:

Similar to the above, with respect to a delay after a manual movement, motorized wand systems 10 also include a delay timer after an automated movement. That is, to provide optimum performance and operation, motor controller 82 and/or microprocessor 100 or another component of the motorized wand systems 10 takes account of automated movements (e.g. automatically opening or closing the window shade based on exceeding a temperature threshold, exceeding a light threshold, or any other automated movement) through software, code or other instructions to influence whether another automated movement should occur.

As an example, if in the middle of the day a temperature sensor 160 senses a high temperature threshold has been exceeded, the motorized wand system 10 automatically closes the window shade (so long as the other conditions are met) and transmits this automated movement signal to all other motorized wand systems 10 that are in its group which cause those motorized wand systems 10 to similarly move. Shortly thereafter, if the same motorized wand system 10 or a different motorized wand system 10 in the group senses a low temperature threshold has been exceeded, the motorized wand system 10 would automatically open the window shade and transmits this automated movement signal to all other motorized wand systems 10 that are in its group which cause those motorized wand systems 10 to similarly move. This is undesirable as the window shades would close and open in rapid succession, which is annoying, wastes battery life, is confusing to the user, among other disadvantages.

As another example, if at the end of a day a light sensor 162 senses a low light threshold has been exceeded, the motorized wand system 10 automatically closes the window shade (so long as the other conditions are met) and transmits this automated movement signal to all other motorized wand systems 10 that are in its group which cause those motorized wand systems 10 to similarly move. Shortly thereafter, if the same motorized wand system 10 or a different motorized wand system 10 in the group senses a high light threshold has been exceeded (e.g. headlights of a car outside are shining on the window), the motorized wand system 10 would automatically open the window shade and transmits this automated movement signal to all other motorized wand systems 10 that are in its group which cause those motorized wand systems 10 to similarly move. This is undesirable as the window shades would close when it gets dark and open after it is dark in rapid succession, which is annoying, wastes battery life, is confusing to the user, opens the shades at night, among other disadvantages.

For these reasons, in one arrangement, motorized wand systems 10 include a delay timer after an automated movement. In this arrangement, an automated movement is any movement of a window shade caused by a sensor of a motorized wand system, such as temperature sensor 160, light sensor 162 or the like, or a timed movement initiated through a timer. When this occurs, parameters are addressed in the programming of the motor controller 82, microprocessor 100 and/or memory 102 or other device or component of motorized wand system 10 through software, code or other instructions that initiate a delay timer after an automated movement is sensed. This delay timer prevents an automated movement from occurring for a predetermined amount of time after the manual movement. In one arrangement, during the delay timer the temperature sensor 160 and/or light sensor 162 are turned off. In another arrangement, during the delay timer signals from the temperature sensor 160 and/or light sensor 162 (e.g. exceeding a light or temperature threshold) are not acted upon and/or are ignored In this way, the implementation of a delay timer after an automated movement prevents another the automated movement of a motorized wand system 10 from occurring shortly thereafter, which can help prevent a difference of opinion between a plurality of motorized wand systems 10 that are grouped together. In one arrangement, the delay timer for an automated movement is approximately eight hours, however any other amount of time is hereby contemplated for use. After the delay timer expires, the motorized wand system 10 is free to resume automated movements as is described herein.

To be clear, while there may be a delay timer for a manual movement and/or a delay timer for a motorized movement, these delay timers do not prevent a user from manually operating the motorized wand systems 10 (e.g. manually pressing a button on remote 110 causing the motorized wand systems 10 to move, or manually twisting one of the motorized wand systems 10 causing the motorized wand systems 10 to move)

Algorithm Performance:

It is desirable for motorized wand systems 10 to operate in an accurate manner. To ensure accurate operation, in one arrangement, motorized wand systems 10 employ through software, code or other instructions an algorithm that helps interpret the inputs and control operation of the motorized wand system 10. The application of this algorithm smooths daily variations and over time after the collection of broad data collection improves the accuracy of the operation of motorized wand system 10, and in particular the accuracy of automated movements. This is coupled with the light sensor trumping the temperature sensor as well as the delay timer associated with automated movements and the delay timer associated with manual movements.

Figure 26:
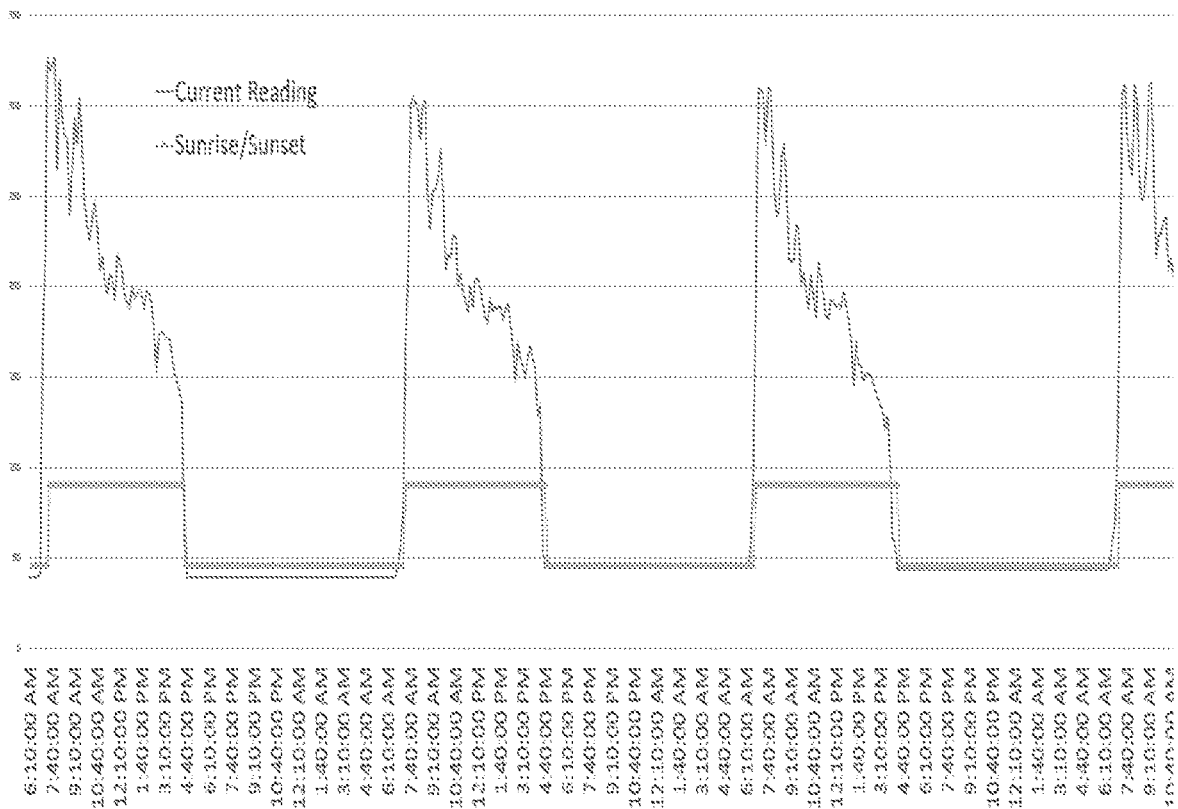
FIG. 26 is a plan view of a chart of solar data sensed by the light sensor of a motorized wand system with an overlay of the determinations of the applied software and algorithm(s), the chart specifically showing winter solar data, partly cloudy, start of the algorithm.
Figure 27:
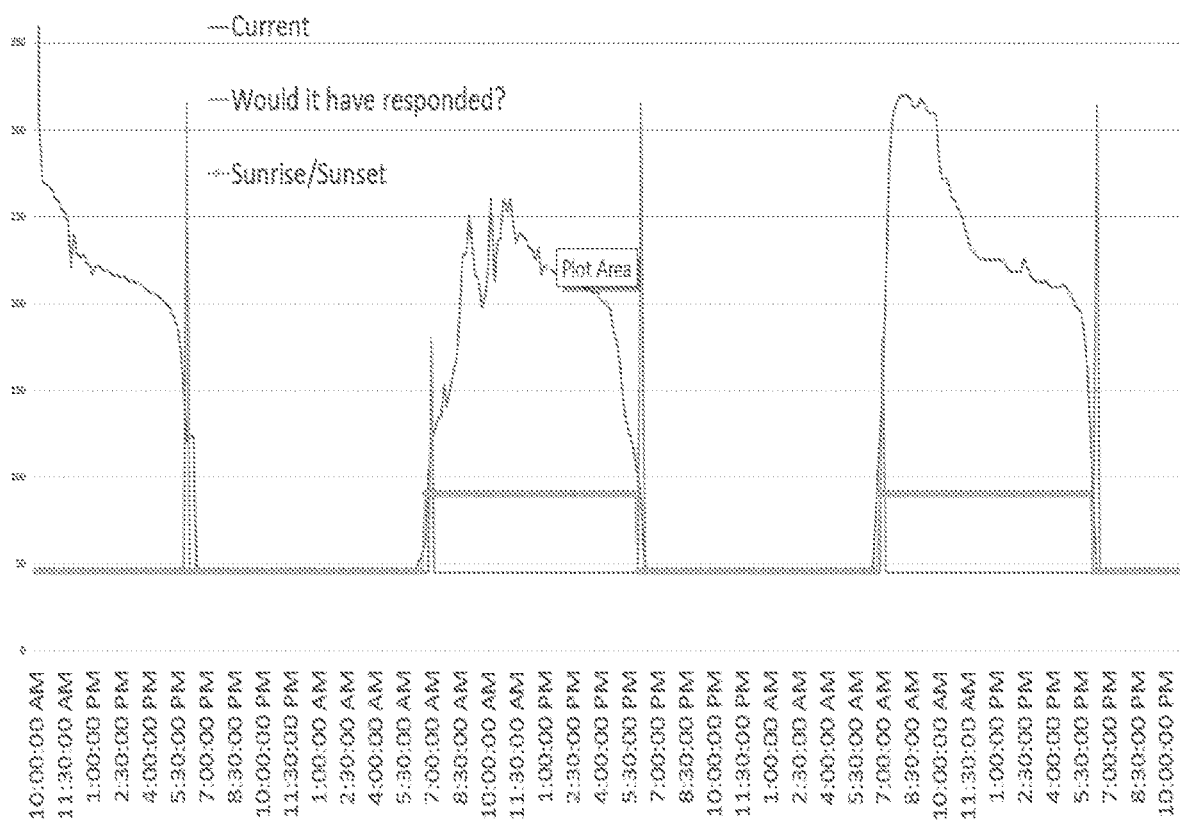
FIG. 27 is a plan view of a chart of solar data sensed by the light sensor of a motorized wand system with an overlay of the determinations of the applied software and algorithm(s), the chart specifically showing summer solar data, first use of the algorithm after three days of averaging, and one morning thunder storm.

With reference to FIG. 26 and FIG. 27, in one arrangement, as one example, motorized want system 10 collects date in 10 minute increments. The previous four values are stored in memory 102 for comparison in decision making. From the moment the light sensor 162 of motorized wand system 10 is enabled data is collected over a three-day interval and used to determine:

Average Time of Day/Night—Used to determine how long the sun is up and provide a limit to how long a motorized wand system 10 can go without responding to a low light threshold automated movement (e.g. a Nighttime Close event).

Average Nighttime Light Level—Used for determining what solar reading level equates to night and from this what the low light threshold should be. This provides a target value for night time close operations.

Maximum Day Time Light Level—Used for calculating a sunny day and when a light reading has approached true sunrise.

Four-Day History—Used for monitoring a trend in data collection and accounting for changes in the time of day and light readings as time progresses and seasons change. This four-day history is collected for each of the parameters, average time of day and night, average nighttime light level, maximum day time light level, and/or any other parameter.

Any other parameters are hereby sensed, collected, tracked and/or analyzed and used in any other manner or capacity to facilitate smooth and accurate operation of the motorized wand systems 10 in association with application of the software and the algorithm(s).

In one arrangement, during the first three-days of data collection a less reliable method is used to open and close the motorized wand system 10 due to limited solar and/or temperature data. After this preliminary data collection period this data is used to determine the limits of operation. Using the estimated time of daylight motorized wand system 10 determines a window of valid operation for sunrise and sunset opening and closing operations. This assists in keeping the automated open and close operations relatively consistent on a daily basis and helps to eliminate opening and closing at the wrong time of day or night. These processes include:

1—Sunrise is calculated as a continual increase in solar values approaching the Max reading.

2—Sunrise starts the calculation of Daylight Time.

3—The Max Solar value is recorded at each reading as the day progresses.

4—Sunset is calculated as a solar reading within a small range of the Nighttime Light Level.

5—Sunset stops Daylight Time calculation and stores the value.

6—Nighttime readings are collected and stored until a Sunrise event is detected.

7—Nighttime readings are averaged and stored at the next Sunrise should they be valid.

An additional feature of the algorithm is that it will force a Sunset Reaction from the product should the Daylight Time be beyond the Average Daylight time and no Sunset event has occurred. This is a "failsafe" for Sunset events, ensuring the motorized wand system 10 enters a "privacy" state, wherein the window shades are closed when the motorized wand system 10 knows that it must be night time.

One Example of Detailed Performance:

In one arrangement, as one example, motorized want system 10 operates in the following manner:

Start of the Day:

The day starts with the following conditions:

Positive slope of three-consecutive solar readings (over 30 minutes).

The average of all solar readings is greater than 1.15.

Current solar reading approaches half the max solar reading, calculated over the first three-days.

It is important to note that the readings continually increase as a light can be turned on in the middle of the night causing a false high light reading. This instance results in a "plateau" in the readings and a slope of 0 (+−0.02 for a particular system). An increasing trend shows a change occurring and decreases the likelihood of response to non-solar light.

End of the Day:

The day ends with the following conditions:

Light readings are within a 30% range of the minimum.

Time of daylight is within the average calculated time of daylight +−30 minutes.

The nighttime light level is calculated as a collective of consecutive readings. A reading is considered valid and stored for future Nighttime Light Level calculations if the following conditions occur:

Reading collected after a Sunset was detected.

Average slope of consecutive reading never deviating +−0.02.

The collection is used as one of the four valid Nighttime Light Level readings if the following conditions occur:

Minimum of 2 hours consecutive readings collected under the above conditions.

Sunrise event detected.

This approach allows for a high Nighttime Light Level should the area have excess light in the night hours.

Daylight Time Measurement:

Daylight Time is calculated as time between the Start of Day and End of Day. Each day the time of daylight is measured again and adjusted. Four days of valid Daylight Time measurements are kept for use in determining this average daylight. When the measurement has been completed for a given day, after the three-day calibration period, it will be saved for future calculations if valid. A valid reading is classified as:

A value within +−30 minutes of the previous calculation.
Any invalid day calculations are discarded.

Algorithm Exceptions:

Nighttime has an override or failsafe for closing at night. When the following conditions are met the motorized wand system 10 will automatically close, as a failsafe.

Light level reaches a range around the night time light level.

The calculated average daylight time has reached the maximum allowable drift or increase in daytime calculation. (+30 minutes of average.).

No Close event has occurred.

This override is to insure the motorized wand system 10 closes at night should other lights interfere with operation of the algorithm. This assists in protecting against lights left on as night approaches be they interior or exterior. This approach is free from an Open or Sunrise event occurring. Sunrise is calculated separate from the actual events that are responded to. This can be seen in FIG. 27 for the first day the algorithm runs on solar data. The Sunrise is calculated to start and the motorized wand system 10 does not respond until later. At the end of this "Second" day of data the motorized wand system 10 is forced to respond minutes before the following "Third" day. FIGS. 26 and 27 show examples of light readings in association with the solar algorithm.

From the above discussion and the accompanying drawings and claims it will be appreciated that the aftermarket remote controlled motorized wand for controlling blinds: improves upon the state of the art; eliminates the need to replace perfectly functioning manual window coverings; eliminates the need to install new window coverings to have the advantages of motorized control; is easy to use; is easy to install; is easy to set up; is customizable; can be installed on a great variety of window coverings; takes up the slack and variability between various window coverings; is adjustable; provides improved control and functionality; saves time; is inexpensive and certainly less expensive than purchasing new motorized window coverings; allows for control of a plurality of window coverings simultaneously; can be controlled by a twist or a wireless signal; allows for a plurality of window coverings to be grouped together such that they respond simultaneously to a single command; responds to light variance; responds to temperature variance; has improved battery life; accurately tracks the position of the window coverings; is repeatable over time and between window coverings; has a long useful life; has a simple and elegant design; utilizes standard batteries; can be purchased as an off-the-shelf product; allows for easy battery replacement; is durable; maintains the look and feel of a conventional tilt wand while providing additional features; provides quieter operation; among countless other improvements and advantages.

It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

What is claimed is:

1. A system of controlling a plurality of window shades, the system comprising:
   a plurality of window shades;
   each of window shades of the plurality of window shades having a shade material;
   each of the window shades of the plurality of window shades having a motor and a motor controller operatively connected to its window shade and configured to move its shade material between an open position and a closed position;
   each of the window shades of the plurality of window shades having a light sensor operatively connected its the motor controller;
   each of the window shades of the plurality of window shades having a temperature sensor operatively connected to its motor controller;
   each of the window shades of the plurality of window shades having a first switch configured to operatively control its light sensor;
   each of the window shades of the plurality of window shades having a second switch configured to operatively control its temperature sensor;
   wherein the plurality of window shades are grouped together in a group such that when a temperature threshold as sensed by a temperature sensor of one of the window shades of the plurality of window shades is exceeded the plurality of window shades open or close;
   wherein the plurality of window shades are grouped together in a group such that when a light threshold as sensed by a light sensor of one of the window shades of the plurality of window shades is exceeded the plurality of window shades open or close.

2. The system of claim 1, wherein the plurality of window shades include roller shades, draperies, vertical blinds, horizontal blinds, venetian shades, or any combination thereof.

3. The system of claim 1, wherein the motor and motor controller of at least one of the window shades of the plurality of window shades are attached to an exterior of the at least one of the window shades.

4. The system of claim 1, wherein the motor and motor controller of at least one of the window shades of the plurality of window shades are incorporated within the at least one of the window shades.

5. The system of claim 1, wherein the motor and motor controller of at least one of the window shades of the plurality of window shades is integral with the at least one of the window shades.

6. The system of claim 1, wherein the motor and motor controller of at least one of the window shades of the plurality of window shades is internal to the at least ore of the window shades.

7. The system of claim 1, wherein at least one of the first switches of the plurality of window shades is a two position switch.

8. The system of claim 1, wherein at least one of the the first switches of the plurality of window shades is a three position switch.

9. The system of claim 1, wherein at least one of the second switches of the plurality of window shades is a two position switch.

10. The system of claim 1, wherein at least one of the second switches of the plurality of window shades is a three position switch.

11. The system of claim 1, wherein at least one of the first switches of the plurality of window shades controls its respective light sensor between a deactivated state and an activated state.

12. The system of claim 1, wherein at least one of the second switches of the plurality of window shades controls its respective temperature sensor between a deactivated state and an activated state.

13. The system of claim 1, wherein at least one of the first switches of the plurality of window shades controls its light sensor between a deactivated state and a semiautomatic state.

14. The system of claim 1, wherein at least one of the second switches of the plurality of window shades controls its temperature sensor between a deactivated state and a semiautomatic state.

15. The system of claim 1, wherein at least one of the first switches of the plurality of window shades controls its respective light sensor between a deactivated state and a semiautomatic state, wherein when in a semiautomatic state the light sensor closes at least one of the window shades at sunset.

16. The system of claim 1, wherein at least one of the second switches of the plurality of window shades controls its temperature sensor between a deactivated state and a semiautomatic state, wherein when in a semiautomatic state the temperature sensor closes at least one of the window shades when a high temperature threshold is exceeded.

17. The system of claim 1, wherein at least one of the first switches of the plurality of window shades controls its respective light sensor between a deactivated state, a semiautomatic state and a fully automatic state.

18. The system of claim 1, wherein at least one of the second switches of the plurality of window shades controls its respective temperature sensor between a deactivated state, a semiautomatic state and a fully automatic state.

19. The system of claim 1, wherein at least one of the first switches of the plurality of window shades controls its respective light sensor between a deactivated state, a semiautomatic state and a fully automatic state, wherein when in a semiautomatic state the light sensor closes at least one of the window shades at sunset, and wherein when in a fully automatic state the light sensor opens at least one of the window shades at sunrise and closes at least one of the window shades at sunset.

20. The system of claim 1, wherein at least one of the second switches of the plurality of window shades controls its respective temperature sensor between a deactivated state, a semiautomatic state and a fully automatic state, wherein when in a semiautomatic state the temperature sensor closes at least one of the window shades when a high temperature threshold is exceeded, and wherein when in a fully automatic state the temperature sensor opens at least one of the window shades when a low temperature threshold is exceeded and closes at least one of the window shades when a high temperature threshold is exceeded.

21. The system of claim 1, wherein in at least one window shade the at least one window shade's light sensor trumps the at, least one window shade's temperature sensor in that the light sensor prevents the temperature sensor from opening prior to sunrise.

22. The system of claim 1, wherein when a light sensor of the plurality of window shades causes the plurality of window shades to open or close a delay timer prevents a light sensor of the plurality of window shades from opening or closing the plurality of window shades for a predetermined amount of time.

23. The system of claim 1, wherein when a temperature sensor of the plurality of window shades causes the plurality of window shades to open or close a delay timer prevents a temperature sensor of the plurality of window shades from opening or closing the plurality of window shades for a predetermined amount of time.

24. The system of claim 1, wherein when a manual movement of at least one of the window shades of the plurality of window shades occurs, a delay timer prevents a temperature sensor of the plurality of window shades from opening or closing the plurality of window shades for a predetermined amount of time.

25. The system of claim 1, wherein when a manual movement of at least one of the window shades of the plurality of window shades occurs, a delay timer prevents a light sensor of the plurality of window shades from opening or closing the plurality of window shades for a predetermined amount of time.

26. The system of claim 1, further comprising a twist sensor operatively connected to a motor controller of the plurality of window shades, wherein when the twist sensor is activated the plurality of window shades are opened or closed.

27. The system of claim 1, further comprising a twist sensor operatively connected to a motor controller of the plurality of window shades, wherein when the twist sensor is activated the plurality of window shades are opened or closed and a delay timer prevents a temperature sensor of the plurality of window shades from opening or closing the plurality of window shades for a predetermined amount of time.

28. The system of claim 1, further comprising a twist sensor operatively connected to a motor controller of the plurality of window shades, wherein when the twist sensor is activated the plurality of window shades are opened or closed and a delay timer prevents a light sensor of the plurality of window shades from opening or closing the plurality of window shades for a predetermined amount of time.

29. The system of claim 1, further comprising a remote operatively connected to the plurality of window shades and configured to open, close and control operation of the plurality of window shades through the transmission of wireless control signals.

30. The system of claim 1, further comprising a remote operatively connected to the plurality of window shades and configured to open, close and control operation of the plurality of window shades through the transmission of wireless control signals, wherein when the remote causes movement of the plurality of window shades a delay timer prevents a temperature sensor of the plurality of window shades from opening or closing the plurality of window shades for a predetermined amount of time.

31. The system of claim 1, further comprising a remote operatively connected to the plurality of window shades and configured to open, close and control operation of the plurality of window shades through the transmission of wireless control signals, wherein when the remote causes movement of the plurality of window shades a delay timer prevents a light sensor of the plurality of window shades from opening or closing the plurality of window shades for a predetermined amount of time.

32. A system of controlling a plurality of window shades, the system comprising:

a plurality of window shades;

the plurality of window shades having shade material;

the plurality of window shades having a housing operatively connected to the window shade, the housing having a motor and motor controller operatively connected to the housing and configured to move the shade material between an open position and a closed position;

the plurality of window shades having a twist sensor operatively connected to the motor controller of the housing of the plurality of window shades, wherein when the twist sensor is twist sensor is configured to sense a twist of the housing;

wherein the plurality of window shades are grouped together in a group such that when a twist is sensed by a twist sensor of one of the plurality of window shades the plurality of window shades open or close accordingly.

33. A motorized window shade system, comprising:

a first window shade;

the first window shade having shade material;

the first window shade having a motor and motor controller operatively connected to the first window shade and configured to move the shade material between an open position and a closed position;

at least one sensor operatively connected to the motor controller;

wherein the at least one sensor is configured to cause an automated movement of the first window shade when a first condition is sensed;

wherein when a manual movement of the first window shade occurs a delay timer prevents an automated movement from occurring for a predetermined amount of time.

34. The system of claim 33, wherein a manual movement is a twist of a twist sensor.

35. The system of claim 33, wherein a manual movement is a manual movement of the shade material.

36. The system of claim 33, wherein a manual movement is the transmission of a wireless control signal from a wirelessly connected remote.

37. The system of claim 33, wherein an automated movement is a movement caused by a light sensor.

38. The system of claim 33, wherein an automated movement is a movement caused by a temperature sensor.

39. A motorized window shade system, comprising:

a first window shade;

the first window shade having shade material;

the first window shade having a motor and motor controller operatively connected to the first window shade and configured to move the shade material between an open position and a closed position;

at least one sensor operatively connected to the motor controller;

wherein the at least one sensor is configured to cause an automated movement of the first window shade when a first condition is sensed;

wherein when an automated movement of the first window shade occurs a delay timer prevents an automated movement from occurring for a predetermined amount of time.

40. The system of claim 39, wherein an automated movement is a movement caused by a light sensor.

41. The system of claim 39, wherein an automated movement is a movement caused by a temperature sensor.

* * * * *

UNITED STATES PATENT AND TRADEMARK OFFICE
CERTIFICATE OF CORRECTION

PATENT NO. : 10,577,858 B2
APPLICATION NO. : 16/105088
DATED : March 3, 2020
INVENTOR(S) : Willis Jay Mullet, Daniel T. Matthews and Richard Scott Hand It is certified that error appears in the above-identified patent and that said Letters Patent is hereby corrected as shown below:

In the Claims

Column 48, Line 57, Claim 6, Should read:
6. The system of claim 1, wherein the motor and motor controller of at least one of the window shades of the plurality of window shades is internal to the at least one of the window shades.

Column 48, Line 62, Claim 8, Should read:
8. The system of claim 1, wherein at least one of the first switches of the plurality of window shades is a three position switch.

Column 49, Line 60, Claim 21, Should read:
21. The system of claim 1, wherein when at least one window shade the at least one window shade's light sensor trumps the at, least one window shade's temperature sensor in that the light sensor prevents the temperature sensor from opening prior to sunrise.

Column 51, Line 11, Claim 32, Should read:
32. A system of controlling a plurality of window shades, the system comprising: a plurality of window shades; the plurality of window shades having shade material; the plurality of window shades having a housing operatively connected to the window shade, the housing having a motor and motor controller operatively connected to the housing and configured to move the shade material between an open position and a closed position; the plurality of window shades having a twist sensor operatively connected to the motor controller of the housing of the plurality of window shades, wherein the twist sensor is configured to sense a twist of the housing; wherein the plurality of window shades are grouped together in a group such that when a twist is sensed by a twist sensor of one of the plurality of window shades the plurality of window shades open or close accordingly.

Signed and Sealed this
Fifth Day of May, 2020

Andrei Iancu
*Director of the United States Patent and Trademark Office*